United States Patent
Kim et al.

(10) Patent No.: US 12,526,746 B2
(45) Date of Patent: Jan. 13, 2026

(54) METHOD AND APPARATUS FOR SAVING POWER OF TERMINAL IN WIRELESS COMMUNICATION SYSTEM

(71) Applicant: Samsung Electronics Co., Ltd., Suwon-si (KR)

(72) Inventors: Taehyoung Kim, Suwon-si (KR); Taehan Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 602 days.

(21) Appl. No.: 17/607,799

(22) PCT Filed: Apr. 28, 2020

(86) PCT No.: PCT/KR2020/005629
§ 371 (c)(1),
(2) Date: Oct. 29, 2021

(87) PCT Pub. No.: WO2020/222509
PCT Pub. Date: Nov. 5, 2020

(65) Prior Publication Data
US 2023/0131118 A1    Apr. 27, 2023

(30) Foreign Application Priority Data

May 2, 2019  (KR) ........................ 10-2019-0051870
May 3, 2019  (KR) ........................ 10-2019-0052514
(Continued)

(51) Int. Cl.
G08C 17/00    (2006.01)
H04L 5/00     (2006.01)
(Continued)

(52) U.S. Cl.
CPC ....... *H04W 52/0235* (2013.01); *H04L 5/0053* (2013.01); *H04W 48/12* (2013.01); *H04W 52/0216* (2013.01); *H04W 52/0229* (2013.01)

(58) Field of Classification Search
CPC ............. H04W 52/0235; H04W 48/12; H04W 52/0216; H04W 52/0229; H04W 52/028; H04W 76/28; H04L 5/0053; Y02D 30/70
(Continued)

(56) References Cited

U.S. PATENT DOCUMENTS 8,837,313 B2 *  9/2014  Adachi ............. H04W 52/0238
                                                 370/252
9,538,518 B2 *  1/2017  Seo ........................ H04L 5/0053
(Continued)

FOREIGN PATENT DOCUMENTS

CN     109496454 A    3/2019
EP     3869878 A1     8/2021
(Continued)

OTHER PUBLICATIONS

Provisional U.S. Patent Application.*
(Continued)

*Primary Examiner* — Amancio Gonzalez

(57) ABSTRACT

The disclosure provides a method, performed by a user equipment (UE), of controlling downlink (DL) control channel monitoring, the method including: receiving power saving signal (POSS) configuration information from a base station (BS); performing monitoring on a POSS from the BS, based on the POSS configuration information; determining whether the POSS is detected based on the monitoring; and controlling a DL control channel (PDCCH) monitoring configuration of the UE, based on a result of the determining.

13 Claims, 35 Drawing Sheets

(30) Foreign Application Priority Data

May 20, 2019 (KR) ........................ 10-2019-0059136
May 27, 2019 (KR) ........................ 10-2019-0062192

(51) Int. Cl.
*H04W 48/12* (2009.01)
*H04W 52/02* (2009.01)

(58) Field of Classification Search
USPC ........................................................ 370/311
See application file for complete search history.

(56) References Cited

U.S. PATENT DOCUMENTS

| | | | | |
|---|---|---|---|---|
| 10,582,531 B2* | 3/2020 | Hwang | .............. | H04W 72/0446 |
| 10,863,512 B2* | 12/2020 | Tsai | .................. | H04W 72/0473 |
| 10,887,071 B2* | 1/2021 | Peng | .................... | H04L 5/0055 |
| 11,070,277 B2* | 7/2021 | Park | .................... | H04W 68/005 |
| 11,153,900 B2* | 10/2021 | Kim | ...................... | H04W 72/23 |
| 11,228,976 B2* | 1/2022 | Wu | ...................... | H04W 36/38 |
| 11,229,022 B2* | 1/2022 | Lin | ...................... | H04L 5/0094 |
| 11,240,870 B2* | 2/2022 | Feuersaenger | .... | H04W 52/0225 |
| 11,246,141 B2* | 2/2022 | Zhou | .................. | H04W 52/0229 |
| 11,330,456 B2* | 5/2022 | Zhou | .................. | H04W 76/19 |
| 11,368,911 B2* | 6/2022 | Tsai | .................... | H04W 72/23 |
| 11,374,723 B2* | 6/2022 | Yi | .......................... | H04W 24/10 |
| 11,452,132 B2* | 9/2022 | Stern-Berkowitz | ... | H04W 74/02 |
| 11,477,731 B2* | 10/2022 | Hwang | ................ | H04L 1/1822 |
| 11,483,770 B2* | 10/2022 | Li | .......................... | H04W 76/27 |
| 11,490,334 B2* | 11/2022 | Zhou | .................... | H04L 1/1614 |
| 11,503,544 B2* | 11/2022 | Ahmad | ................. | H04W 72/23 |
| 11,516,786 B2* | 11/2022 | Hwang | ................ | H04W 72/23 |
| 11,546,851 B2* | 1/2023 | Hwang | ................ | H04W 72/23 |
| 11,553,423 B2* | 1/2023 | Sui | ...................... | H04W 52/0229 |
| 11,564,166 B2* | 1/2023 | Nam | ................. | H04W 52/0229 |
| 11,606,751 B2* | 3/2023 | Lee | ........................ | H04W 76/28 |
| 11,611,912 B2* | 3/2023 | Han | ........................ | H04W 4/06 |
| 11,622,383 B2* | 4/2023 | Tang | .................... | H04W 16/14 370/330 |
| 11,711,193 B2* | 7/2023 | Papasakellariou | .... | H04L 1/1854 370/330 |
| 11,818,685 B2* | 11/2023 | Hwang | .............. | H04W 52/0229 |
| 11,838,863 B2* | 12/2023 | Hwang | ................... | H04L 1/189 |
| 11,895,584 B2* | 2/2024 | Zhou | .................... | H04W 76/15 |
| 11,910,309 B2* | 2/2024 | Yi | ........................... | H04L 1/1893 |
| 11,963,189 B2* | 4/2024 | Yi | ........................... | H04L 5/0044 |
| 11,985,727 B2* | 5/2024 | Zhou | ................. | H04W 52/0206 |
| 12,075,356 B2* | 8/2024 | Islam | ................... | H04W 76/28 |
| 12,114,264 B2* | 10/2024 | Guo | ...................... | H04W 72/23 |
| 2016/0198408 A1 | 7/2016 | Jhang et al. | | |
| 2020/0100179 A1* | 3/2020 | Zhou | ................. | H04W 52/0209 |
| 2020/0213943 A1* | 7/2020 | Medles | ............. | H04W 52/0216 |
| 2021/0136809 A1* | 5/2021 | Xu | ....................... | H04W 72/0446 |
| 2021/0203468 A1* | 7/2021 | Yi | ....................... | H04W 72/0453 |
| 2021/0306182 A1* | 9/2021 | Kim | ...................... | H04L 5/0048 |
| 2021/0321333 A1* | 10/2021 | Miao | ................. | H04W 52/0274 |
| 2021/0368445 A1* | 11/2021 | Xu | ....................... | H04W 52/0245 |
| 2022/0006496 A1* | 1/2022 | Park | ..................... | H04B 7/0639 |
| 2022/0078879 A1* | 3/2022 | Nimbalker | ............ | H04W 76/28 |
| 2022/0124622 A1* | 4/2022 | Islam | .................... | H04W 72/20 |
| 2022/0174734 A1* | 6/2022 | Li | .......................... | H04L 5/0073 |
| 2022/0346002 A1* | 10/2022 | Fu | ........................ | H04W 48/20 |

FOREIGN PATENT DOCUMENTS

| | | | | |
|---|---|---|---|---|
| EP | 3913955 A1 * | 11/2021 | ............ | H04W 24/08 |
| WO | 2019030143 A1 | 5/2019 | | |
| WO | WO-2020164118 A1 * | 8/2020 | ............ | H04W 24/08 |

OTHER PUBLICATIONS

International Search Report and Written Opinion of the International Searching Authority dated Aug. 6, 2020, in connection with International Application No. PCT/KR2020/005629, 10 pages.
Huawei, et al., "PDCCH based power saving signal/channel," R1-1903988, 3GPP TSG RAN WG1 Meeting # 96bis, Xi"an, China, Apr. 8-12, 2019, 7 pages.
Intel Corporation, "On PDCCH-based power saving signal," R1-1904317, 3GPP TSG-RAN WG1 #96bis, Xi"an, China, Apr. 8-12, 2019, 8 pages.
Samsung, "On PDCCH-based power saving signal/channel," R1-1904461, 3GPP TSG-RAN WG1 #96bis, Xi"an, China, Apr. 8-12, 2019, 7 pages.
VIVO, "PDCCH-based power saving signal/channel design," R1-1904103, 3GPP TSG-RAN WG1 #96bis, Xi"an, China, Apr. 8-12, 2019, 7 pages.
Translation of the Written Opinion of the International Searching Authority in connection with International Application No. PCT/KR2020/005629 issued Aug. 6, 2020, 6 pages.
Communication pursuant to Article 94(3) EPC dated Dec. 21, 2023, in connection with European Application No. 20799405.4, 5 pages.
Supplementary European Search Report dated Apr. 19, 2022, in connection with European Application No. 20799405.4, 15 pages.
Apple Inc., "Design of PDCCH-based Power Saving Signal and Channel," R1-1904985, 3GPP TSG RAN WG1 #96bis, Xi'an, China, Apr. 8-12, 2019, 9 pages.
CATT, "PDCCH based power saving signal/channel design," R1-1905368, 3GPP TSG RAN WG1 #96bis, Xi'an, China, Apr. 8-12, 2019, 8 pages.
Interdigital, "PDCCH-based Power Saving Signal Design Considerations," R1-1905409, 3GPP TSG RAN WG1 #96bis, Xi'an, China, Apr. 8-12, 2019, 9 pages.
Panasonic, "Discussion on PDCCH-based power saving signal/channel triggering," R1-1905185, 3GPP TSG RAN WG1 #96bis, Xi'an, China, Apr. 8-12, 2019, 4 pages.
Office Action dated Jul. 4, 2025, in connection with Korean Application No. 10-2019-0062192, 9 pages.

* cited by examiner

FIG. 15
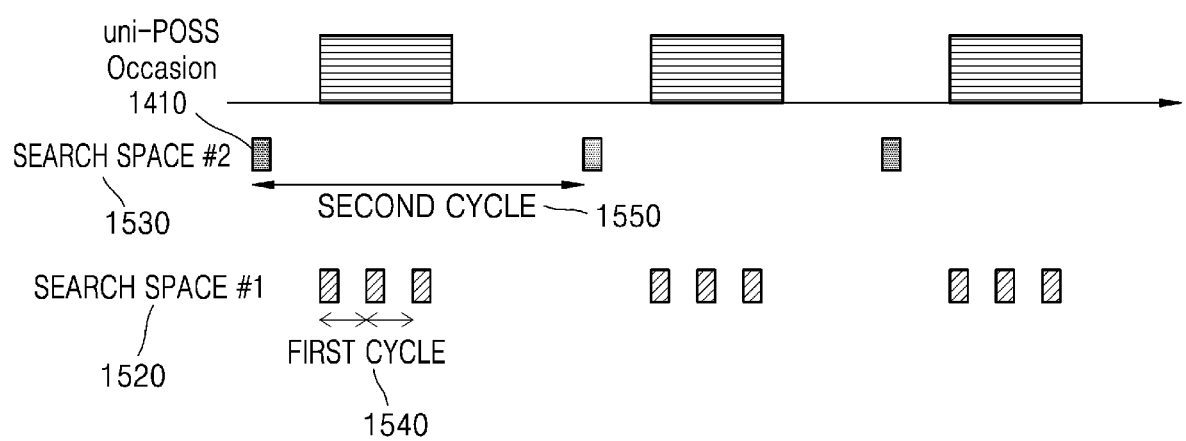

METHOD AND APPARATUS FOR SAVING POWER OF TERMINAL IN WIRELESS COMMUNICATION SYSTEM

CROSS-REFERENCE TO RELATED APPLICATIONS

This application is a 371 National Stage of International Application No. PCT/KR2020/005629, filed Apr. 28, 2020, which claims priority to Korean Patent Application No. 10-2019-0051870, filed May 2, 2019, Korean Patent Application No. 10-2019-0052514, filed May 3, 2019, Korean Patent Application No. 10-2019-0059136, filed May 20, 2019, and Korean Patent Application No. 10-2019-0062192, filed May 27, 2019, the disclosures of which are herein incorporated by reference in their entirety.

BACKGROUND

1. Field

The disclosure relates to a method and apparatus for saving power of a user equipment (UE) in a wireless communication system.

2. Description of Related Art

In order to meet increasing demand with respect wireless data traffic after the commercialization of 4th generation (4G) communication systems, efforts have been made to develop 5th generation (5G) or pre-5G communication systems. For this reason, 5G or pre-5G communication systems are called 'beyond 4G network' communication systems or 'post long term evolution (post-LTE)' systems. In order to achieve high data rates, implementation of 5G communication systems in an ultra-high frequency millimeter-wave (mmWave) band (e.g., a 60-gigahertz (GHz) band) is being considered. In order to reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. In order to improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed.

In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. In order to implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology using beamforming, MIMO, and array antennas. Application of cloud radio access network (Cloud-RAN) as the above-described big data processing technology may be an example of convergence of 5G communication technology and IoT technology.

Because various services may be provided due to the aforementioned technical features and the development of wireless communication systems, methods for seamlessly providing these services are required. In particular, there is a demand for a communication method of saving power of a user equipment (UE) so as to provide a user with a service in a longer period of time.

SUMMARY

Disclosed embodiments provide an apparatus and method for effectively providing a service in a mobile communication system.

Disclosed embodiments provide a communication method and apparatus for saving power of a user equipment (UE) in a wireless communication system.

Disclosed embodiments can provide a communication method and apparatus for effectively saving power of a user equipment (UE) in a mobile communication system.

BRIEF DESCRIPTION OF THE DRAWINGS

FIG. 15 is a diagram for describing a search space and cycle of a uni-POSS according to an embodiment of the disclosure.

DETAILED DESCRIPTION

Figure 1:
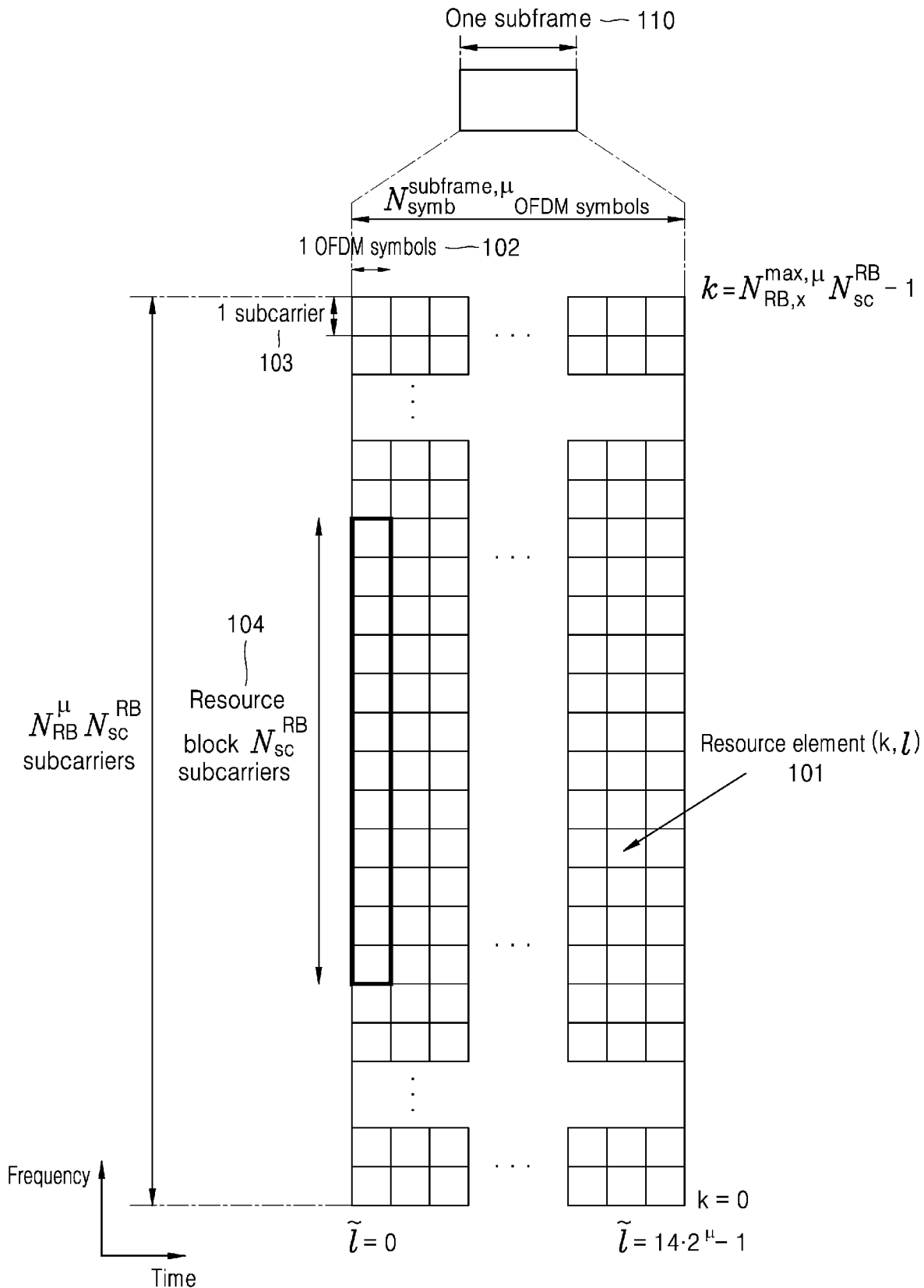
FIG. 1 is a diagram illustrating a basic structure of a time-frequency domain of a next-generation mobile communication system according to an embodiment of the disclosure.

According to an embodiment of the disclosure, a method, performed by a user equipment (UE), of controlling downlink (DL) control channel monitoring may include: receiving power saving signal (POSS) configuration information from a base station (BS); performing monitoring on a POSS from the BS, based on the POSS configuration information; determining whether the POSS is detected based on the monitoring; and controlling a DL control channel (PDCCH) monitoring configuration of the UE, based on a result of the determining.

The POSS configuration information may include default operation information that is information about a DL control channel monitoring control configuration of the UE for a case where the POSS is not detected.

The controlling of the DL control channel monitoring configuration of the UE, based on the result of the determining, may include, when the POSS is not detected, controlling the DL control channel monitoring control configuration, based on the default operation information.

The controlling of the DL control channel monitoring configuration of the UE, based on the result of the determining, may include, when the POSS is not detected in the POSS configuration information, configuring the DL control channel monitoring to be stopped during a preset period of time.

The controlling of the DL control channel monitoring configuration of the UE, based on the result of the determining, may include, when the POSS is detected, controlling the DL control channel monitoring configuration of the UE, based on the POSS.

The determining of whether the POSS is detected based on the monitoring may include: monitoring a preset search space in at least one of an Active time of the UE or an inActive time of the UE; and detecting the POSS based on the monitoring.

The POSS configuration information may include at least one of information of a control region (control resource set) in which the POSS is transmitted, information of a search space in which the POSS is transmitted, information of an occasion cycle of the POSS, or format information of DL control information corresponding to the POSS.

The POSS may include at least one of DL control channel monitoring occasion information of the UE, discontinuous reception (DRX) configuration information of the UE, or state switching indication information of the UE.

A format of DL control information corresponding to the POSS detected in an Active time of the UE may be different from a format of DL control information corresponding to the POSS detected in an inActive time of the UE.

DL control information corresponding to the POSS detected in an Active time of the UE may be scrambled by a radio network temporary identifier (RNTI) different from DL control information detected in an inActive time of the UE.

The controlling of the DL control channel (PDCCH) monitoring configuration of the UE, based on the result of the determining, may include changing an occasion of the DL control channel (PDCCH) monitoring of the UE based on a POSS in an Active time of the UE.

The controlling of the DL control channel (PDCCH) monitoring configuration of the UE, based on the result of the determining, may include configuring the DL control channel monitoring of the UE to be stopped during a preset period of time since a preset point of time based on a POSS in an inActive time of the UE.

According to an embodiment of the disclosure, a method, performed by a base station (BS), of controlling downlink (DL) control channel monitoring of a user equipment (UE) may include: transmitting power saving signal (POSS) configuration information to the UE; transmitting a POSS to the UE, based on the POSS configuration information; and transmitting control information to the UE, based on a DL control channel (PDCCH) monitoring configuration of the UE which is configured based on the POSS, wherein the POSS configuration information includes default operation information that is information about a DL control channel monitoring control configuration of the UE for a case where the POSS is not detected.

According to an embodiment of the disclosure, a user equipment (UE) for controlling downlink (DL) control channel monitoring may include: a transceiver; and at least one processor coupled with the transceiver and configured to receive power saving signal (POSS) configuration information from a base station (BS), perform monitoring on a POSS from the BS, based on the POSS configuration information, determine whether the POSS is detected based on the monitoring, and control a DL control channel (PDCCH) monitoring configuration of the UE, based on a result of the determining.

According to an embodiment of the disclosure, a base station (BS) for controlling downlink (DL) control channel monitoring of a user equipment (UE) may include:
 a transceiver; and
 at least one processor coupled with the transceiver and configured to transmit power saving signal (POSS) configuration information to the UE,
transmit a POSS to the UE, based on the POSS configuration information, and transmit control information to the UE, based on a DL control channel (PDCCH) monitoring configuration of the UE which is configured based on the POSS, wherein the POSS configuration information includes default operation information that is information about a DL control channel monitoring control configuration of the UE for a case where the POSS is not detected.

Hereinafter, embodiments of the disclosure will now be described more fully with reference to the accompanying drawings.

In the following descriptions of embodiments, descriptions of techniques that are well known in the art and are not directly related to the disclosure are omitted. This is to clearly convey the gist of the disclosure by omitting an unnecessary explanation.

For the same reason, some components in the drawings are exaggerated, omitted, or schematically illustrated. Also, the size of each component does not entirely reflect the actual size. In the drawings, the same or corresponding components are denoted by the same reference numerals.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein. Rather, these embodiments are provided so that the disclosure will be thorough and complete and will fully convey the concept of the disclosure to one of ordinary skill in the art, and the disclosure will only be defined by the appended claims. Throughout the specification, like reference numerals denote like components. In the descriptions of the disclosure, detailed explanations of the related art are omitted when it is deemed that they may unnecessarily obscure the essence of the disclosure. The terms used in the specification are defined in consideration of functions used in the disclosure, and can be changed according to the intent or commonly used methods of users or operators. Accordingly, definitions of the terms are understood based on the entire descriptions of the present specification.

Although the following descriptions may be provide about long term evolution (LTE), LTE-Advanced (LTE-A), and new radio (NR) systems as an example, embodiments of the disclosure are also applicable to other communication systems having similar technical backgrounds or channel structure. For example, the NR system may be a 5th generation mobile communication (5G, NR) technology developed after LTE-A, and hereinafter, 5G may indicate a concept including legacy LTE, legacy LTE-A, and other similar services. Also, the disclosure is applicable to other communication systems (e.g., World interoperability for microwave access (WiMAX), wireless broadband Internet (Wibro)) through modification at the discretion of one of ordinary skill in the art without greatly departing from the scope of the disclosure.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block(s). The computer program instructions may also be stored in a computer-executable or computer-readable memory that may direct the computer or other programmable data processing apparatus to function in a particular manner, such that the instructions stored in the computer-executable or computer-readable memory may produce an article of manufacture including instruction means that perform the functions specified in the flowchart block(s). The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide operations for implementing the functions specified in the flowchart block(s).

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~unit" as used in the present embodiment refers to a software or hardware component, such as field-programmable gate array (FPGA) or application-specific integrated circuit (ASIC), which performs certain tasks. However, the term "~unit" does not mean to be limited to software or hardware. A "~unit" may be configured to be in an addressable storage medium or configured to operate one or more processors. Thus, a "~unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "~units" may be combined into fewer components and "~units" or further separated into additional components and "~units". Further, the components and "~units" may be implemented to operate one or more central processing units (CPUs) in a device or a secure multimedia card. Also, a "~unit" may include one or more processors in embodiments.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), and LTE-Advanced (LTE-A) of the 3rd Generation Partnership Project (3GPP), high rate packet data (HRPD) and ultra mobile broadband (UMB) of 3GPP2, 802.16e of the Institute of Electrical and Electronic Engineers (IEEE), or the like.

As a representative example of a broadband wireless communication system, the LTE system has adopted an orthogonal frequency division multiplexing (OFDM) scheme in a downlink (DL) and has adopted a single carrier frequency division multiple access (SC-FDMA) scheme in an uplink (UL). The UL refers to a radio link for transmitting data or a control signal from a terminal (e.g., a user equipment (UE) or a mobile station (MS)) to a base station (e.g., an evolved Node B (eNB), a gNode B, a Node B, or a base station (BS)), and the DL refers to a radio link for transmitting data or a control signal from the base station to the terminal. The above-described multiple access schemes identify data or control information of different users in a manner that time-frequency resources for carrying the data or control information of the users are allocated and managed not to overlap each other, that is, to achieve orthogonality therebetween. However, the disclosure is not limited to the above example, and for the 5G communication system, the use of a non-orthogonal multiple access (NOMA) scheme and the use of the OFDM scheme in a UL are also considered.

As a post-LTE communication system, i.e., the 5G communication system is requested to freely reflect various requirements from users and service providers, and thus, has to support services that simultaneously satisfies the various requirements. The services being considered for the 5G communication system include enhanced mobile broadband (eMBB), massive machine-type communication (mMTC), ultra-reliability low-latency communication (URLLC) services, or the like.

The eMBB aims to provide an improved data rate than a data rate supported by the legacy LTE, LTE-A, or LTE-Pro. For example, in the 5G communication system, the eMBB should be able to provide a peak data rate of 20 Gbps in a DL and a peak data rate of 10 Gbps in an UL at one BS. Also, the 5G communication system has to simultaneously provide the peak data rate and an increased user-perceived data rate of a terminal. In order to satisfy such requirements, there is a need for an improvement in transmission/reception technology including an improved multiple-input multiple-output (MIMO) transmission technology. Also, a data rate required in the 5G communication system may be satisfied by using a frequency bandwidth wider than 20 MHz in the 3 GHz to 6 GHz or 6 GHz or more frequency band, instead of the LTE transmitting a signal by using maximum 20 MHz in the 2 GHz band.

Also, the mMTC is being considered to support application services such as IoT in the 5G communication system. In order to efficiently provide the IoT, the mMTC may require the support for a large number of terminals in a cell, improved coverage for a terminal, improved battery time, reduced cost of a terminal, and the like. Because the IoT is attached to various sensors and various devices to provide a communication function, the mMTC should be able to support a large number of terminals (e.g., 1,000,000 terminals/km2) in a cell. Also, because a terminal supporting the mMTC is likely to be located in a shadow region failing to be covered by the cell, such as the basement of a building, due to the characteristics of the service, the terminal may require wider coverage than other services provided by the 5G communication system. The terminal supporting the mMTC should be configured as a low-cost terminal and may require a very long battery life time of 10 to 15 years because it is difficult to frequently replace the battery of the terminal.

Lastly, the URLLC refers to cellular-based wireless communication services used for mission-critical purposes. For example, services for remote control of robots or machinery, industrial automation, unmanned aerial vehicles, remote health care, emergency alerts, and the like may be considered. Therefore, the URLLC should provide communications providing very low latency (ultra-low latency) and ultra-high reliability. For example, a service supporting the URLLC should satisfy air interface latency of less than 0.5 milliseconds, and simultaneously has a requirement for a packet error rate of 10^-5 or less. Thus, for the service supporting the URLLC, the 5G system should provide a transmit time interval (TTI) smaller than other services and may simultaneously have a design requirement for allocating wide resources in a frequency band so as to ensure reliability of a communication link.

The three services of the 5G, i.e., the eMBB, the URLLC, and the mMTC may be multiplexed and transmitted in one system. Here, in order to satisfy different requirements of the services, the services may use different transceiving schemes and different transceiving parameters. Obviously, the 5G is not limited to the afore-described three services.

The disclosure below provides downlink control information (DCI) corresponding to a power saving signal, a method of monitoring a physical downlink control channel (PDCCH) to detect the DCI corresponding to the power saving signal, and a method, performed by a UE, of performing power saving based on the detected DCI, in a wireless communication system.

Hereinafter, a frame structure of a next-generation mobile communication system (a 5G or NR system) will now be described in detail with reference to the accompanying drawing.

FIG. 1 is a diagram illustrating a basic structure of a time-frequency domain of a next-generation mobile communication system according to an embodiment of the disclosure.

Referring to FIG. 1, in FIG. 1, the horizontal axis represents a time domain and the vertical axis represents a frequency domain. A basic unit of a resource in the time-frequency domain may be a resource element (RE) 101. The RE 101 may be defined as 1 OFDM symbol 102 in the time axis and 1 subcarrier 103 in the frequency axis. $N_{sc}^{RB}$ consecutive REs in the frequency domain (FIG. 1 illustrates 12 REs, as an example) may constitute one resource block (RB) 104. In an embodiment, a plurality of OFDM symbols may constitute one subframe 110.

Figure 2:
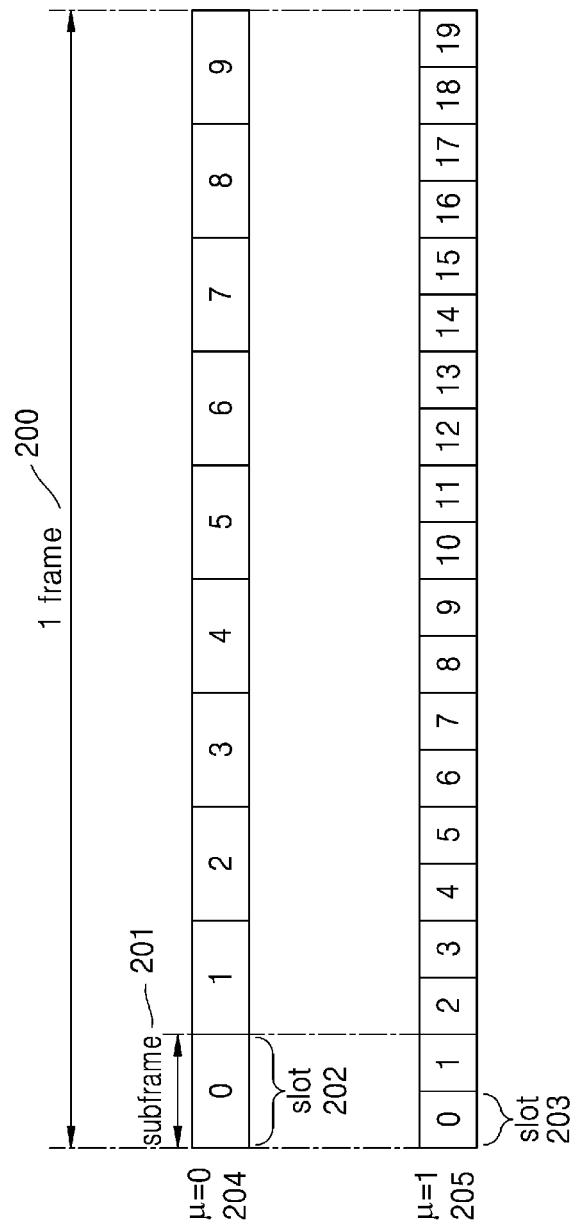
FIG. 2 is a diagram for describing a structure of a frame, a subframe, and a slot of a next-generation mobile communication system according to an embodiment of the disclosure.

FIG. 2 is a diagram for describing a structure of a frame, a subframe, and a slot of a next-generation mobile communication system according to an embodiment of the disclosure.

FIG. 2 illustrates an embodiment of a structure of a frame 200, a subframe 201, and a slot 202. 1 frame 200 may be defined as 10 ms. Also, 1 subframe 201 may be defined as 1 ms. That is, 1 frame 200 may consist of a total of 10 subframes 201.

In an embodiment, 1 slot 202 or 203 may be defined as 14 OFDM symbols (i.e., the number of symbols per 1 slot ($N_{symb}^{slot}$)=14). 1 subframe 201 may consist of one slot or a plurality of slots 202 or 203, and the number of slots 202 or 203 per 1 subframe 201 may vary according to configuration values 204 or 205 with respect to a subcarrier spacing. FIG. 2 illustrates, as an example, a case of a subcarrier spacing configuration value $\mu=0$ 204 and a case of $\mu=1$ 205. In the case of $\mu=0$ 204, 1 subframe 201 may consist of 1 slot 202, and in the case of =1 205, 1 subframe 201 may consist of 2 slots 203. That is, according to a subcarrier spacing configuration value $\mu$, the number of slots per 1 subframe ($N_{slot}^{subframe,\mu}$) may vary, and thus, the number of slots per 1 frame ($N_{slot}^{frame,\mu}$) may vary. $N_{slot}^{subframe,\mu}$ and $N_{slot}^{frame,\mu}$ according to each subcarrier spacing configuration value p may be defined in [Table 1] below.

TABLE 1

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Figure 3:
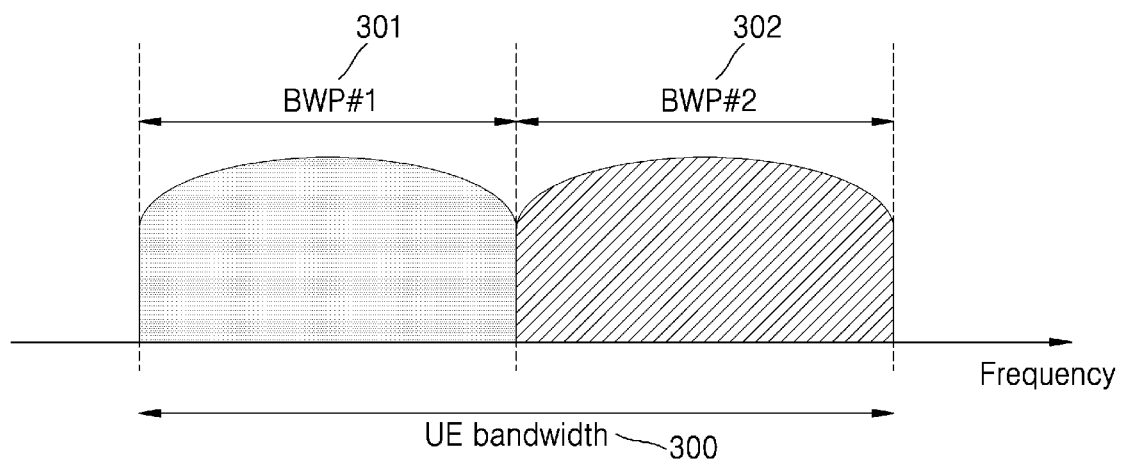
FIG. 3 is a diagram for describing bandwidth part (BWP) configuration of a mobile communication system according to an embodiment of the disclosure.

FIG. 3 is a diagram illustrating an example of configuration with respect to a bandwidth part in a 5G communication system according to some embodiments of the disclosure.

Referring to FIG. 3, FIG. 3 illustrates an example in which a UE bandwidth 300 is configures as two bandwidth parts (BWPs), i.e., BWP #1 301 and BWP #2 302. A BS may configure a UE with one or a plurality of BWPs, and may configure a plurality of pieces of information with respect to each BWP, as shown in [Table 2] below.

TABLE 2

```
BWP ::=                    SEQUENCE {
  bwp-Id                     BWP-Id,
  locationAndBandwidth       INTEGER (1..65536),
  subcarrierSpacing          ENUMERATED {n0, n1, n2, n3, n4, n5},
  cyclicPrefix               ENUMERATED { extended }
}
```

However, the disclosure is not limited to the afore-described example, and various parameters related to a BWP in addition to the afore-described configuration information may be configured for the UE. The plurality of pieces of afore-described information may be transmitted from the BS to the UE via higher layer signaling, e.g., radio resource control (RRC) signaling, a master information block (MIB), or system information. At least one BWP from among the one or more configured BWPs may be activated. Activation or deactivation with respect to a configured BWP may be semi-statically provided from the BS to the UE via RRC signaling or may be dynamically provided via DCI.

According to an embodiment, the UE before RRC connection may receive configuration with respect to an initial BWP for initial connection from the BS via an MIB. In more detail, in order to receive system information (which may correspond to remaining system information (RMSI) or system information block 1 (SIB1)) for an initial access via an MIB in an initial access stage, the UE may receive configuration information with respect to a control resource set (CORESET) and a search space in which a PDCCH may be transmitted. The CORESET and the search space configured by the MIB may each be regarded as 0 for identity (ID).

The BS may notify, via the MIB, the UE of configuration information such as frequency allocation information, time allocation information, numerology, and the like about CORESET #0. Also, the BS may notify, via the MIB, the UE of a monitoring period about CORESET #0 and configuration information about an occasion, i.e., configuration information about search space #0. The UE may regard a frequency domain configured as CORESET #0 and obtained from the MIB as an initial BWP for the initial access. Here, an identifier (ID) of the initial BWP may be regarded as 0.

Configuration with respect to a BWP which is supported by the afore-described next-generation mobile communication system (the 5G or NR system) may be used for various purposes.

According to an embodiment of the disclosure, when a bandwidth supported by a UE is smaller than a system bandwidth, a BS may support this via the afore-described BWP configuration. For example, the BS may configure the UE with a frequency location of a BWP (configuration information 2), and thus, the UE can transmit or receive data in a particular frequency location in a system bandwidth.

Also, according to an embodiment of the disclosure, in order to support different numerologies, the BS may configure the UE with a plurality of BWPs. For example, in order to support all data transmission and reception using a subcarrier spacing of 15 kHz and a subcarrier spacing of 30 kHz, the BS may configure two BWPs as the subcarrier spacing of 15 kHz and the subcarrier spacing of 30 kHz for a particular UE. Different BWPs may be frequency division multiplexed. When to transmit or receive data in a particular subcarrier spacing, a BWP configured with the subcarrier spacing may be activated.

Also, according to an embodiment of the disclosure, in order to reduce power consumption of the UE, the BS may configure the UE with BWPs having bandwidths of different sizes. For example, when the UE supports a very large bandwidth, e.g., a bandwidth of 100 MHz, and always transmits or receives data in the bandwidth, very large power consumption may occur. In particular, in a zero-traffic circumstance, to perform unnecessary monitoring on a DL control channel in the large bandwidth of 100 MHz may be very inefficient in terms of power consumption. In order to reduce power consumption of the UE, the BS may configure the UE with a BWP of a relatively small bandwidth, e.g., a BWP of 20 MHz. In the zero-traffic circumstance, the UE may perform a monitoring operation in the BWP of 20 MHz, and when data occurs, may transmit or receive data in a BWP of 100 MHz, in response to an instruction by the BS.

In the afore-described method of configuring a BWP, UEs before RRC connection may receive configuration information about an initial BWP via a MIB in an initial access stage. In more detail, the UE may be configured, from an MIB of a physical broadcast channel (PBCH), with a CORESET for a DL control channel via which DCI for scheduling a SIB can be transmitted. A bandwidth of the CORESET configured by the MIB may be regarded as an initial BWP, and the UE may receive, via the configured initial BWP, a physical downlink shared channel (PDSCH) in which SIB is transmitted. The initial BWP may be used for other system information (OSI), paging, and a random access, as well as reception of the SIB.

Hereinafter, a synchronization signal (SS)/PBCH block of the next-generation mobile communication system (the 5G or NR system) will now be described.

The SS/PBCH block may indicate a physical layer channel block consisting of a primary SS (PSS), a secondary SS (SSS), and a PBCH. In more detail, the SS/PBCH block may be defined as below.

PSS: A signal being a reference of DL time/frequency synchronization may provide some information of cell ID.

SSS: A signal being a reference of DL time/frequency synchronization may provide other information of cell ID which is not provided by the PSS. In addition, the SSS may function as a reference signal for demodulation of a PBCH.

PBCH: It may provide essential system information requested by a UE to transmit or receive a data channel and a control channel. The essential system information may include search space-related control information indicating radio resource mapping information of a control channel, scheduling control information about a separate data channel to transmit system information, and the like.

SS/PBCH block: The SS/PBCH block may consist of a combination of the PSS, the SSS, and the PBCH. One or more of the SS/PBCH blocks may be transmitted in a time of 5 ms, and each of the SS/PBCH blocks being transmitted may be identified by an index.

The UE may detect the PSS and the SSS in the initial access stage, and may decode the PBCH. The UE may obtain the MIB from the PBCH, and may be configured for CORESET #0 via the MIB. The UE may assumes that the selected SS/PBCH block and a demodulation reference signal (DMRS) transmitted in CORESET #0 are quasi co located (QCL), and may perform monitoring on CORESET #0. The UE may receive system information based on DL control information transmitted in CORESET #0. The UE may obtain, from the received system information, configuration information related to a random access channel (RACH) necessary for the initial access. The may transmit a physical RACH (PRACH) to the BS, in consideration of a selected SS/PBCH index, and when receiving the PRACH, the BS may obtain information about an index of the SS/PBCH block selected by the UE. The BS may identify which block from among SS/PBCH blocks is selected by the UE and the UE monitors CORESET #0 corresponding to (or associated with) the selected SS/PBCH block.

Hereinafter, downlink control information (DCI) in the next-generation mobile communication system (the 5G or NR system) will now be described in detail.

Scheduling information about UL data (or a physical UL data channel (a physical uplink shared channel (PUSCH)) or DL data (or a physical DL data channel (a physical downlink shared channel (PDSCH)) in the next-generation mobile communication system (the 5G or NR system) may be transmitted from a BS to a UE. The UE may monitor, with respect to the PUSCH or the PDSCH, a DCI format for fallback and a DCI format for non-fallback. The DCI format for fallback may be configured as a fixed field predefined between the BS and the UE, and the DCI format for non-fallback may include a configurable field.

The DCI may be channel-coded and modulated and then may be transmitted via a PDCCH that is a physical DL control channel. A cyclic redundancy check (CRC) may be added to a payload of a DCI message, and the CRC may be scrambled by a radio network temporary identifier (RNTI) corresponding to an identity of the UE. According to an objective of the DCI message, e.g., transmission of UE-specific data, a power control command, a random access response, or the like, different RNTIs may be used to scramble the CRC to be added to the payload of the DCI message. That is, the RNTI may not be explicitly transmitted but may be included in a CRC calculation process and transmitted. When the DCI message transmitted on the PDCCH is received, the UE may check the CRC by using the allocated RNTI. As a result of the checking, when the CRC is correct, the UE may identify that a corresponding message is transmitted to the UE.

For example, DCI for scheduling PDSCH about system information (SI) may be scrambled by a SI-RNTI. DCI for scheduling PDSCH about a random access response (RAR) may be scrambled by an RA-RNTI. DCI for scheduling PDSCH about a paging message may be scrambled by a P-RNTI. DCI for notifying a slot format indicator (SFI) may be scrambled by an SFI-RNTI. DCI for notifying transmit power control (TPC) may be scrambled by a TPC-RNTI. DCI for scheduling a UE-specific PDSCH or PUSCH may be scrambled by a cell RNTI (C-RNTI).

A DCI format 00 may be used as fallback DCI for scheduling the PUSCH, and in this regard, a CRC may be scrambled by the C-RNTI. In an embodiment, the DCI format 0_0 of which CRC is scrambled by the C-RNTI may include a plurality of pieces of information as in [Table 3] below.

TABLE 3

- Identifier for DCI formats — [1] bit
- Frequency domain resource assignment —$[\lceil \log_2(N_{RB}^{UL,BWP}(N_{RB}^{UL,BWP} + 1)/2)\rceil]$ bits
- Time domain resource assignment — X bits
- Frequency hopping flag — 1 bit.
- Modulation and coding scheme — 5 bits TABLE 3-continued

- New data indicator — 1 bit
- Redundancy version — 2 bits
- HARQ process number — 4 bits
- TPC command for scheduled PUSCH (Transmit power control command for scheduled PUSCH — [2] bits
- UL/SUL indicator — 0 or 1 bit A DCI format 0_1 may be used as non-fallback DCI for scheduling the PUSCH, and in this regard, a CRC may be scrambled by the C-RNTI. In an embodiment, the DCI format 0_1 of which CRC is scrambled by the C-RNTI may include a plurality of pieces of information as in [Table 4] below.

TABLE 4

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
    For resource allocation type 0, $\lceil N_{RB}^{UL,BWP}/P \rceil$ bits
    For resource allocation type 1, $\lceil \log_2(N_{RB}^{UL,BWP}(N_{RB}^{UL,BWP}+1)/2) \rceil$ bits
Time domain resource assignment - 1, 2, 3, or 4 bits
VRB-to-PRB mapping - 0 or 1 bit, only for resource allocation type 1.
    0 bit if only resource allocation type 0 is configured;
    1 bit otherwise.
Frequency hopping flag - 0 or 1 bit, only for resource allocation type 1.
    0 bit if only resource allocation type 0 is configured;
    1 bit otherwise.
Modulation and coding scheme - 5 bits
New data indicator - 1 bit
Redundancy version - 2 bits
HARQ process number - 4 bits
1st downlink assignment index - 1 or 2 bits
    1 bit for semi-static HARQ-ACK codebook;
    2 bits for dynamic HARQ-ACK codebook with single HARQ-ACK codebook.
2nd downlink assignment index - 0 or 2 bits
    2 bits for dynamic HARQ-ACK codebook with two HARQ-ACK sub-codebooks;
    0 bit otherwise.
TPC command for scheduled PUSCH - 2 bits
SRS resource indicator - $\left\lceil \log_2\left(\sum_{k=1}^{L_{max}} \Sigma\binom{N_{SRS}}{k}\right) \right\rceil$ or $\lceil \log_2(N_{SRS}) \rceil$ bits
$\left\lceil \log_2\left(\sum_{k=1}^{L_{max}} \Sigma\binom{N_{SRS}}{k}\right) \right\rceil$ bits for non-codebook based PUSCH transmission;
$\lceil \log_2(N_{SRS}) \rceil$ bits for codebook based PUSCH transmission.
Precoding information and number of layers - up to 6 bits
Antenna ports - up to 5 bits
SRS request - 2 bits
CSI request - 0, 1, 2, 3, 4, 5, or 6 bits
CBG transmission information - 0, 2, 4, 6, or 8 bits
PTRS-DMRS association - 0 or 2 bits.
beta offset indicator - 0 or 2 bits
DMRS sequence initialization - 0 or 1 bit A DCI format 1_0 may be used as fallback DCI for scheduling the PDSCH, and in this regard, a CRC may be scrambled by the C-RNTI. In an embodiment, the DCI format 1_0 of which CRC is scrambled by the C-RNTI may include a plurality of pieces of information as in [Table 5] below.

TABLE 5

Identifier for DCI formats - [1] bit
Frequency domain resource assignment -

TABLE 5-continued $\lceil \lceil \log_2(N_{RB}^{DL,BWP}(N_{RB}^{DL,BWP}+1)/2) \rceil \rceil$ bits Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
PUCCH resource indicator 3 bits
PDSCH-to-HARQ feedback timing indicator - [3] bits A DCI format 1_1 may be used as a non-fallback DCI for scheduling the PDSCH, and in this regard, a CRC may be scrambled by the C-RNTI. In an embodiment, the DCI format 1_1 of which CRC is scrambled by the C-RNTI may include a plurality of pieces of information as in [Table 6] below.

TABLE 6

Figure 4:
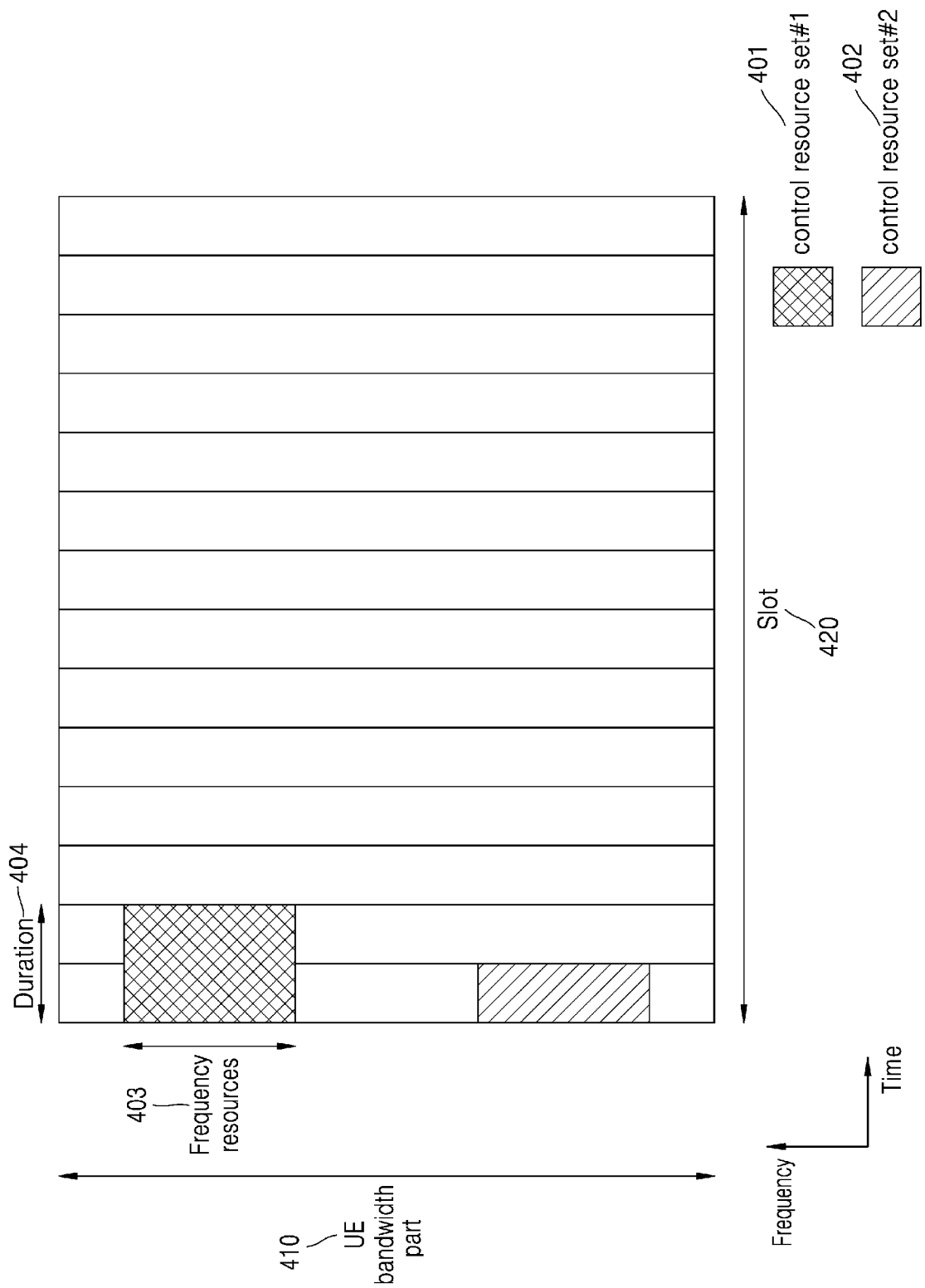
FIG. 4 is a diagram for describing configuration of a control resource set (CORESET) of a downlink (DL) control channel of a mobile communication system according to an embodiment of the disclosure.

Carrier indicator - 0 or 3 bits
Identifier for DCI formats - [1] bits
Bandwidth part indicator - 0, 1 or 2 bits
Frequency domain resource assignment
    For resource allocation type 0, $\lceil N_{RB}^{DL,BWP}/P \rceil$ bits For resource allocation type 1, $\lceil \log_2(N_{RB}^{DL,BWP}(N_{RB}^{DL,BWP}+1)/2) \rceil$ bits Time domain resource assignment - 1, 2, 3, or 4 bits
VRB-to-PRB mapping - 0 or 1 bit, only for resource allocation type 1.
    0 bit if only resource allocation type 0 is configured;
    1 bit otherwise.
PRB bundling size indicator - 0 or 1 bit
Rate matching indicator - 0, 1, or 2 bits
ZP CSI-RS trigger - 0, 1, or 2 bits
For transport block 1:
    Modulation and coding scheme - 5 bits
    New data indicator - 1 bit
    Redundancy version - 2 bits
For transport block 2:
    Modulation and coding scheme - 5 bits
    New data indicator - 1 bit
    Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ feedback timing indicator - 3 bits
Antenna ports - 4, 5 or 6 bits
Transmission configuration indication - 0 or 3 bits
SRS request - 2 bits
CBG transmission information - 0, 2, 4, 6, or 8 bits
CBG flushing out information - 0 or 1 bit
DMRS sequence initialization - 1 bit FIG. 4 is a diagram for describing configuration of a CORESET of aDL control channel of the next-generation mobile communication system according to an embodiment of the disclosure. That is, FIG. 4 illustrates an embodiment of a CORESET in which a DL control channel is transmitted in a 5G wireless communication system according to an embodiment of the disclosure.

Referring to FIG. 4, FIG. 4 illustrates an embodiment in which a UE BWP 410 may be configured on a frequency axis, and two CORESETs (CORESET #1 401 and CORESET #2 402) are configured in one slot 420 on a time axis. The CORESETs 401 and 402 may be configured to a specific frequency resource 403 within the entire UE BWP 410 on the frequency axis. The CORESETs 401 and 402 may be configured as one or more OFDM symbols on the time axis and may be defined as a control resource set duration 404. Referring to FIG. 4, the CORESET #1 401 may be configured as the control resource set duration of two symbols, and the CORESET #2 402 may be configured as the control resource set duration of one symbol.

The CORESET in the afore-described next-generation mobile communication system (the 5G or NR system) may be configured from a BS to a UE via higher layer signaling (e.g., system information, an M, or RRC signaling). Configuring the CORESET to the UE may mean providing information such as an identity of the CORESET, a frequency location of the CORESET, symbol duration of the CORESET, and the like. For example, configuration of the CORESET may include a plurality of pieces of information as shown in [Table 7] below.

as a resource element group (REG) 503. The REG 503 may be defined as 1 OFDM symbol 501 in the time axis, and 1 physical resource block (PRB) 502, that is, 12 subcarriers, in the frequency axis. By concatenating the REG 503, a DL control channel allocation unit may be configured.

Figure 5:
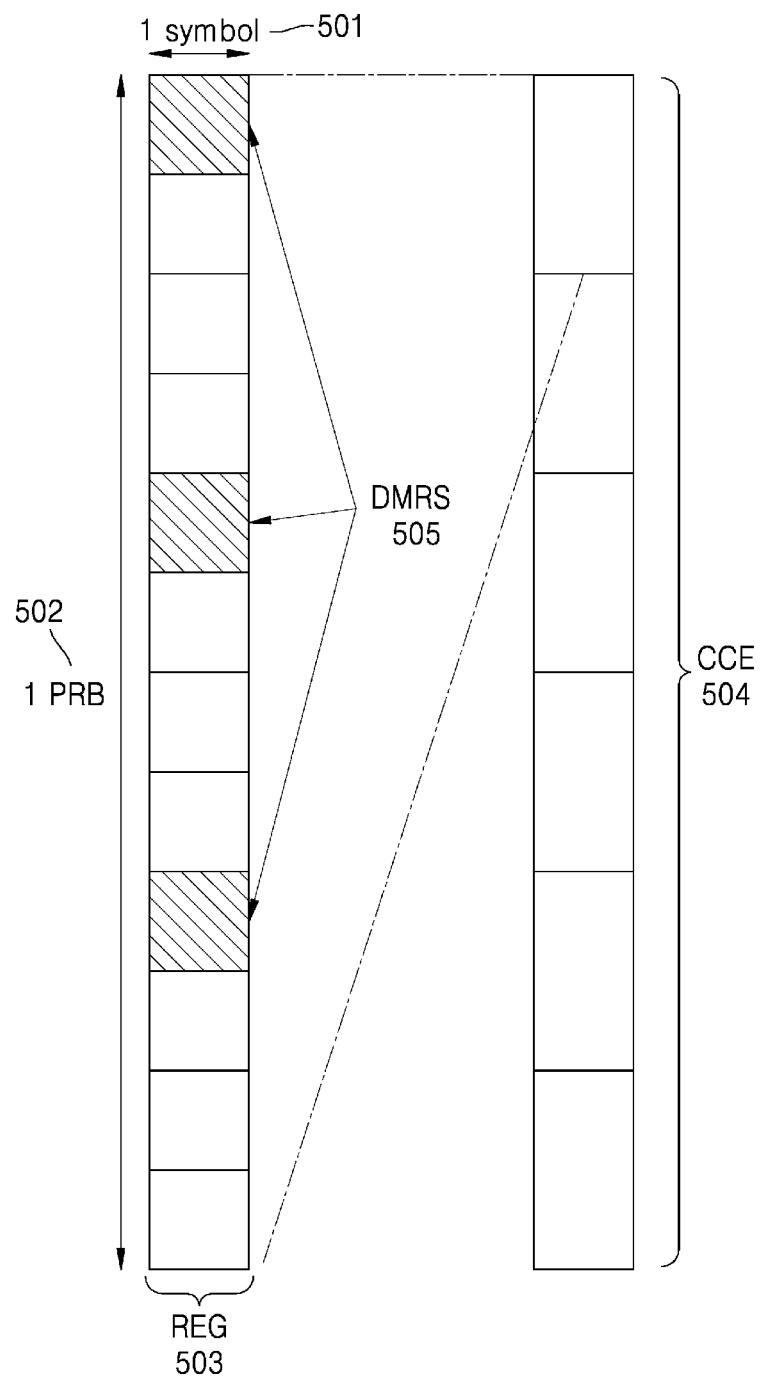
FIG. 5 is a diagram for describing a structure of a DL control channel of a mobile communication system according to an embodiment of the disclosure.

As illustrated in FIG. 5, when the basic unit to which the DL control channel is allocated in the 5G is a control channel element (CCE) 504, one CCE 504 may include a plurality of REGs 503. For example, when the REG 503 illustrated in FIG. 5 includes 12 REs and 1 CCE 504 includes 6 REGs 503, 1 CCE 504 may include 72 REs. When a DL CORESET is configured, the DL CORESET may include a plurality of CCEs 504, and a specific DL control channel may be transmitted after being mapped to one or more CCEs 504 according to an aggregation level AL in the CORESET. The CCEs 504 in the CORESET may be identified by numbers, and in this case, the numbers may be allocated to the CCEs 504 according to a logical mapping scheme.

The basic unit of the DL control channel illustrated in FIG. 5, that is, the REG 503, may include both of REs to which the DCI is mapped and regions to which a DMRS 305, which is a reference signal for decoding the DCI, is mapped. As illustrated in FIG. 5, 3 DMRSs 505 may be transmitted in 1 REG 503. The number of CCEs required to transmit the PDCCH may be 1, 2, 4, 8, or 16 according to the AL, and a different number of CCEs may be used to implement link adaptation of the DL control channel. For example, when AL=L, one DL control channel may be transmitted through L CCEs.

TABLE 7

```
ControlResourceSet ::=              SEQUENCE {
  -- Corresponds to L1 parameter 'CORESET-ID'
  controlResourceSetId              ControlResourceSetId,
  frequencyDomainResources           BIT STRING (SIZE (45)),
  duration                          INTEGER (1..maxCoReSetDuration),
  cce-REG-MappingType                   CHOICE {
    interleaved                     SEQUENCE {
      reg-BundleSize                ENUMERATED {n2, n3, n6},
      precoderGranularity             ENUMERATED {sameAsREG-
      bundle, allContiguousRBs},
      interleaverSize               ENUMERATED {n2, n3, n6}
      shiftIndex
        INTEGER(0..maxNrofPhysicalResourceBlocks-1)
        OPTIONAL
    },
    nonInterleaved                  NULL
  },
  tci-StatesPDCCH                   SEQUENCE(SIZE (1..maxNrofTCI-
    StatesPDCCH)) OF TCI-StateId       OPTIONAL,
  tci-PresentInDCI                  ENUMERATED {enabled}
                                    OPTIONAL, -- Need S
}
```

In [Table 7], tci-StatesPDCCH (referred to as transmission configuration indication (TCI) state) configuration information may include information about one or more SS/PBCH block indices having a quasi co located (QCL) relation with a DMRS transmitted in the corresponding CORESET or a channel state information reference signal (CSI-RS) index.

FIG. 5 is a diagram for describing a structure of a DL control channel of a next-generation mobile communication system according to an embodiment of the disclosure. That is, FIG. 5 is a diagram illustrating an example of a basic unit of time and frequency resources constituting aDL control channel that is usable in 5G according to an embodiment of the disclosure.

Referring to FIG. 5, the basic unit of time and frequency resources constituting the control channel may be referred to The UE has to detect a signal without knowing information about the DL control channel, and a search space indicating a set of CCEs may be defined for blind decoding. The search space refers to a set of DL control channel candidates including CCEs to which the UE has to attempt decoding on a given AL. Because there are various ALs that make 1, 2, 4, 8, and 16 CCEs into one bundle, the UE may have a plurality of search spaces. The search space set may be defined as a set of search spaces at all configured ALs.

The search space may be classified into a common search space and a UE-specific search space. According to an embodiment of the disclosure, a certain group of UEs or all of the UEs may search the common search space of the PDCCH in order to receive common control information such as a paging message or dynamic scheduling for system information.

For example, the UE may receive PDSCH scheduling allocation information for transmission of SIB including cell operator information and the like by searching the common search space of the PDCCH. The common search space may be defined as a set of previously appointed CCEs because a certain group of UEs or all of the UEs have to receive the PDCCH. The UE may receive the UE-specific PDSCH or PUSCH scheduling allocation information by monitoring the UE-specific search space of the PDCCH. The UE-specific search space may be a function of the UE identity and various system parameters, and may be defined in a UE-specific manner.

In the 5G, a parameter for the search space with respect to the PDCCH may be configured from the BS to the UE via higher layer signaling (e.g., SIB, MIB, or RRC signaling). For example, the BS may configure the UE with the number of PDCCH candidates at each AL L, a monitoring period for the search space, a monitoring occasion of symbol units in the slot for the search space, a search space type (common search space or UE-specific search space), a combination of RNTI and DCI format to monitor in the search space, a CORESET index for monitoring the search space, etc. For example, the configuration above may include a plurality of pieces of information as shown in [Table 8] below.

configure the UE with the search space set #1 and the search space set #2, may configure DCI format A scrambled by X-RNTI in the search space set #1 to be monitored in the common search space, and may configure DCI format B scrambled by Y-RNTI in the search space set #2 to be monitored in the UE-specific search space.

According to the configuration information, one or more search space sets may exist in the common search space or the UE-specific search space. For example, search space set #1 and search space set #2 may be configured for the common search space, and search space set #3 and search space set #4 may be configured for the UE-specific search space.

A combination of the following DCI format and RNTI may be monitored in the common search space. However, the disclosure is not limited to an example below.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI

TABLE 8

```
SearchSpace ::=                          SEQUENCE {
-- Identity of the search space. SearchSpaceId = 0 identifies the SearchSpace configured
       via PBCH (MIB) or ServingCellConfigCommon.
    searchSpaceId                        SearchSpaceId,
    controlResourceSetId                 ControlResourceSetId,
    monitoringSlotPeriodicityAndOffset   CHOICE {
        sl1                                  NULL,
        sl2                                  INTEGER (0..1),
        sl4                                  INTEGER (0..3),
        sl5                                  INTEGER (0..4),
        sl8                                  INTEGER (0..7),
        sl10                                 INTEGER (0..9),
        sl16                                 INTEGER (0..15),
        sl20                                 INTEGER (0..19)
    }
                                         OPTIONAL,
    duration                             INTEGER (2..2559)
    monitoringSymbols WithinSlot             BIT STRING (SIZE (14))
                                         OPTIONAL,
    nrofCandidates                       SEQUENCE {
        aggregationLevel1                    ENUMERATED {n0, n1, n2, n3, n4, n5,
        n6, n8},
        aggregationLevel2                    ENUMERATED {n0, n1, n2, n3, n4, n5,
        n6, n8},
        aggregationLevel4                    ENUMERATED {n0, n1, n2, n3, n4, n5,
        n6, n8},
        aggregationLevel8                    ENUMERATED {n0, n1, n2, n3, n4, n5,
        n6, n8},
        aggregationLevel16                   ENUMERATED {n0, n1, n2, n3, n4, n5,
        n6, n8}
    },
    searchSpaceType                      CHOICE {
        -- Configures this search space as common search space (CSS) and DCI formats to
        monitor.
        common                           SEQUENCE {
    }
        ue-Specific                      SEQUENCE {
            -- Indicates whether the UE monitors in this USS for DCI formats 0-0 and 1-0 or
            for
        formats 0-1 and 1-1.
            formats                          ENUMERATED {formats0-0-And-1-0,
            formats0-1-And-1-1},
            ...
        }
```

Based on the configuration information, the BS may configure the UE with one or more search space sets. According to an embodiment of the disclosure, the BS may A combination of the following DCI format and RNTI may be monitored in the UE-specific search space. However, the disclosure is not limited to an example below.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The RNTIs specified above may follow the following definitions and uses.

C-RNTI (Cell RNTI): For UE-specific PDSCH scheduling

TC-RNTI (Temporary Cell RNTI): For UE-specific PDSCH scheduling

CS-RNTI (Configured Scheduling RNTI): For semi-statically configured UE-specific PDSCH scheduling RA-RNTI (Random Access RNTI): For PDSCH scheduling in the random access phase P-RNTI (Paging RNTI): For PDSCH scheduling for transmitting paging SI-RNTI (System Information RNTI): For PDSCH scheduling for transmitting system information INT-RNTI (Interruption RNTI): For notifying whether PDSCH is punctured TPC-PUSCH-RNTI (Transmit Power Control for PUSCH RNTI): For indicating power control command for PUSCH TPC-PUCCH-RNTI (Transmit Power Control for PUCCH RNTI): For indicating power control command for PUCCH TPC-SRS-RNTI (Transmit Power Control for SRS RNTI): For indicating power control command for SRS In an embodiment, the above-described DCI formats may be defined as in [Table 9] below.

TABLE 9

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In an embodiment, in the 5G, a search space of an aggregation level L in a CORESET p and a search space set s may be expressed by using [Equation 1] below.

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \mod \lfloor N_{CCE,p}/L \rfloor \right\} + i \quad \text{[Equation 1]}$$

L: Aggregation Level $n_{c_i}$: Carrier Index $N_{CCE,p}$: A total number of CCEs existing in CORESET p $n_{s,f}^\mu$: Slot Index $M_{p,s,max}^{(L)}$: The number of PDCCH candidates of aggregation level L $m_{s_{nCI}} = 0, \ldots, M_{p,s,max}^{(L)} - 1$: Indices of PDCCH candidates of aggregation level L $Y_{p,n_{s,f}^\mu} = (A_p \cdot Y_{p,n_{s,f}^\mu - 1}) \mod D$, $Y_{p,-1} = n_{RNTI} \neq 0, A_0 = 39827$, $A_1 = 39829, A_2 = 39839, D = 65537$ In an embodiment, a value of Y_(p,nps,f) may correspond to 0 in a case of a common search space.

In an embodiment, a value of Y_(p,nps,f) may correspond to, in a case of a UE-specific search space, a value that varies according to identity of the UE (C-RNTI or ID configured for the UE by the BS) and a time index.

According to an embodiment of the disclosure, in the 5G, a plurality of search space sets may be configured as different parameters (e.g., parameters of [Table 8]). Accordingly, a set of search space sets to be monitored by the UE may be different at each time. For example, when search space set #1 may be configured with X-slot period, search space set #2 may be configured with Y-slot period, and X and Y are different, the UE may monitor both the search space set #1 and the search space set #2 in a particular slot, and may monitor one of the search space set #1 and the search space set #2 in a particular slot.

When a plurality of search space sets are configured for the UE, conditions below may be considered to determine a search space set to be monitored by the UE.

[Condition 1: Limit in Maximum Number of PDCCH Candidates]

The number of PDCCH candidates to be monitored per slot may not exceed Mµ. Mµ may be defined as a maximum number of PDCCH candidates per slot in a cell configured as a subcarrier spacing of 15·2µ kHz, and may be defined as in [Table 10] below.

TABLE 10

| µ | Maximum number of PDCCH candidates per slot and per serving cell ($M^\mu$) |
| --- | --- |
| 0 | 44 |
| 1 | 36 |
| 2 | 22 |
| 3 | 20 |

[Condition 2: Limit in Maximum Number of CCEs]

The number of CCEs constituting an entire search space (here, the entire search space may indicate a set of all CCEs corresponding to an union region of a plurality of search space sets) per slot may not exceed Cp. Cp may be defined as a maximum number of CCEs per slot in a cell configured as a subcarrier spacing of 15·2µ kHz, and may be defined as in [Table 11] below.

TABLE 11

| µ | Maximum number of CCEs per slot and per serving cell ($C^\mu$) |
| --- | --- |
| 0 | 56 |
| 1 | 56 |
| 2 | 48 |
| 3 | 32 |

For convenience of descriptions, a situation that satisfies all the conditions 1 and 2 at a particular time may be defined as "condition A" as an example. Therefore, a case where the condition A is not satisfied may mean that at least one condition of the conditions 1 and 2 is not satisfied.

According to configuration of search space sets by the BS, a case where the condition A is not satisfied at a particular time may occur. When the condition A is not satisfied at a particular time, the UE may select only some of search space sets configured to satisfy the condition A at the corresponding time and perform monitoring, and the BS may transmit PDCCH on a selected search space set.

According to an embodiment of the disclosure, as a method of selecting some search space from among all configured search space sets, a method below may be used.

[Method 1]

When the condition A with respect to PDCCH is not satisfied at a particular time (slot), the US (or the BS) may preferentially select a search space set whose search space type is configured as a common search space to a search space set configured as a UE-specific search space from among search space sets existing in a corresponding time.

interval of slot units between a time when a PDCCH is received and a time when a PUSCH scheduled by the received PDCCH is transmitted, and marked as K2), information about a location and length of a start symbol in a slot on which PDSCH or PUSCH is scheduled, a mapping type of PDSCH or PUSCH, and the like. For example, a plurality of pieces of information as in [Table 12] or [Table 13] below may be notified from the BS to the UE.

TABLE 12

| PDSCH-TimeDomainResourceAllocationList information element |
| --- |
| PDSCH-TimeDomainResourceAllocationList ::=   SEQUENCE (SIZE(1..maxNrofDL-Allocations)) OF PDSCH-TimeDomainResourceAllocation<br>PDSCH-TimeDomainResourceAllocation ::=   SEQUENCE {<br>  k0   INTEGER(0..32)   OPTIONAL, -- Need S<br>  (PDCCH-to-PDSCH Timing, Slot Unit)<br>    mappingType   ENUMERATED {typeA, typeB},<br>  (PDSCH Mapping Type)<br>    startSymbolAndLength   INTEGER (0..127)<br>  (Start Symbol and Length of PDSCH)<br>} |

TABLE 13

| PDSCH-TimeDomainResourceAllocationList information element |
| --- |
| PDSCH-TimeDomainResourceAllocationList ::=   SEQUENCE (SIZE(1..maxNrofDL-Allocations)) OF PDSCH-TimeDomainResourceAllocation<br>PDSCH-TimeDomainResourceAllocation ::=   SEQUENCE {<br>  k02   INTEGER(0..32)   OPTIONAL, -- Need S<br>  (PDCCH-to-PDSCH Timing, Slot Unit)<br>    mappingType   ENUMERATED {typeA, typeB},<br>  (PDSCH Mapping Type)<br>    startSymbolAndLength   INTEGER (0..127)<br>  (Start Symbol and Length of PDSCH)<br>} |

When search space sets configured as the common search space are all selected (i.e., a case the condition A is satisfied even after all search spaces configured as the common search space are selected), the US (or the BS) may select search space sets configured as a UE-specific search space. In this regard, a search space set configured as a UE-specific search space is provided in plural, a search space set having a low search space set index may have a higher priority. In consideration of a priority, the UE or the BS may select UE-specific search space sets up to a range where the condition A is satisfied.

Hereinafter, a method of allocating a time domain resource to a data channel in the next-generation mobile communication system (the 5G or NR system) will now be described.

A BS may configure a UE with Table of time domain resource allocation information about PDSCH and PUSCH via higher layer signaling (e.g., RRC signaling). With respect to the PDSCH, Table consisting of a maximum of maxNrofDL-Allocations=16 entries may be configured, and with respect to the PUSCH, Table consisting of a maximum of maxNrofUL-Allocations=16 entries may be configured. In an embodiment, time domain resource allocation information may include PDCCH-to-PDSCH slot timing (corresponding to a time interval of slot units between a time when a PDCCH is received and a time when a PDSCH scheduled by the received PDCCH is transmitted, and marked as K0), PDCCH-to-PUSCH slot timing (corresponding to a time The BS may notify the UE of one of entries of Table about the time domain resource allocation information via L1 signaling (e.g., DCI) (e.g., may be indicated using a 'time domain resource allocation' field in the DCI). The UE may obtain the time domain resource allocation information about PDSCH or PUSCH, based on the DCI received from the BS.

Hereinafter, a method of measuring and reporting a channel state in the next-generation mobile communication system (the 5G or NR system) will now be described.

Channel state information (CSI) may include channel quality information (CQI), precoding matric indicator (PMI), CSI-RS resource indicator (CRI), SS/PBCH block resource indicator (SSBRI), layer indicator (LI), rank indicator (RI), and/or L1—reference signal received power (RSRP). The BS may control time and frequency resources for CSI measurement and reporting by the UE.

For the CSI measurement and reporting, the UE may be configured, via higher layer signaling, setting information for N(≥1) CSI reports (CSI-ReportConfig), setting information about M(≥1) RS transmission resources (CSI-ResourceConfig), and one or more trigger-state list information (CSI-AperiodicTriggerStateList, CSI-SemiPersistentOnPUSCH-TriggerStateList).

Figure 6:
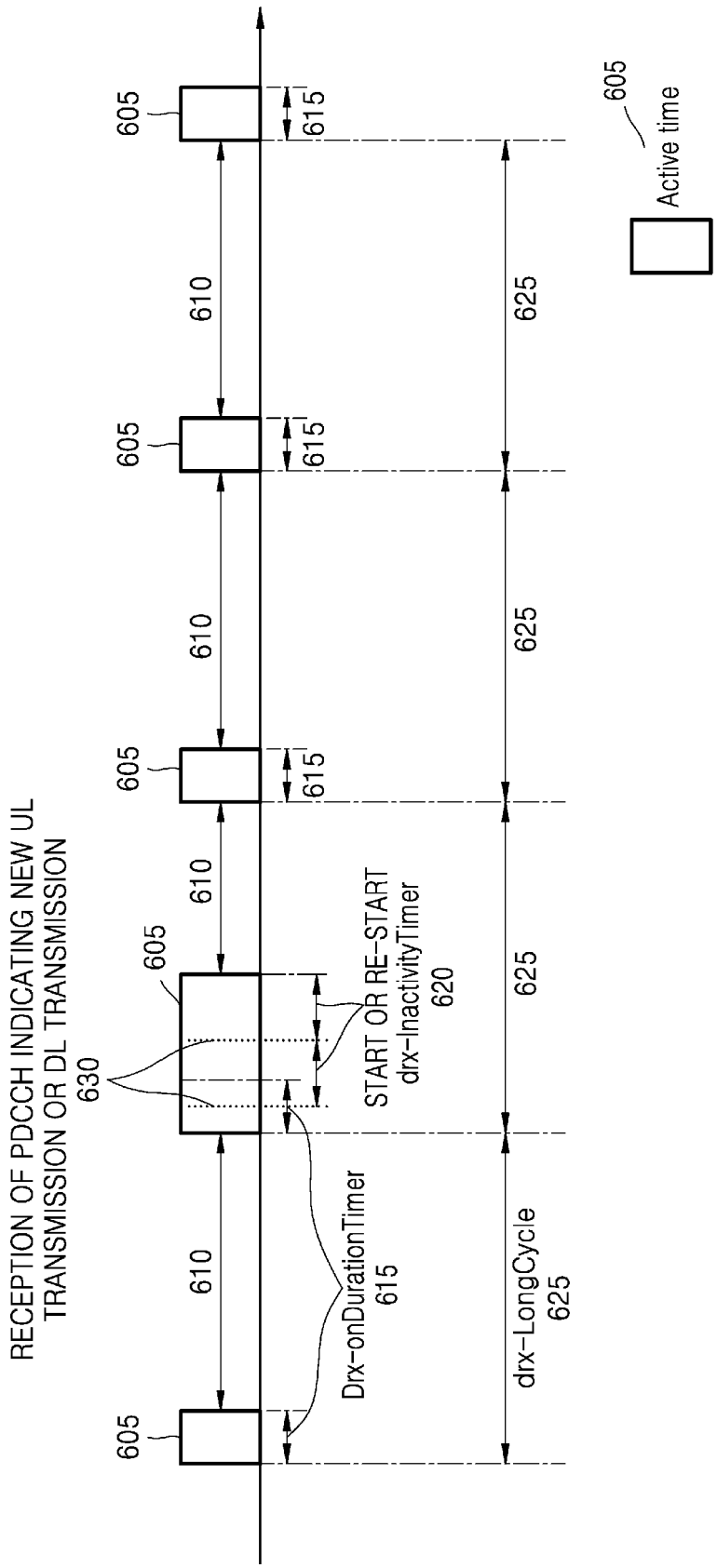
FIG. 6 is a diagram for describing discontinuous reception (DRX) according to an embodiment of the disclosure.

FIG. 6 is a diagram for describing discontinuous reception (DRX) according to an embodiment of the disclosure.

DRX refers to an operation in which a UE using a service discontinuously receives data in an RRC connected state in which a radio link is set between a BS and the UE. When the DRX is applied, the UE may monitor a control channel by turning on a receiver at a particular time, and when there is no received data in a certain period of time, may reduce power consumption of the UE by turning off the receiver. The DRX operation may be controlled by a medium access control (MAC) layer, based on various parameters and a timer.

Referring to FIG. 6, an Active time 605 indicates a time at which the UE wakes up at each DRX cycle so as to monitor a PDCCH. The Active time 605 may be defined as below.

drx-onDurationTimer or drx-InactivityTimer or drx-RetransmissionTimerDL or drx-RetransmissionTimerUL or ra-ContentionResolutionTimer is running; or a Scheduling Request is sent on PUCCH and is pending; or a PDCCH indicating a new transmission addressed to the C-RNTI of the MAC entity has not been received after successful reception of a Random Access Response for the Random Access Preamble not selected by the MAC entity among the contention-based Random Access Preamble drx-onDurationTimer, drx-InactivityTimer, drx-RetransmissionTimerDL, drx-RetransmissionTimerUL, ra-ContentionResolutionTimer, or the like are timers whose values are configured by the BS, and have a function allowing the UE to monitor a PDCCH in a situation where a preset condition is satisfied.

A drx-onDurationTimer 615 is a parameter for configuring a minimum time in which the UE is awake in a DRX cycle. A drx-InactivityTimer 620 is a parameter for additionally configuring a time in which the UE is awake when a PDCCH indicating new UL transmission or DL transmission is received (630). drx-RetransmissionTimerDL is a parameter for configuring a maximum time in which the UE is awake to receive DL retransmission in a DL HARQ procedure. drx-RetransmissionTimerUL is a parameter for configuring a maximum time in which the UE is awake to receive UL retransmission grant in a UL HARQ procedure. drx-onDurationTimer, drx-InactivityTimer, drx-RetransmissionTimerDL and drx-RetransmissionTimerUL may be configured as a time, the number of subframes, the number of slots, and the like. ra-ContentionResolutionTimer is a parameter for monitoring a PDCCH in a random access procedure.

inActive time 610 refers to a time of the DRX operation which is configured not to monitor a PDCCH or a time of the DRX operation which is configured not to receive a PDCCH, and may correspond to a remaining time excluding the Active time 605 from an entire time in which the DRX operation is performed. When the UE does not monitor a PDCCH in the Active time 605, the UE may enter a sleep or inActive state, and thus, may reduce power consumption.

A DRX cycle refers to a cycle at which the UE wakes up to monitor a PDCCH. That is, the DRX cycle refers to a time interval or on duration occurrence period up to a next PDCCH is to be monitored after the UE monitors a PDCCH. The DRX cycle may have two types of a short DRX cycle and a long DRX cycle. The short DRX cycle may be optionally applied.

A Long DRX cycle 625 is a long cycle from among the two DRX cycles configured for the UE. When the UE operates in Long DRX, the UE re-starts a drx-onDurationTimer 615 at a time after an elapse of the Long DRX cycle 625 from a start point (e.g., a start symbol) of the drx-onDurationTimer 615. The short DRX cycle will be described with reference to FIG. 7.

When operating in the Long DRX cycle 625, the UE may start the drx-onDurationTimer 615 in a slot after drx-SlotOffset in a subframe that satisfies [Equation 2] below. Here, drx-SlotOffset indicates a delay before the start of the drx-onDurationTimer 615. drx-SlotOffset may be configured as, for example, a time, the number of slots, and the like.

$$[(SFN \times 10) + \text{subframe number}] \text{modulo}(drx\text{-Long-Cycle}) = drx\text{-StartOffset} \qquad \text{[Equation 2]}$$

Here, the Long DRX cycle 625 and drx-StartOffset (e.g., drx-LongCycleStartOffset) may be used to define a subframe for starting the Long DRX cycle 625. drx-StartOffset (e.g., drx-LongCycleStartOffset) may be configured as a time, the number of subframes, the number of slots, and the like.

Figure 7:
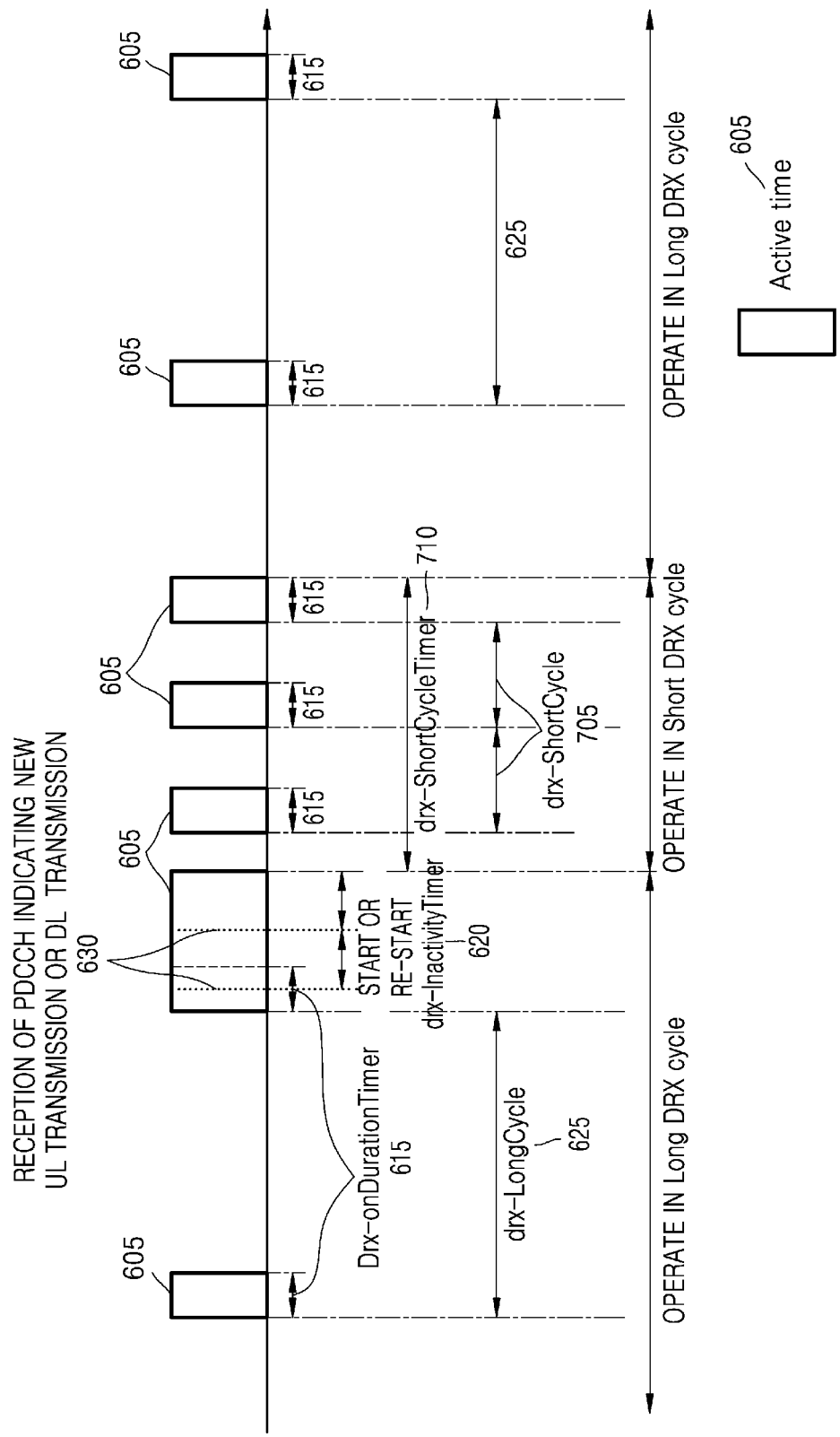
FIG. 7 is a diagram for describing Long DRX and Short DRX according to an embodiment of the disclosure.

FIG. 7 is a diagram for describing Long DRX and Short DRX according to an embodiment of the disclosure.

Referring to FIG. 7, a Short DRX cycle 705 is a short cycle among two DRX cycles defined for a UE. While the UE operates in the Long DRX cycle 625, when a preset event, e.g., a case of receiving a PDCCH for indicating new UL transmission or DL transmission (630) occurs in the Active time 605, the UE starts or re-starts the drx-InactivityTimer 620 and operates in the short DRX cycle 705. In more detail, the UE starts a drx-ShortCycleTimer 710 when the drx-onDurationTimer 615 or the drx-InactivityTimer 620 is ended, and operates in a short DRX cycle before the drx-ShortCycleTimer 710 is ended. A drx-ShortCycleTimer may start or re-start by a MAC control element (MAC CE) indicated by a BS. When the UE receives the PDCCH for indicating new UL transmission or DL transmission (630), the UE may extend the Active Time 605 or may delay a start of the inActive time 610 as the UE expects additional UL transmission or DL transmission at a later time. While the UE operates in short DRX, the UE re-starts the drx-onDurationTimer 615 at a time after an elapse of a short DRX cycle from a start of previous On duration. Afterward, when the drx-ShortCycleTimer 710 is ended, the UE operates in the Long DRX cycle 625 again.

When the UE operates in the Short DRX cycle 705, the UE may start the drx-onDurationTimer 615 after drx-SlotOffset in a subframe that satisfies [Equation 3] below. Here, drx-SlotOffset indicates a delay before the drx-onDurationTimer 615 is started. drx-SlotOffset may be configured as a time, the number of slots, and the like.

$$[(SFN \times 10) + \text{subframe number}] \text{modulo}(drx\text{-Short-Cycle}) = (drx\text{-StartOffset}) \text{modulo}(drx\text{-ShortCycle}) \qquad \text{[Equation 3]}$$

Here, drx-ShortCycle and drx-StartOffset may be used to define a subframe where the Short DRX cycle 705 is to start. drx-ShortCycle and drx-StartOffset may be configured as a time, the number of subframes, and the like.

In order to reduce power consumption of the UE in the next-generation mobile communication system (the 5G or NR system), various transception-related parameters may be adjusted via Layer 1 (L1) signaling. For example, the afore-described L1 signaling for reduction of power consumption of the UE may control at least one parameter or a combination of one or more parameters as in [Table 14] below.

TABLE 14

PDCCH-related configuration parameter (PDCCH monitoring occasion, the
number of times blind decoding is performed, aggregation level (AL),
monitoring occasion, indicator indicating whether to perform PDCCH
monitoring, etc.)
BWP-related configuration parameter (BWP index, bandwidth size of BWP,
etc.)
CA-related configuration parameter (CC index, indicator of CC activation or
inactivation, etc.)
DRX-related configuration parameter (DRX cycle, CRX timer-related
parameter (onDurationTimer, InactivityTimer, HARQ-RTT-Timer,
RetransmissionTimer, etc.)
Antenna-related configuration information (the number of layers, the number of
antenna ports, the number of antenna panels, etc.)
Time domain resource allocation-related configuration information (PDCCH-
to-PDSCH timing K0, PDCCH-to PUSCH timing K2)
HARQ timing-related configuration information (PDSCH-to-HARQ timing)
CSI-RS configuration information
UL power control information
Other configuration information related to transmission and reception However, the disclosure is not limited to the above example, and in the disclosure below, various parameters and a plurality of pieces of information which can be included in a L1 signal transmitted for reduction of power consumption will now be further described.

According to an embodiment of the disclosure, the afore-described L1 signal transmitted for reduction of power consumption of the UE may be referred to as a power saving signal (POSS). However, the disclosure is not limited to the above example, and the POSS may be expressed as various names including a power control signal, a power configuration signal, and the like.

Also, according to an embodiment of the disclosure, the POSS may include a POSS (e.g., a Wake Up Signal or uni-POSS) being monitored by the UE in inActive time and a POSS (e.g., Go To sleep Signal or uni-POSS) being monitored by the UE in Active time.

In the disclosure below, provided are configuration of a POSS, and operating method of a BS and UE therefor. For example, in the disclosure below, provided are a type of a POSS, a structure of DCI corresponding to a POSS, contents (information, parameters) of DCI corresponding to a POSS, a method of monitoring a POSS, a PDCCH monitoring method of a UE according to a POSS, a change in PDCCH monitoring configuration by a UE according to a POSS, an operation performed when a POSS is not received, and the like. Through a POSS provided in the disclosure, power consumption of the UE due to PDCCH monitoring may be minimized.

Hereinafter, embodiments of the disclosure will now be described in detail with reference to accompanying drawing. Hereinafter, embodiments of the disclosure will now be described with reference to the 5G system, but embodiments of the disclosure are also applicable to other communication systems having similar technical backgrounds or channel structure. For example, the other communication systems having similar technical backgrounds or channel structure may include LTE or LTE-A mobile communication, and mobile communication technologies developed after 5G. Accordingly, embodiments of the disclosure may be applied to other communication systems through modification at the discretion of one of ordinary skill in the art without greatly departing from the scope of the disclosure.

In the descriptions of the disclosure, detailed explanations of the related art are omitted when it is deemed that they may unnecessarily obscure the essence of the disclosure. The terms used in the specification are defined in consideration of functions used in the disclosure, and can be changed according to the intent or commonly used methods of users or operators. Accordingly, definitions of the terms are understood based on the entire descriptions of the present specification.

First Embodiment

As described above, configuration information of a POSS may be provided from the BS to the UE via higher layer signaling (RRC signaling, MIB, or SIB). The UE monitors a PDCCH, based on the configuration information of the POSS provided from the BS, and thus, may detect DCI corresponding to the POSS.

In the first embodiment below, a case will now be described, in which a POSS provided in Active time and a POSS provided in inActive time are different. In more detail, according to an embodiment of the disclosure, the BS may configure the UE to detect DCIs respectively corresponding to different POSSs in Active time and inActive time of the UE.

Figure 8:
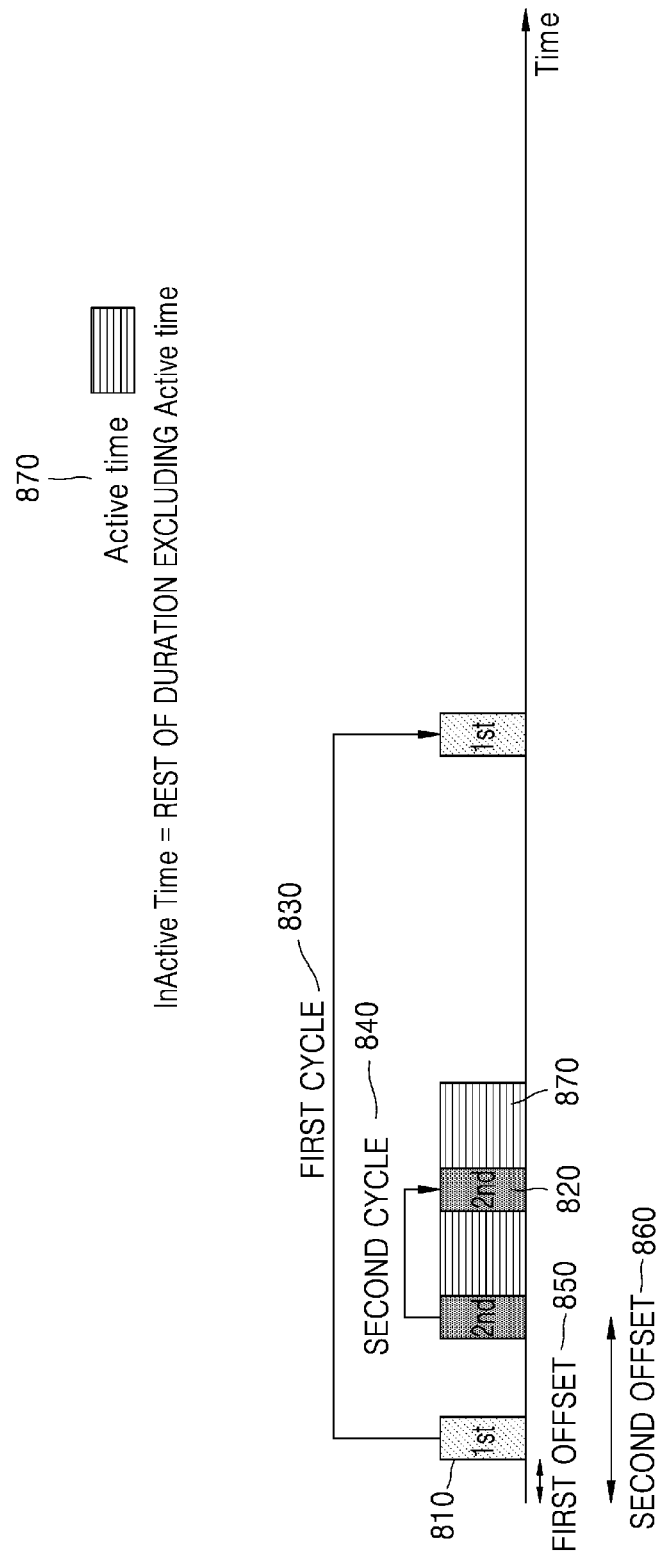
FIG. 8 is a diagram for describing a Wake-Up Signal (WUS) monitored in Active time, and a Go-to-Sleep signal (GTS) monitored in inActive time.

Referring to FIG. 8, the UE may detect 1st-type DCI 810 in inActive time, and may detect 2nd-type DCI 820 in Active time 870. That is, the UE may detect the 1st-type DCI 810 by monitoring a PDCCH in inActive time, and may detect the 2nd-type DCI 820 by monitoring a PDCCH in Active time 870. According to an embodiment of the disclosure, the meaning of different types may indicate at least one of a case where formats of DCIs are different or a case where RNTIs being used to scramble DCI are different.

According to an embodiment of the disclosure, time duration configured for the UE to wake up to monitor a PDCCH may be referred to as Active time 870, and a time excluding Active time 870 may be referred to as inActive time.

According to an embodiment of the disclosure, the 1st-type DCI 810 may be configured to have a first cycle 830, and the 2nd-type DCI 820 may be configured to have a second cycle 840. The UE may perform monitoring, based on a configured cycle. The first cycle 830 and the second cycle 840 may be same or different. Also, the first cycle 830 and the second cycle 840 may be configured to be associated with each other. For example, the first cycle 830 may be configured to be a preset multiple of the second cycle 840 or to be generated via a formula, or vice versa. However, the disclosure is not limited to the above example, and the first cycle 830 and the second cycle 840 may be independently configured.

According to an embodiment of the disclosure, particular time duration in which DCI corresponding to a POSS can be received is called an occasion, and a cycle of DCI corresponding to a POSS may include all of a cycle of an occasion or a monitoring occasion for detecting DCI corresponding to a POSS. Configuration of cycles of the 1st-type DCI 810 and the 2nd-type DCI 820 will be further described in detail in a third embodiment and a fourth embodiment.

Also, the 1st-type DCI 810 may be configured to have first offset 850, and the 2nd-type DCI 820 may be configured to have second offset 860. The UE may perform monitoring, based on configured offset. Also, the first offset 850 and the second offset 860 may be configured to be associated with each other. For example, the first offset 850 may be configured to be a preset multiple of the second offset 860 or to be generated via a formula, or vice versa. However, the disclosure is not limited to the above example, and the first offset 850 and the second offset 860 may be independently configured. Offset may indicate a location difference or time difference from a reference point or reference point of time to a preset point or point of time. A configuration of offset of the 1st-type DCI 810 and the 2nd-type DCI 820 will be further described in detail in the third embodiment and the fourth embodiment. According to an embodiment of the disclosure, offset may be called start offset, and hereinafter, for convenience of descriptions, it is offset.

According to an embodiment of the disclosure, the 1st-type DCI 810 may be called a Go to Sleep signal (GTS). However, the disclosure is not limited to the above example, and DCI corresponding to a POSS the UE detects by monitoring a PDCCH in Active time may be referred to as a PDCCH adaptation signal, a POSS, a power saving command, a power control signal, or an OndurationTimer deactivation signal. That is, there is no limit in a name of the DCI corresponding to the POSS detected by the UE via monitoring in Active time. Hereinafter, for convenience of descriptions, the DCI corresponding to the POSS detected by the UE via monitoring in Active time is referred to as a GTS.

According to an embodiment of the disclosure, the 2nd-type DCI 820 may be called a Wake Up Signal (WUS). However, the disclosure is not limited to the above example, and DCI corresponding to a POSS detected by the UE via monitoring in inActive time may be referred to as a power control signal, a DRX activation signal, an on Duration activation signal, or an on Duration Timer activation signal. That is, there is no limit in a name of the DCI corresponding to the POSS detected by the UE via monitoring in inActive time. Hereinafter, for convenience of descriptions, the DCI corresponding to the POSS detected by the UE via monitoring in inActive time is referred to as WUS.

According to an embodiment of the disclosure, a GTS and a WUS may be different DCIs, and contents (or information, parameter) included in respective DCIs may be different.

First-1 Embodiment

According to an embodiment of the disclosure, a WUS and a GTS may have different DCI formats. For example, a WUS may have DCI format A, and a GTS may have DCI format B. In an embodiment, DCI formats A and B may be DCI formats that are newly defined to be different from legacy DCI formats (e.g., DCI formats 0_0, 0_1, 1_0, 1_1, 2_0, 2_1, 2_2, 2_3), or may be legacy formats.

First-2 Embodiment

According to an embodiment of the disclosure, a WUS and a GTS may be scrambled by different RNTIs. In detail, a WUS may be scrambled by WUS-RNTI, and a GTS may be scrambled by GTS-RNTI. However, names of RNTIs to scramble a WUS and a GTS are not limited to the above example, and thus, may be referred to as POSS-RNTI or PS-RNTI. RNTIs to scramble a WUS and a GTS may be newly-defined RNTIs, or legacy RNTIs may be used.

The UE may receive a WUS and a GTS, assuming that the WUS is scrambled by WUS-RNTI and the GTS is scrambled by GTS-RNTI. That is, the WUS may be de-scrambled by the WUS-RNTI, and the GTS may be de-scrambled by the GTS-RNTI. RNTIs to scramble a WUS and a GTS will be further described in detail in the third embodiment and the fourth embodiment.

Also, according to an embodiment of the disclosure, when DRX is configured for the UE, UE-PDCCH monitoring operations with respect to WUS-RNTI and GTS-RNTI may be different from each other. For example, the UE may constantly perform a PDCCH monitoring operation on a DCI format scrambled by WUS-RNTI, regardless of DRX Active time or DRX inactive time. According to an embodiment of the disclosure, a PDCCH monitoring operation with respect to WUS-RNTI may be performed based on search space configuration (or configuration of a monitoring occasion with respect to WUS) configured for the UE.

Also, according to an embodiment of the disclosure, the UE may perform, only in DRX inactive time, a PDCCH monitoring operation on a DCI format scrambled by WUS-RNTI. Here, the PDCCH monitoring operation with respect to WUS-RNTI may be performed on monitoring occasions existing in a DRX inActive time region from among WUS monitoring occasions based on search space configuration (or configuration of a monitoring occasion with respect to WUS) configured for the UE.

The UE may perform, only in DRX Active time, a PDCCH monitoring operation on a DCI format scrambled by GTS-RNTI. Here, the PDCCH monitoring operation with respect to GTS-RNTI may be performed on monitoring occasions existing in a DRX Active time region from among GTS monitoring occasions based on search space configuration (or configuration of a monitoring occasion with respect to a GTS) configured for the UE. Alternatively, an operation being equal thereto may be expressed as below.

The MAC entity may be configured by RRC with a DRX functionality that controls the UE's PDCCH monitoring activity for the MAC entity's GTS-RNTI, C-RNTI, CS-RNTI, INT-RNTI, SFI-RNTI, SP-CSI-RNTI, TPC-PUCCH-RNTI, TPC-PUSCH-RNTI, and TPC-SRS-RNTI. When using DRX operation, the MAC entity shall also monitor PDCCH according to requirements found in other subclauses of this specification. When in RRC_CONNECTED, if DRX is configured, for all the activated Serving Cells, the MAC entity may monitor the PDCCH discontinuously using the DRX operation specified in this subclause; otherwise the MAC entity shall monitor the PDCCH continuously.

First-3 Embodiment

In order to decrease complexity of the UE due to DCI decoding, the next-generation mobile communication system (the 5G or NR system) may limit the number of DCIs to a particular number or less, the DCIs having different sizes to be monitored by the UE at a particular time. For example, the next-generation mobile communication system (the 5G or NR system) may always satisfy both two conditions below. However, the disclosure is not limited thereto.

[Condition 1]

The UE may monitor a maximum of X DCIs having different sizes per slot (e.g., X=4).

[Condition 2]

The UE may monitor a maximum of Y DCIs having different sizes per slot with respect to a particular RNTI. For example, the particular RNTI may indicate C-RNTI, CS-RNTI, MCS-C-RNTI, or other UE-specific RNTI (e.g., Y=3).

According to an embodiment of the disclosure, the BS may appropriately adjust a DCI size to satisfy [Condition 1] and [Condition 2] described above. The UE may not expect configuration of a DCI size that does not satisfy [Condition 1] and [Condition 2] described above. A size of a frequency-axis resource allocation field of DCI format 0_0/1_0 being monitored in a UE-specific search space may be determined as a size of a currently-activated BWP. However, in a case where a size of DCI format 0_0/1_0 being monitored in the UE-specific search space is determined as the size of the currently-activated BWP, and the afore-described conditions of the DCI size limit are not satisfied, the size of the frequency-axis resource allocation field of the corresponding DCI format 0_0/1_0 may be determined as a size of an initial BWP. That is, a size of DCI format 0_0/1_0 being monitored in a common search space, and a size of DCI format 0_0/1_0 being monitored in a UE-specific search space become equal, and thus, the number of DCIs having different sizes may be decreased.

Figure 9:
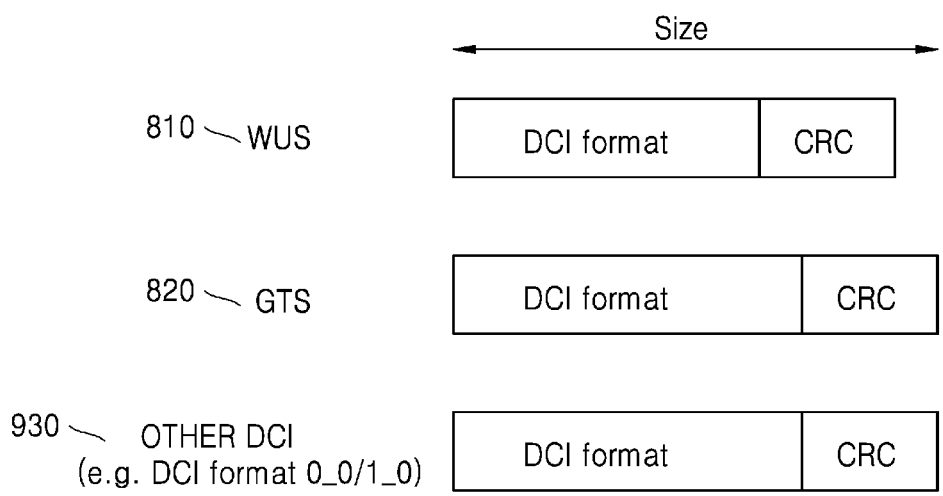
FIG. 9 is a diagram for describing a downlink control information (DCI) format and size of a WUS and a GTS according to an embodiment of the disclosure.

According to an embodiment of the disclosure, a WUS and a GTS may be different in sizes of DCIs. In detail, sizes of a frequency-axis resource allocation field of a WUS 810 and a GTS 820 may be different from each other. Referring to FIG. 9, the WUS 810 may be configured to be smaller than the GTS 820. However, the disclosure is not limited thereto, and the WUS 810 may be configured to be larger than the GTS 820.

Also, referring to FIG. 9, the GTS 820 may have a size corresponding to a legacy DCI format (e.g., DCI format 0_0/1_0), and the WUS 810 may have a size different from the legacy DCI format (e.g., DCI format 0_0/1_0). The size of the frequency-axis resource allocation field of the DCI format 0_0/1_0 may be determined as the size of the currently-activated BWP, but the disclosure is not limited thereto.

According to an embodiment of the disclosure, as the GTS 820 is transmitted in Active time, the GTS 820 may be configured to have a size equal to other DCI format 930 (e.g., the DCI format 0_0/1_0) being transmitted together. In order to align sizes of DCIs being transmitted, when a size of the GTS 820 is smaller than other DCI format 930, 0 may be inserted (zero-padding), and when the size of the GTS 820 is larger than other DCI format 930, a bit corresponding to some fields may be truncated. Alternatively, when Condition 1 or Condition 2 described above is not satisfied, the size of the GTS 820 may be aligned to have a same size as other DCI format 930 (e.g., the DCI format 0_0/1_0).

Also, according to an embodiment, as the WUS 810 is transmitted in inActive time, the WUS 810 may be configured to have a size equal to other DCI format 930. Even when Condition 1 or Condition 2 described above is not satisfied, the size of the WUS 810 may not be aligned to have a same size as other DCI format 930 (e.g., the DCI format 00/10).

Alternatively, when Condition 1 or Condition 2 described above is not satisfied, the size of the WUS 810 may be aligned to have a same size as other DCI format 930 (e.g., the DCI format 0_0/1_0). The size of the WUS 810 may be aligned by inserting 0 or truncating a bit corresponding to some fields. The sizes of the WUS 810 and the GTS 820 may be aligned, such that the number of times the UE performs blind decoding with respect to a search space may be decreased and thus power of the UE may be reduced.

First-4 Embodiment

As described above, the BS may transmit the WUS 810 and the GTS 820 to the UE. Also, the BS may configure the UE with a CORESET and a search space for transmitting a WUS and a GTS to the UE.

Figure 10:
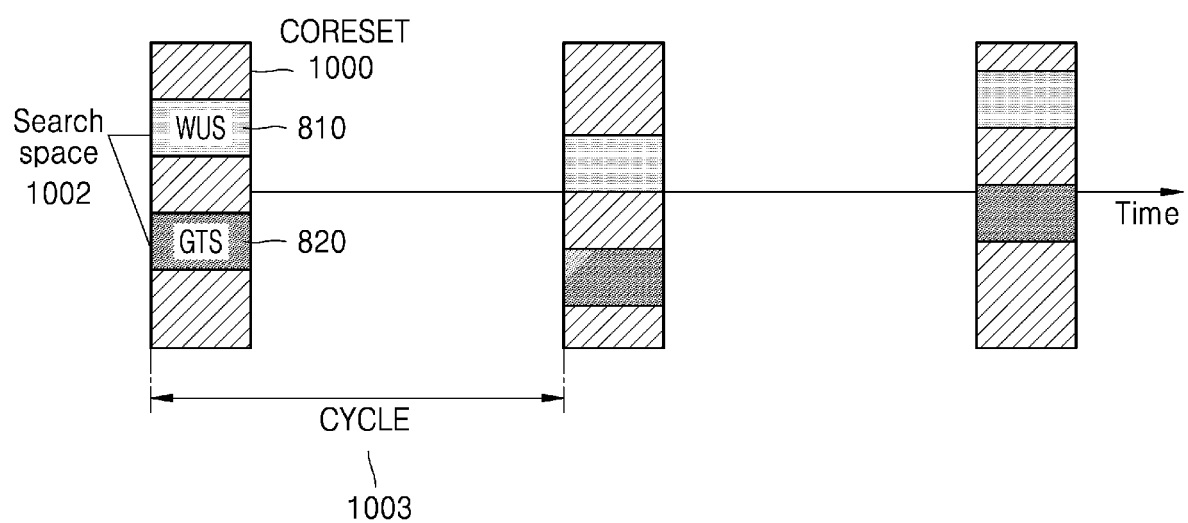
FIG. 10 is a diagram for describing a search space in which a WUS and a GTS are monitored according to an embodiment of the disclosure.

Referring to FIG. 10, a CORESET 1000 configured for the UE by the BS to transmit the WUS 810 and the GTS 820 may be a CORESET (a CORESET whose CORESET ID is 0 or CORESET #0) configured via MIB, or may be a CORESET configured via higher layer signaling (e.g., MIB, SIB, RRC signaling, etc.).

Also, according to an embodiment of the disclosure, the CORESET 1000 configured for the UE by the BS to transmit the WUS 810 and the GTS 820 may exist only in a particular BWP. The particular BWP may be an initial BWP configured via SIB or may be a default BWP from among a BWP configured via higher layer signaling or a BWP configured by the BS, and may exist in each BWP. Also, according to an embodiment of the disclosure, the CORESET 1000 for transmitting the WUS 810 and the CORESET 1000 for transmitting the GTS 820 may be equal or different.

Also, the BS may configure, via higher layer signaling, the UE with a search space 602 for transmitting the WUS 810 and the GTS 820. For example, the BS may configure the UE with search space parameters (i.e., a monitoring occasion and offset in a slot unit, a monitoring occasion in a symbol unit, the number of PDCCH candidates for each AL, a search space type, a DCI format, etc.) listed in [Table 8].

For example, the BS may configure a search space for transmitting the WUS 810 and the GTS 820 as a common search space (CSS), a group common search space (GCSS), a UE-specific search space (USS), or at least one of the CSS, the GCSS, and the USS. The UE may monitor the WUS 810 and the GTS 820 in a configured search space.

When the BS configures a search space for transmitting the WUS 810 and the GTS 820 as the CSS, $Y\_(p,n\mu s,f)$ from among parameters for determining the search space may be 0, when the CSS or the GCSS is configured, a value of $Y\_(p,n\mu s,f)$ may be a value corresponding to a group-common RNTI (e.g., GC-RNTI), when the USS is configured, a value of $Y\_(p,n\mu s,f)$ may be a value that changes according to an identity of the UE (C-RNTI or ID the BS configures for the UE) and a time index.

Referring to FIG. 10, a search space 1002 for transmitting the WUS 810 and the search space 1002 for transmitting the GTS 820 may be different. However, the disclosure is not limited to the above example, and the search space 1002 for transmitting the WUS 810 and the GTS 820 may be same. The UE may monitor the WUS 810 and the GTS 820, based on the search space 1002 configured by the BS.

First-5 Embodiment

According to an embodiment of the disclosure, when different DCI formats have a same size and/or RNTI, the BS may transmit DCI including ID information so as to allow the UE to easily identify a DCI format.

Figure 11:
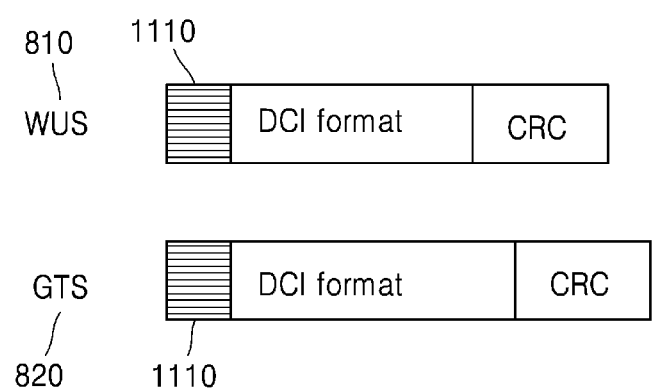
FIG. 11 is a diagram for describing DCI identification information according to an embodiment of the disclosure.

Referring to FIG. 11, the WUS 810 and the GTS 820 may each include ID information 1110 for identifying a DCI format. The ID information 1110 of FIG. 10 for identifying a DCI format may be information for identifying whether it is the WUS 810 or the GTS 820, or may be information for identifying respective DCI formats of the WUS 810 and the GTS 820. However, the disclosure is not limited to the above example.

Also, the ID information 1110 for identifying a DCI format may be 1 bit or a plurality of bits, and the disclosure is not limited to the above example.

The afore-described embodiments of the WUS 810 and the GTS 820 are all independent, and the embodiments may be combined with one another. For example, DCI sizes of the WUS 810 and the GTS 820 may be equal or different, formats of the WUS 810 and the GTS 820 may be equal or different, RNTIs that scramble the WUS 810 and the GTS 820 may be equal or different, CORESETs configured for monitoring the WUS 810 and the GTS 820 may be equal or different, search spaces may be equal or different, and each of the WUS 810 and the GTS 820 may include or may not include the ID information 1110 for identifying a DCI format.

A method of controlling configuration of each of the WUS 810 and the GTS 820 and PDCCH monitoring configuration will be further described in detail in the third embodiment and the fourth embodiment below.

Second Embodiment

As described above, configuration information about a POSS may be provided from the BS to the UE via higher layer signaling (RRC signaling, MIB, or SIB). The UE may detect DCI corresponding to a POSS by monitoring a PDCCH, based on configuration information about the POSS provided from the BS.

Hereinafter, in the second embodiment below, provided is a method by which the UE monitors one same POSS in Active time and inActive time. In more detail, according to an embodiment of the disclosure, the BS may configure the UE to detect DCI corresponding to a POSS of a same type in Active time and inActive time.

Figure 12:
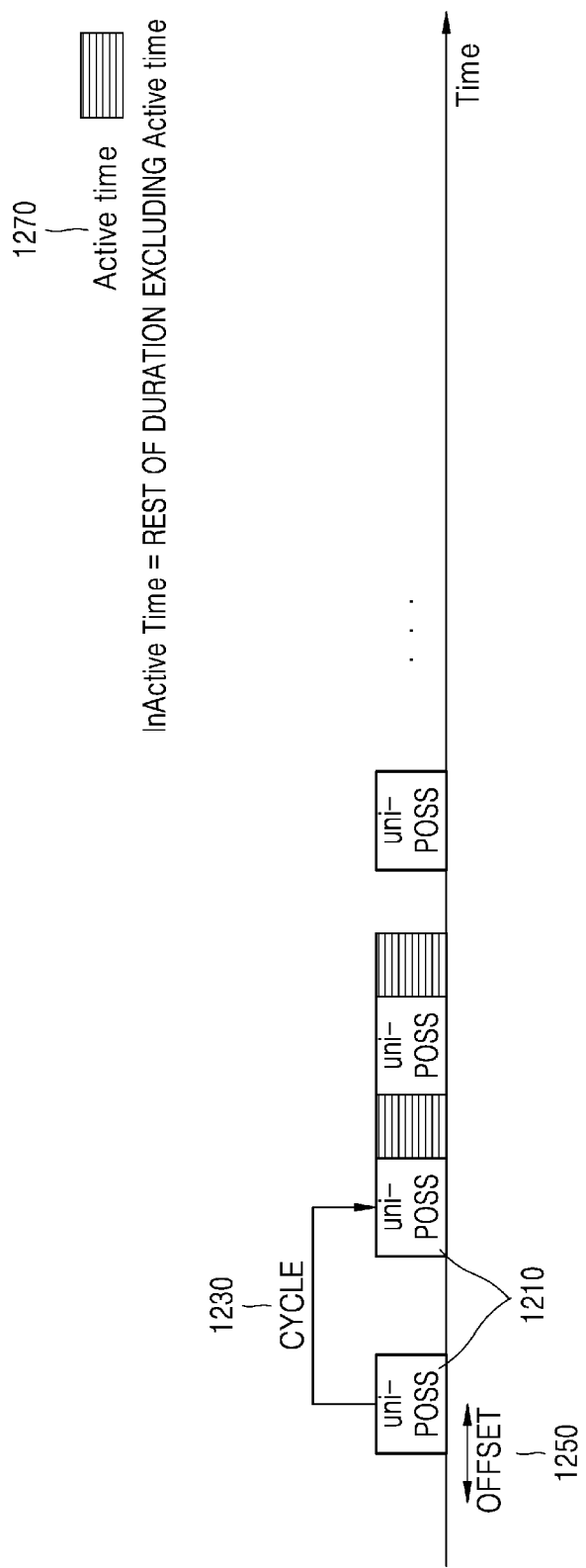
FIG. 12 is a diagram for describing a unified-POwer Saving Signal (uni-POSS) according to an embodiment of the disclosure.

Referring to FIG. 12, the UE may detect DCI 1210 corresponding to a POSS of a same type in inActive time and Active time 1270. The DCI 1210 that corresponds to a POSS the UE detects by monitoring a PDCCH in inActive time and Active time 1270 may be referred to as a unified power saving signal (uni-POSS) 1210. According to an embodiment of the disclosure, the meaning of a same type indicate at least one of a case where DCI formats are same or a case where RNTIs used to scramble DCIs are same.

However, a name of the DCI 1210 that corresponds to a POSS the UE monitors and detects in inActive time and Active time 1270 is not limited to the above example, and may be referred to as a PDCCH adaptation signal, may be referred to as a POSS, may be referred to as a power saving command, may be referred to as a power control signal, or may be referred to as a WUS or a GTS. That is, there is no limit in the name of the DCI 1210 that corresponds to a POSS the UE monitors and detects in inActive time and Active time 1270. Hereinafter, for convenience of descriptions, the DCI 1210 that corresponds to a POSS the UE monitors and detects in inActive time and Active time 1270 is referred to as a uni-POSS 1210.

Second-1 Embodiment

According to an embodiment of the disclosure, the uni-POSS 1210 may be configured to have a preset cycle 1230. In other words, the uni-POSS 1210 may be transmitted in a cycle of a preset occasion. An occasion may indicate particular time duration in which DCI is transmitted.

The UE may perform monitoring based on a configured cycle. Also, according to an embodiment, a cycle of the uni-POSS 1210 in Active time 1270 and a cycle in inActive time may be equal or different. Also, a cycle of the uni-POSS 1210 may be configured as one cycle, regardless of the cycle in Active time 1270 and inActive time.

Also, a cycle of the uni-POSS 1210 in Active time 1270 and a cycle in inActive time may be configured to be associated with each other. A cycle of the uni-POSS 1210 in Active time 1270 may be configured to be a preset multiple of a cycle in inActive time or to be generated via a formula, or vice versa.

Also, according to an embodiment of the disclosure, the uni-POSS 1210 may be configured to have preset offset 1250. The UE may perform monitoring based on the configured offset 1250. The offset 1250 of the uni-POSS 1210 in Active time 1270 and the offset 1250 in inActive time may be equal or different. Also, the offset 1250 of the uni-POSS 1210 may be configured as one offset 1250, regardless of Active time 1270 and inActive time.

Also, the offset 1250 of the uni-POSS 1210 in Active time 1270 and the offset 1250 in inActive time may be configured to be associated with each other. The offset 1250 of the uni-POSS 1210 in Active time 1270 may be configured to be a preset multiple of the offset 1250 in inActive time or to be generated via a formula, or vice versa. However, the disclosure is not limited to the above example.

Also, according to an embodiment of the disclosure, a cycle and offset of the uni-POSS 1210 in inActive time may be configured in a same manner as a WUS, and may be configured to be equal to Active time, in inActive time of the uni-POSS 1210. This will be further described in detail in the third embodiment and the fourth embodiment.

Also, according to an embodiment of the disclosure, the uni-POSS 1210 may be configured to have a same cycle and offset in inActive time and Active time of the uni-POSS 1210.

Second-2 Embodiment

According to an embodiment of the disclosure, a uni-POSS may be a DCI format that is newly defined to be different from legacy DCI formats (e.g., DCI formats 0_0, 0_1, 1_0, 1_1, 2_0, 2_1, 2_2, 2_3). Also, according to an embodiment of the disclosure, the uni-POSS may be a legacy DCI format. The UE may be configured by the BS so as to detect a uni-POSS having one DCI format in inActive time and Active time.

Second-3 Embodiment

According to an embodiment of the disclosure, a uni-POSS may be scrambled by a power saving (PS)-RNTI. However, a name of RNTI that scrambles the uni-POSS is not limited to the above example, and may be referred to as POSS-RNTI. Also, the RNTI that scrambles the uni-POSS may be newly-defined RNTI or may use legacy RNTI. The UE may receive the uni-POSS, assuming that the uni-POSS is scrambled by the PS-RNTI. That is, the uni-POSS may be de-scrambled by the PS-RNTI.

Second-4 Embodiment

In order to decrease complexity of the UE due to DCI decoding, the next-generation mobile communication system (the 5G or NR system) may limit the number of DCIs to a particular number or less, the DCIs having different sizes to be monitored by the UE at a particular time. For example, the next-generation mobile communication system (the 5G or NR system) may always satisfy both two conditions below.

[Condition 1]

The UE may monitor a maximum of X DCIs having different sizes per slot (e.g., X=4).

[Condition 2]

The UE may monitor a maximum of Y DCIs having different sizes per slot with respect to a particular RNTI. For example, the particular RNTI may indicate C-RNTI, CS-RNTI, MCS-C-RNTI, or other UE-specific RNTI (e.g., Y=3).

The BS may appropriately adjust a DCI size to satisfy [Condition 1] and [Condition 2] described above. The UE may not expect configuration of a DCI size that does not satisfy [Condition 1] and [Condition 2] described above. A size of a frequency-axis resource allocation field of DCI format 0_0/1_0 being monitored in a UE-specific search space may be determined as a size of a currently-activated BWP. However, in a case where a size of DCI format 0_0/1_0 being monitored in the UE-specific search space is determined as the size of the currently-activated BWP, and the afore-described conditions of the DCI size limit are not satisfied, the size of the frequency-axis resource allocation field of the corresponding DCI format 0_0/1_0 may be determined as a size of an initial BWP. That is, a size of DCI format 0_0/1_0 being monitored in a common search space, and a size of DCI format 0_0/1_0 being monitored in a UE-specific search space become equal, and thus, the number of DCIs having different sizes may be decreased.

According to an embodiment of the disclosure, a uni-POSS may have a size corresponding to a legacy DCI format (e.g., DCI format 0_0/1_0). For example, as the uni-POSS is transmitted in Active time, the uni-POSS may be configured to have a size equal to other DCI formats (e.g., DCI format 0_0/1_0, etc.) being transmitted together. In order to align sizes of DCIs being transmitted, when a size of the uni-POSS is smaller than other DCI format, 0 may be inserted (zero-padding), and when the size of the uni-POSS is larger than other DCI format, a bit corresponding to some fields may be truncated. According to an embodiment of the disclosure, the size of the uni-POSS 1210 may be aligned, such that the number of times the UE performs blind decoding with respect to a search space may be decreased and thus power of the UE may be saved.

Also, according to an embodiment of the disclosure, when Condition 1 or Condition 2 described above is not satisfied, the size of the uni-POSS may be aligned to have a same size as other DCI formats (e.g., DCI format 0_0/1_0, etc.).

Also, according to an embodiment of the disclosure, when Condition 1 or Condition 2 described above is not satisfied, the size of the uni-POSS may be aligned to have a same size as other DCI formats (e.g., DCI format 0_0/1_0, etc.) only in Active time, and may not be aligned with other DCI formats in Inactive time.

However, the disclosure is not limited to the above example, and regardless of whether a condition is satisfied and whether it is Active time/inActive time, the uni-POSS 1210 may have a same size as or a different size from other DCI formats (e.g., DCI format 0_0/1_0).

Second-5 Embodiment

According to an embodiment of the disclosure, a uni-POSS may include various contents (information, parameters). Also, as described above, the uni-POSS may be transmitted by using a new DCI format or may be transmitted by using a legacy DCI format. Hereinafter, contents included in the uni-POSS will now be described. As described above, the uni-POSS may include at least one parameter or a combination of one or more parameters as in [Table 15] below, and may be used to instruct content based on an included parameter to the UE and to control the UE.

TABLE 15

PDCCH-related configuration parameter (PDCCH monitoring occasion, the number of times blind decoding is performed, aggregation level (AL), monitoring occasion, indicator indicating whether to perform PDCCH monitoring, etc.)
BWP-related configuration parameter (BWP index, bandwidth size of BWP, etc.)
CA-related configuration parameter (CC index, indicator of CC activation or inactivation, etc.)
DRX-related configuration parameter (DRX cycle, CRX timer-related parameter (onDuration Timer, InactivityTimer, HARQ-RTT-Timer, RetransmissionTimer, etc.)
Antenna-related configuration information (the number of layers, the number of antenna ports, the number of antenna panels, etc.)
Time domain resource allocation-related configuration information (PDCCH-to-PDSCH timing K0, PDCCH-to PUSCH timing K2)
HARQ timing-related configuration information (PDSCH-to-HARQ timing)
CSI-RS configuration information
UL power control information
Other configuration information related to transmission and reception According to an embodiment of the disclosure, the uni-POSS may indicate to perform PDCCH monitoring. In more detail, the BS may transmit the uni-POSS to the UE, and the UE may perform monitoring on a PDCCH after the UE detects the uni-POSS. For example, since a preset point of time after the UE in an inActive state detects the uni-POSS, the UE may switch to an Active state so as to perform monitoring on a PDCCH. According to an embodiment of the disclosure, the uni-POSS may include information indicating state switching of the UE.

According to an embodiment of the disclosure, the uni-POSS may indicate not to perform PDCCH monitoring. In more detail, the BS may transmit the uni-POSS to the UE, and during a particular period of time after the UE detects the uni-POSS, the UE may not perform monitoring on a PDCCH. For example, the UE in an Active state may not perform monitoring on a PDCCH and may switch to an inActive state (e.g., a power saving mode or a sleep mode) since a point of time after the UE detects the uni-POSS.

Also, the uni-POSS 1210 may indicate to change configuration information about PDCCH monitoring. Here, configuration information about a PDCCH may include at least one of CORESET parameters in [Table 7] above, and/or at least one of search space parameters in [Table 8] above. The BS may transmit the uni-POSS to the UE, and after the UE detects the uni-POSS 1210, the UE may perform monitoring on a PDCCH by applying PDCCH configuration information indicated by the uni-POSS.

Also, information included in the uni-POSS 1210 is not limited to [Table 15], may include at least one of various parameters listed in [Table 14] described above, and may be used to instruct content based on an included parameter to the UE and to control the UE. Also, upon reception of the uni-POSS, after the UE detects the uni-POSS, the UE may control transmission and reception parameters, based on configuration information indicated by the uni-POSS.

According to an embodiment of the disclosure, contents of the uni-POSS 1210 transmitted in Active time 1270 may correspond to contents of GTS, and contents of the uni-POSS 1210 transmitted in inActive time may correspond to contents of WUS.

Figure 13:
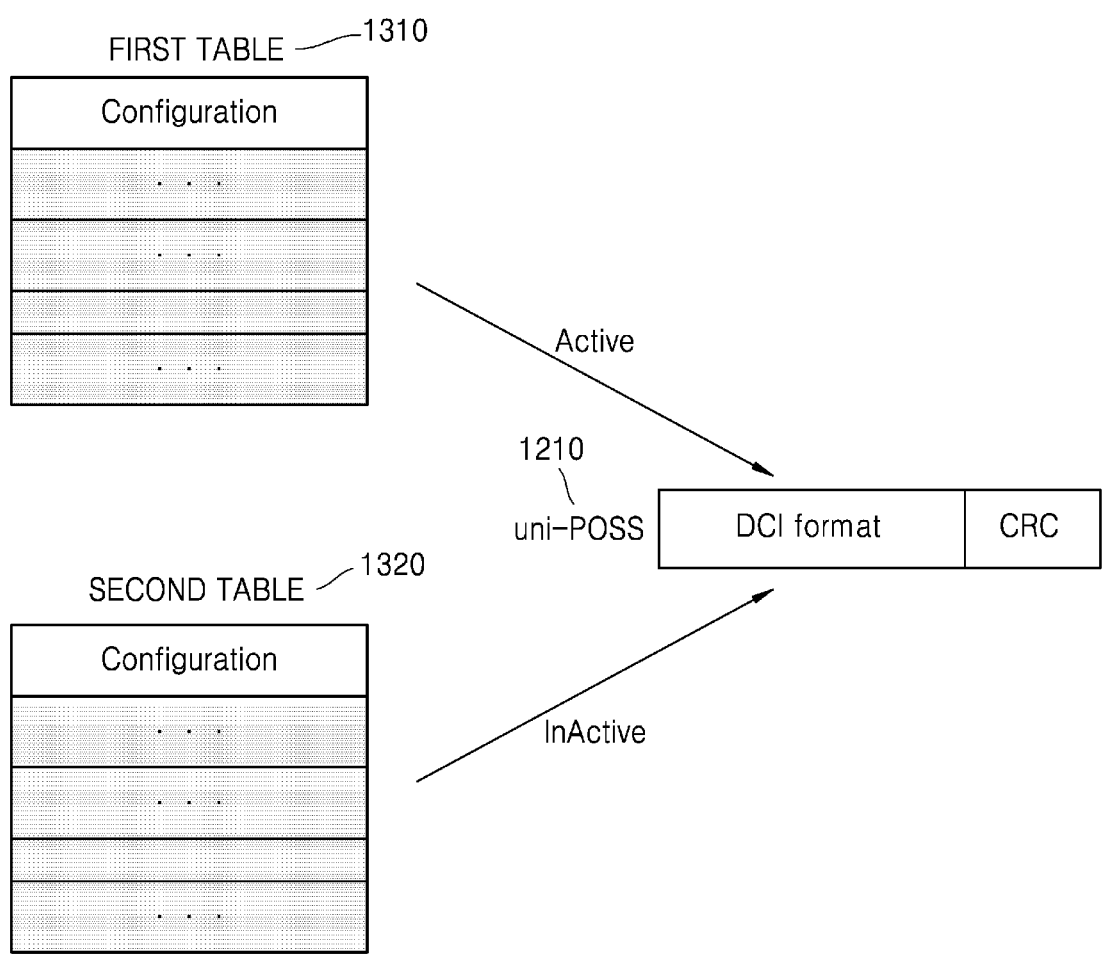
FIG. 13 is a diagram for describing contents included in a uni-POSS according to an embodiment of the disclosure.

Referring to FIG. 13, a first table 1310 may be contents (information, parameters) corresponding to GTS, and a second table 1320 may be contents (information, parameters) corresponding to WUS. The BS may determine whether the uni-POSS 1210 is transmitted to be monitored and detected by the UE in Active time 1270 or is transmitted to be monitored and detected by the UE in inActive time, and then may transmit, to the UE, the contents of the first table 1310 or the second table 1320 by using a combined DCI format.

However, the disclosure is not limited to the above example, and contents of the uni-POSS 1210 may always include contents included in both a GTS and a WUS. Details of contents that may be included in the uni-POSS 1210 will be described in detail with reference to an embodiment of contents of the GTS and the WUS.

Second-6 Embodiment

According to an embodiment, the BS may transmit a uni-POSS to the UE. Also, the BS may configure the UE with a CORESET and a search space for transmitting the uni-POSS to the UE. The UE may detect the uni-POSS by performing monitoring, according to the configured CORESET and search space, and configured a uni-POSS occasion.

The CORESET configured for the UE by the BS to transmit the uni-POSS may be a CORESET (a CORESET whose CORESET ID is 0 or CORESET #0) configured via MIB, or may be a CORESET configured via higher layer signaling (e.g., MIB, SIB, RRC signaling, etc.).

Also, the CORESET configured for the UE by the BS to transmit the uni-POSS 1210 may exist only in a particular BWP. The particular BWP may be an initial BWP configured via SIB or may be a default BWP from among a BWP configured via higher layer signaling or a BWP configured by the BS, and may exist in each BWP.

Also, the BS may configure, via higher layer signaling, the UE with a search space for transmitting the uni-POSS 1210. For example, the BS may configure the UE with search space parameters (i.e., a monitoring occasion and offset in a slot unit, a monitoring occasion in a symbol unit, the number of PDCCH candidates for each AL, a search space type, a DCI format, etc.) listed in [Table 8].

Second-6-1 Embodiment

According to an embodiment, the BS may configure the UE with one search space for transmitting the uni-POSS 1210.

Figure 14:
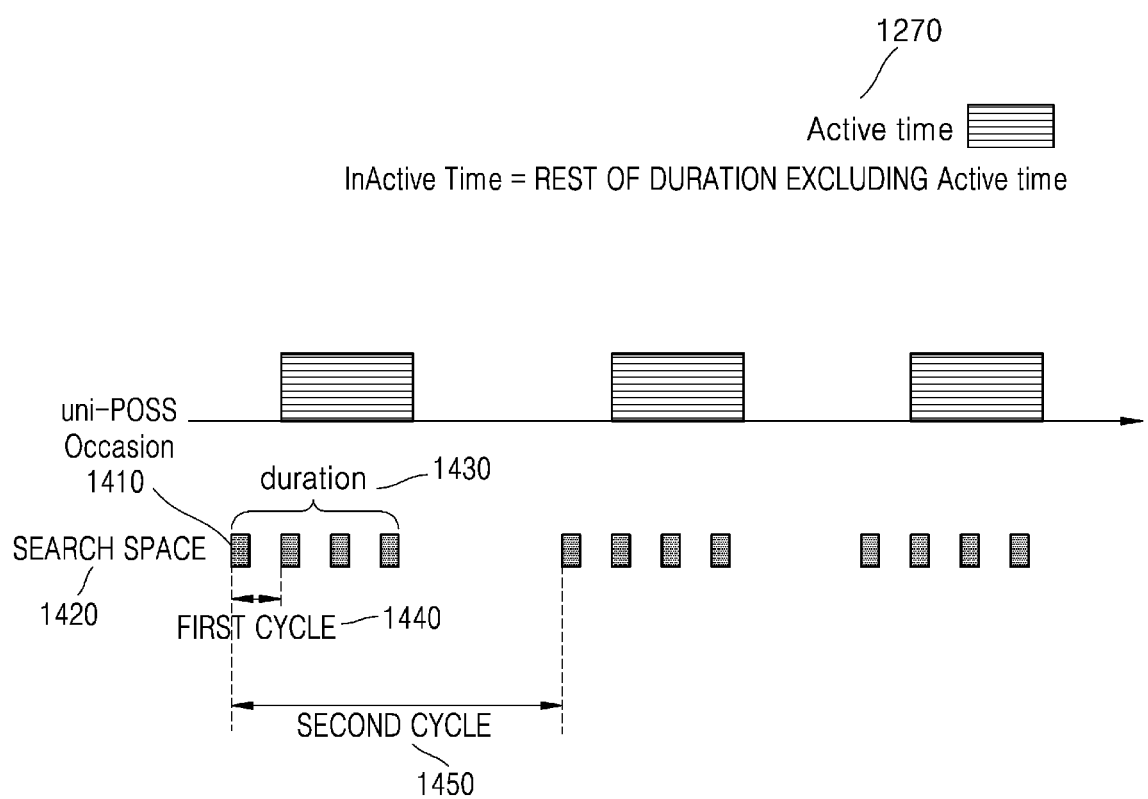
FIG. 14 is a diagram for describing a search space and cycle of a uni-POSS according to an embodiment of the disclosure.

Referring to FIG. 14, the UE may monitor one configured search space 1420 in Active time 1270 or inActive time. Also, the BS may configure duration 1430 in which the UE searches for a uni-POSS in a search space, and the UE may monitor, during the configured duration 1430, the one configured search space 1420 in Active time 1270 or inActive time.

According to an embodiment of the disclosure, the UE may perform monitoring in inActive time by monitoring the one configured search space 1420, based on the configured duration 1430.

Also, referring to FIG. 14, the BS may configure the UE with a first cycle 1440 per which the duration 1430 in which a uni-POSS is to be monitored is repeated. Also, the BS may configure a second cycle 1450 that is a cycle of a uni-POSS occasion 1410 in the duration 1430 configured for the UE. For example, the UE may monitor the one configured search space 1420 in every second cycle 1450 during the configured duration 1430 in every configured first cycle 1440.

According to an embodiment of the disclosure, the second cycle 1450 in inActive time and the second cycle 1450 in Active time 1270 may be equal or different.

The UE may monitor one or more uni-POSS occasions 1410 during the configured duration 1430 in inActive time. Here, the uni-POSS occasion 1410 to be monitored in inActive time may be configured by the BS or may be determined as the occasion 1410 existing in a time domain corresponding to a domain before particular offset in DRX Active time.

Second-6-2 Embodiment

According to an embodiment, the BS may configure the UE with one or more search spaces for transmitting a uni-POSS.

Referring to FIG. 15, the UE may monitor a search space #1 1520 in Active time 1270, and may monitor a search space #2 1530 in inActive time. Also, configuration information of a search space may include a parameter that is configurable as to whether the search space is a search space corresponding to Active time 1270 or whether the search space is a search space corresponding to inActive time.

Also, referring to FIG. 15, the BS may configure the UE with a first cycle 1540 that is a cycle of a uni-POSS occasion 1410 in the search space #1 1520. The UE may detect a uni-POSS by monitoring the search space #1 1520 in every configured first cycle 1540 in Active time 1270.

Also, referring to FIG. 15, the BS may configure the UE with a second cycle 1550 that is a cycle of the uni-POSS occasion 1410 in the search space #2 1530. The UE may detect a uni-POSS by monitoring the search space #2 1530 in every configured second cycle 1550 in inActive time.

According to an embodiment of the disclosure, cycles in respective search spaces may be equal or different.

The afore-described embodiments of the uni-POSS are all independent, and the embodiments may be combined with one another. For example, a DCI format of the uni-POSS may be a legacy format or a newly-defined format, a DCI size may be aligned or may not be aligned, contents of the uni-POSS transmitted in inActive time and contents of the uni-POSS transmitted in Active time may be equal or different, and a search space in which the uni-POSS is transmitted may be singular or plural.

Also, according to an embodiment of the disclosure, uni-POSS configurations (e.g., offset, a cycle, an indication unit of the uni-POSS when the uni-POSS is not received, mapping) may correspond to what is described with reference to a WUS or a GTS below. In detail, the uni-POSS 1210 may be configured such that a cycle of an occasion is configured in a scheme corresponding to a WUS in inActive time and the uni-POSS 1210 is detected, and a PDCCH monitoring method by the UE may be controlled in a same manner as a case of receiving the WUS. Also, a cycle of an occasion may be configured in a scheme corresponding to a GTS in Active time, the uni-POSS 1210 may be configured to be detected, and a PDCCH monitoring method by the UE may be controlled in a same manner as a case of receiving the GTS.

However, the disclosure is not limited to the above example, and the uni-POSS may be configured to be monitored and detected in a scheme corresponding to one of a WUS or a GTS, regardless of inActive time and Active time, and may be configured by combining some configurations of the WUS and some configurations of the GTS. That is, the uni-POSS may follow configuration of the WUS or the GTS, except for configuration of using a same DCI format in inActive time and Active time, and thus, detailed descriptions thereof are not provided here.

Hereinafter, the GTS and the WUS will now be described in detail in the third embodiment and the fourth embodiment.

Third Embodiment

As described above, a GTS may be a POSS the UE monitors in Active time 1670. The GTS may be preset DCI provided via a PDCCH. The UE may receive the GTS, and may perform various operations for power saving, based on the received GTS. Hereinafter, contents (information, parameters) in the GTS, a cycle, offset, an operation of a case where the GTS is not received, a unit of transmission of the GTS, and a PDCCH monitoring control method by the UE using the GTS will be described in detail.

Third-1 Embodiment

According to an embodiment, a GTS may include various contents (information, parameters). Also, as described above, the GTS may be transmitted by using a new DCI format or may be transmitted by using a legacy DCI format. Hereinafter, contents included in the GTS will now be described. As described above, the GTS may include at least one parameter or a combination of parameters as in [Table 16] below, and may be used to instruct contents based on an included parameter and to control the UE.

TABLE 16

| PDCCH-related configuration parameter (PDCCH monitoring occasion, the number of times blind decoding is performed, aggregation level (AL), monitoring occasion, indicator indicating whether to perform PDCCH monitoring, etc.) |
| --- |
| BWP-related configuration parameter (BWP index, bandwidth size of BWP, etc.) |
| CA-related configuration parameter (CC index, indicator of CC activation or inactivation, etc.) |
| DRX-related configuration parameter (DRX cycle, CRX timer-related parameter (onDurationTimer, InactivityTimer, HARQ-RTT-Timer, Retransmission Timer, etc.) |
| Antenna-related configuration information (the number of layers, the number of antenna ports, the number of antenna panels, etc.) |
| Time domain resource allocation-related configuration information (PDCCH-to-PDSCH timing K0, PDCCH-to PUSCH timing K2) |
| HARQ timing-related configuration information (PDSCH-to-HARQ timing) |
| CSI-RS configuration information |
| UL power control information |
| Other configuration information related to transmission and reception |

For example, the GTS may indicate not to perform PDCCH monitoring. In more detail, the BS may transmit the GTS to the UE, and after the UE detects the GTS, the UE may not perform monitoring on a PDCCH in a particular period of time.

Also, the GTS may indicate to change configuration information about PDCCH monitoring. Here, configuration information about a PDCCH may include at least one of CORESET parameters in [Table 7] above, and/or at least one of search space parameters in [Table 8] above. The BS may transmit the GTS to the UE, and after the UE detects the GTS, the UE may perform monitoring on a PDCCH by applying PDCCH configuration information indicated by the GTS.

Also, information included in the GTS is not limited to [Table 15], may include at least one of various parameters listed in [Table 14] described above, and may be used to instruct content based on an included parameter to the UE and to control the UE. Also, upon reception of the GTS, after the UE detects the GTS, the UE may control transmission and reception parameters, based on configuration information indicated by the GTS. Also, according to an embodiment of the disclosure, parameters included in a WUS may be included or may not be included in the GTS.

Also, according to an embodiment of the disclosure, the GTS may indicate state switching of the UE. In detail, upon reception of the GTS, the UE may terminate On duration.

That is, the UE may switch from an active state to an inactive state by terminating On duration. The active state may correspond to Active time in which the UE is activated, and the inactive state may correspond to inactive time in which the UE is inactivated. Also, On duration may indicate a period of time in which the UE is in an active state, which corresponds to Active time.

According to an embodiment of the disclosure, when the UE receives the GTS, the UE may stop (or inactivate) a drx-On duration timer and may terminate On duration. Also, the GTS may stop (or inactivate) a drx-inactivity timer and may terminate On duration. However, the disclosure is not limited to the above example, and termination of On duration may include switching to an inactive time or an operation in a sleep mode.

According to an embodiment of the disclosure, information indicating to terminate On duration or indicating to switch to an inactive state of the UE may correspond to afore-described information indicating state switching, and may correspond to an indicator about whether to monitor a PDCCH. However, the disclosure is not limited to the above example. Also, the GTS may include information about a termination period of On duration (a maintaining period of an inactive state of the UE).

According to an embodiment of the disclosure, when the UE terminates On duration, the UE may not monitor a preset search space, a preset control space (CORESET), or a preset PDCCH in a preset period of time.

Third-1-1 Embodiment

According to an embodiment, a GTS may be used with a new format or a legacy format. A DCI format used as the GTS may consist of fields below. However, the disclosure is not limited to the above example.
  Carrier indicator
  BWP indicator
  CSI request indicator
  PDCCH monitoring-related configuration indicator (PDCCH monitoring occasion 1603 or configuration related thereto, the number of times blind decoding is performed or configuration related thereto, AL, a monitoring occasion, an indicator indicating whether to perform PDCCH monitoring, etc.)
  At least one or combination of one or more parameters related to transmission and reception which exist in [Table 15]
  Information related to a point of time to apply changed configuration content indicated by a GTS (Tgap)
  Information related to time duration to which changed configuration content indicated by the GTS is applied (Tduration)

When the UE receives the GTS, the UE may apply PDCCH monitoring-related configuration (or other configuration related to transmission and reception) indicated by the GTS to a carrier indicated by a carrier indicator in a DCI format of the GTS.

Also, when the UE receives the GTS, the UE may apply PDCCH monitoring-related configuration (or other configuration related to transmission and reception) indicated by the GTS to a BWP indicated by a BWP indicator in a DCI format of the GTS.

When the UE receives the GTS, the UE may apply PDCCH monitoring-related configuration (or other configuration related to transmission and reception) indicated by the GTS at a point of time indicated by Tgap in a DCI format of the GTS. For example, when the UE receives a PDCCH in which a DCI format of the GTS is transmitted, in a slot n, the UE may apply changed configuration content from the slot n+Tgap, and may perform PDCCH monitoring (or a related transmission or reception operation) according to changed configuration. That is, the GTS may include information about since which point of time PDCCH monitoring-related configuration in the GTS is to be applied.

When the UE receives the GTS, the UE may apply PDCCH monitoring-related configuration (or other configuration related to transmission and reception) indicated by the GTS since a point of time indicated as Tduration in a DCI format of the GTS. For example, when the UE receives a PDCCH in which a DCI format of the GTS is transmitted, in a slot n, the UE may apply changed configuration content during time duration corresponding to from the slot n+Tgap to the slot n+Tgap+Tduration−1. Also, the UE may perform PDCCH monitoring (or a related transmission or reception operation) according to changed configuration. That is, the GTS may include information about a period of time in which PDCCH monitoring-related configuration in the GTS is to be applied.

Third-1-2 Embodiment

According to an embodiment, a GTS may be used with a legacy format. For example, the GTS may be transmitted using DCI format 0_1 or DCI format 1_1. Also, as described above, the GTS may be scrambled by corresponding RNTI (e.g., GTS-RNTI, PS-RNTI, or POSS-RNTI). The BS may configure the UE to monitor DCI format 0_1 or DCI format 1_1 scrambled by an RNTI (e.g., GTS-RNTI, PS-RNTI, or POSS-RNTI) corresponding to the GTS.

DCI format 0_1 or DCI format 1_1 scrambled by an RNTI corresponding to the GTS may include [Field 1] below.
  [Field 1]: PDCCH monitoring-related configuration indicator (PDCCH monitoring occasion, the number of times blind decoding is performed, AL, a monitoring occasion, an indicator indicating whether to perform PDCCH monitoring, etc.) or at least one or combination of one or more parameters related to transmission and reception which exist in [Table 15].

According to an embodiment, when DCI format 0_1 or DCI format 1_1 is scrambled by WUS-RNTI, some of legacy fields in DCI format 0_1 or 1_1 scrambled by C-RNTI, which are described in descriptions of [Table 4] and [Table 6], may be substituted with [Field 1] described above. Alternatively, some bits of legacy fields in scrambled DCI format 0_1 or 1_1 may be re-interpreted to contents of [Field 1] described above.

For example, when the GTS is transmitted using DCI format 0_1 or DCI format 1_1, a BWP indicator field in DCI format 0_1 or DCI format 1_1 may be substituted with [Field 1] described above. Also, when the GTS is transmitted using DCI format 0_1 or DCI format 1_1, N bits of a most significant bit (MSB) or a least significant bit (LSB) in a frequency domain allocation information field in DCI format 0_1 or DCI format 1_1 may be re-interpreted to indication contents of [Field 1] described above.

Contents indicated by an indicator of [Field 1] described above may be configured for the UE by the BS using higher layer signaling (e.g., MIB, SIB, RRC, MAC CE, etc.). For example, the BS may configure the UE with a PDCCH monitoring-related configuration parameter (or a transmission and reception parameter existing in [Table 15]) as 2N−1 entry via higher layer signaling (e.g., MIB, SIB, RRC, MAC CE, etc.), and may notify the UE by N bits of [Field 1] described above.

Also, according to an embodiment, the BS may configure the UE with 2N−1 entry consisting of a search space upper set including one or more search space configurations. Also, one entry may be selected and indicated from among search space upper sets configured by using an N-bit indicator. [Table 17] below describes an example in which configuration information about a search space is indicated by using a 2-bit indicator in an embodiment of the disclosure. Search space #X may indicate a search space whose search space identifier is configured as X from among search spaces configured in [Table 8] described above.

TABLE 17

| Indicator value of [Field 1] | Search space upper set configured via higher layer signaling |
| --- | --- |
| 00 | {search space#1} |
| 01 | {search space#1, search space#2} |
| 10 | {search space#1, search space#2, search space#3} |
| 11 | {search space#2, search space#4} |

The UE may perform monitoring on search spaces indicated by [Field 1] received from the BS. In an embodiment, when the UE receives a value indicated as '01', based on [Table 17], the UE may perform monitoring on search space #1 and search space #2. That is, the UE may configure a search space to be monitored by the UE via [Field 1] of GTS.

However, the disclosure is not limited to the above example, and the BS may configure the UE with a search space by using an indicator of 1 bit or a plurality of bits, and a combination of search spaces is not limited to the above example.

Also, according to an embodiment, the BS may configure the UE with 2N−1 entry consisting of an upper set including combinations of transmission and reception parameters existing in [Table 16]. Also, the BS may select and indicate one of configured entries by using an N-bit indicator. [Table 18] below is an example where a 2-bit indicator is used, and a total of four parameter combinations (PowerSavingMode #1, PowerSavingMode #2, PowerSavingMode #3, PowerSavingMode #4) may be configured via higher layer signaling.

TABLE 18

| Indicator value of [Field 1] | Entry configured via higher layer signaling |
| --- | --- |
| 00 | PowerSavingMode#1 (configured by higher layer) |
| 01 | PowerSavingMode#2 (configured by higher layer) |
| 10 | PowerSavingMode#3 (configured by higher layer) |
| 11 | PowerSavingMode#4 (configured by higher layer) |

In an embodiment, PowerSavingMode #X (X=1, 2, 3, 4) may indicate configuration information about various transmission and reception parameters (one parameter or a combination of parameters of [Table 16]). That is, PowerSavingMode #X may be configured as below.

PowerSavingMode #X={PDCCH-related configuration #X, BWP-related configuration #X, CA-related configuration #X, DRX-related configuration #X, antenna-related configuration #X, time domain resource allocation-related configuration #X, HARQ timing-related configuration #X, CSI-RS configuration #X, UL power control configuration #X, other transmission and reception configuration information #X}

The UE may control or change a related transmission and reception operation by applying a related transmission and reception parameter indicated as [Field 1] received from the BS. For example, when the UE receives a value indicated as '01', based on [Table 18], the UE may perform transmission and reception based on a transmission and reception parameter corresponding to PowerSavingMode #2. That is, the BS may configure the UE, via [Field 1] of the GTS, with parameters with which the UE controls a related transmission and reception operation.

Obviously, the disclosure is not limited to the above example. The BS may configure the UE with combinations of parameters by using an indicator of 1 bit or a plurality of bits, transmission and reception parameters included in PowerSavingMode are not limited to the above example, and the parameters may not include some or all of the examples or may further include information not described in the examples.

Also, in the third-1-2 embodiment, it is described that the GTS may be transmitted using DCI format 0_1 or DCI format 1_1 but is not limited to the above example, and thus, the GTS may be transmitted using DCI formats 0_0, 0_1, 2_0, 2_1, 2_2, 2_3, etc., and one field among DCI formats 0_0, 0_1, 2_0, 2_1, 2_2, and 2_3 may be substituted with [Field 1]described above, may be re-interpreted to contents of [Field 1] described above, or may include the aforedescribed contents.

Third-2 Embodiment

According to an embodiment of the disclosure, an Occasion cycle and offset of a GTS may be determined based on configuration information about a POSS. As described above, the configuration information about a POSS may be provided from the BS to the UE via higher layer signaling (RRC signaling, MIB, or SIB).

Figure 16:
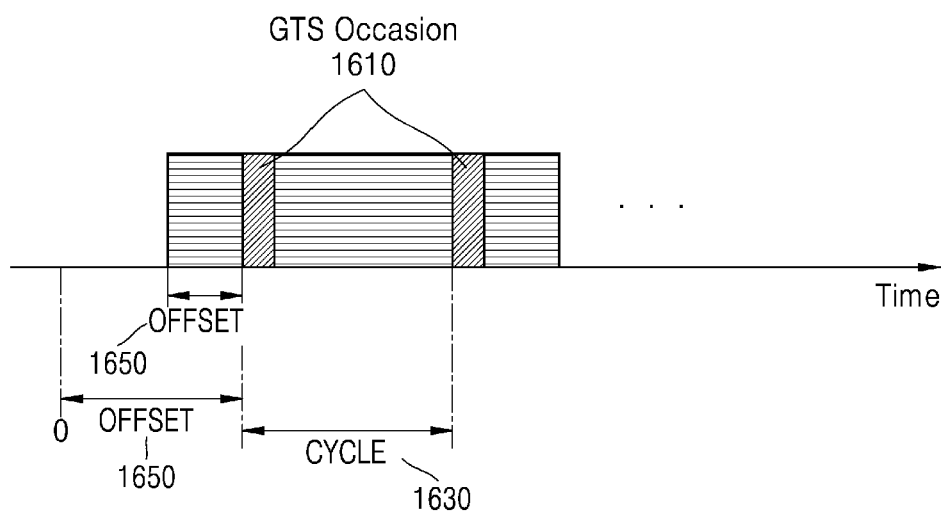
FIG. 16 is a diagram for describing a GTS according to an embodiment of the disclosure.

Referring to FIG. 16, a GTS Occasion 1610 may indicate particular time duration in which a GTS is received. As the GTS is monitored in Active time, the GTS Occasion 1610 may be located in Active time 1670. An occasion (or a cycle) 1630 of the GTS may include a monitoring occasion in which the GTS is monitored or a cycle at which an occasion of the GTS is repeated (or repeatedly transmitted) in Active time 1670. Also, offset (or start offset) 1650 of the GTS may indicate a difference with respect to a location or a time about how far the GTS is away from a reference point or reference point of time (e.g., a preset slot or the start of Active time).

According to an embodiment of the disclosure, the cycle 1630 of the GTS may be configured as a time, the number of subframes, the number of slots, and the like. Also, the offset 1650 of the GTS may also be configured as a time, the number of subframes, the number of slots, and the like. Furthermore, the offset 1650 of the GTS may have a negative value.

$$[(SFN \times 10)+\text{subframe number}]\text{modulo}(\text{GTS-Cycle})=\text{GTS-Offset} \qquad [\text{Equation 4}]$$

Obviously, the cycle 1630 of the GTS is not limited to the above example, and may be determined based on other equation.

Third-2-1 Embodiment

According to an embodiment of the disclosure, as the GTS is monitored in Active time, the cycle 1630 and the offset 1650 of the GTS may be configured to be associated with Active time. For example, the cycle 1630 of the GTS may be configured at slot intervals in Active time.

According to an embodiment of the disclosure, the UE may determine Active time, based on a DRX operation, and may monitor the GTS according to the configured cycle 1630. For example, when an onDuration Timer is ON, the UE may monitor the GTS at configured slot intervals. Obviously, the UE may determine Active time, based on other timer (e.g., drx-inactivity Timer, drx-Retransmission timer, or drxShortCycleTimer), not the onDuration Timer, and the disclosure is not limited to the above example, and thus, the UE may monitor the GTS at configured slot intervals by determining Active time of the UE itself.

Also, according to an embodiment of the disclosure, the offset 1650 of the GTS may be configured to have a relative value from the start of Active time. For example, when the onDuration Timer is ON, the UE may monitor, after a slot of configured offset, the GTS at configured slot intervals.

Third-2-2 Embodiment

According to an embodiment of the disclosure, the cycle 1630 and the offset 1650 of the GTS may be configured independently from Active time. For example, the cycle 1630 of the GTS may be configured based on a subframe, a system frame, or a slot, and the UE may monitor the GTS at configured intervals based on a subframe number, a system frame number, or a slot number.

Also, according to an embodiment of the disclosure, the offset 1650 of the GTS may be configured to have an absolute value based on a subframe, a system frame, or a slot, and the UE may monitor the GTS at configured intervals, after a subframe, a system frame, or a slot of configured offset.

Third-3 Embodiment

As described above, the BS may transmit a GTS to the UE. Also, the BS may configure the UE with a CORESET for transmitting the GTS to the UE, a search space, and a DCI format to be monitored.

Third-3-1 Embodiment

According to an embodiment of the disclosure, the CORESET configured for the UE by the BS to transmit the GTS may be a CORESET (a CORESET whose CORESET ID is 0 or CORESET #0) configured via MIB, or may be a CORESET configured via higher layer signaling (e.g., MIB, SIB, RRC signaling, etc.).

Also, the CORESET configured for the UE by the BS to transmit the GTS may exist only in a particular BWP. The particular BWP may be an initial BWP configured via SIB or may be a default BWP from among a BWP configured via higher layer signaling or a BWP configured by the BS, and may exist in each BWP.

Third-3-2 Embodiment

Also, according to an embodiment of the disclosure, the BS may configure, via higher layer signaling, the UE with a search space for transmitting the GTS. For example, the BS may configure the UE with search space parameters (i.e., a monitoring occasion and offset in a slot unit, a monitoring occasion in a symbol unit, the number of PDCCH candidates for each AL, a search space type, a DCI format, etc.) listed in [Table 8].

For example, the BS may configure a search space for transmitting the GTS as a common search space (CSS), a group common search space (GCSS), a UE-specific search space (USS), or at least one of the CSS, the GCSS, and the USS. The UE may monitor the GTS in a configured search space. This corresponds to what is described above.

As described above, when the BS configures a search space for transmitting the GTS as the CSS, $Y\_(p,n\mu s,f)$ from among parameters for determining the search space may be 0, when the CSS or the GCSS is configured, a value of $Y\_(p,n\mu s,f)$ may be a value corresponding to a group-common RNTI (e.g., GC-RNTI), when the USS is configured, a value of $Y\_(p,n\mu s,f)$ may be a value that changes according to an identity of the UE (C-RNTI or ID the BS configures for the UE) and a time index.

Third-4 Embodiment

According to an embodiment of the disclosure, the BS may configure a DCI format to be monitored in a search space.

According to an embodiment of the disclosure, the BS may configure the UE to monitor a particular DCI format (e.g., DCI format 0-2 or 1-2 or DCI format 3, etc.,) defined to transmit the GTS. As described above, a DCI format corresponding to the GTS may be scrambled by an RNTI such as GTS-RNTI, PS-RNTI, or POSS-RNTI which corresponds to the GTS. The UE may receive the DCI format corresponding to the GTS, assuming that the GTS is scrambled by an RNTI (GTS-RNTI, PS-RNTI, or POSS-RNTI) corresponding to the GTS. That is, the format corresponding to the GTS may be de-scrambled by an RNTI (GTS-RNTI, PS-RNTI, or POSS-RNTI) corresponding to the GTS. That is, the GTS may be transmitted by using a dedicated DCI format and dedicated RNTI.

Also, the BS may configure the UE to monitor DCI format 0-0 or 1-0 scrambled by an RNTI (GTS-RNTI, PS-RNTI, or POSS-RNTI) corresponding to the GTS. When the UE is configured with RNTI (GTS-RNTI, PS-RNTI, or POSS-RNTI) corresponding to the GTS, the UE may monitor, with respect to DCI format 0-0 or 1-0, DCI scrambled by an RNTI (GTS-RNTI, PS-RNTI, or POSS-RNTI) corresponding to the GTS.

However, the DCI format corresponding to the GTS is not limited to the DCI format 0-0 or 1-0, and the BS may configure the UE to monitor DCI format 0-1 or 1-1 scrambled by an RNTI (GTS-RNTI, PS-RNTI, or POSS-RNTI) corresponding to the GTS. When the UE is configured with RNTI (GTS-RNTI, PS-RNTI, or POSS-RNTI) corresponding to the GTS, the UE may monitor, with respect to DCI format 0-1 or 1-1, DCI scrambled by POSS-RNTI. That is, the GTS may be transmitted by using a legacy DCI format and dedicated RNTI.

In other words, the GTS may use a legacy format or newly-defined format, and may be scrambled by dedicated RNTI.

Third-5 Embodiment

As described above, the BS may transmit the GTS to the UE, and after the UE detects the GTS, the UE may perform monitoring on a PDCCH by applying PDCCH configuration information indicated by the GTS. Also, the UE may be configured with one or more search spaces by the BS. Also, a cycle or monitoring occasion of each search space may be controlled by the GTS. As described above, the GTS may include PDCCH monitoring-related configuration information, and for example, information below may be included in a DCI format or field corresponding to the GTS.

A Scaling Factor α with Respect to a PDCCH Monitoring Occasion

When the UE receives a scaling factor α with respect to a monitoring occasion via the GTS from the BS, the UE may change or adjust the monitoring occasion with respect to configured search spaces, in consideration of the received value of α, or may determine whether to monitor the search spaces. Hereinafter, provided is a method of changing a PDCCH monitoring occasion based on the afore-described scaling factor.

Third-5-1 Embodiment

According to an embodiment of the disclosure, the UE may change a slot-unit monitoring occasion with respect to a search space, based on PDCCH monitoring-related configuration information (e.g., a scaling factor α with respect to a PDCCH monitoring occasion). That is, the UE may apply scaling to a preset cycle, based on the received value of α.

For example, in a case where a monitoring occasion of a particular search space is configured as T slot, and α=A is received, the UE may change the slot-unit monitoring occasion of the search space to A×T and apply it. For example, monitoring configuration may be changed as illustrated in FIG. 17.

Figure 17:
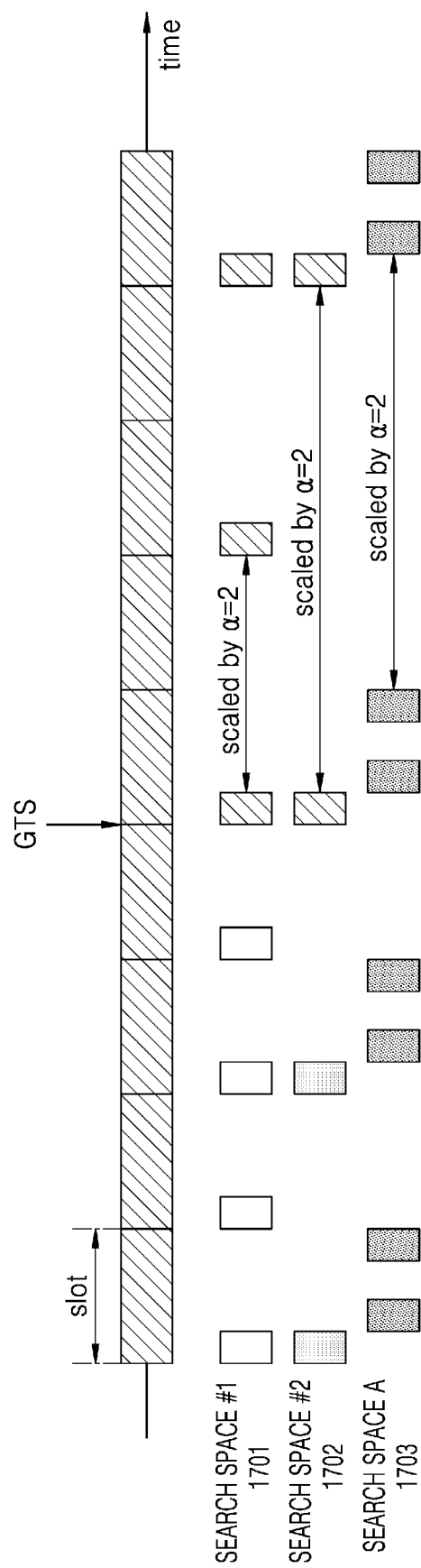
FIG. 17 is a diagram for describing a method of scaling a monitoring occasion based on a GTS according to an embodiment of the disclosure.

FIG. 17 is a diagram for describing a method of changing PDCCH monitoring configuration, based on GTS, according to an embodiment of the disclosure. Referring to FIG. 17, in a case where slot-unit monitoring occasions of search space #1 (SS #1) 1701 and search space #2 (SS #2) 1702 are respectively configured as 1-slot and 2-slot, and the UE receives GTS and is configured with a scaling factor with respect to a monitoring occasion being α=2, the UE may change and apply the slot-unit monitoring occasion of the search space #1 (SS #1) 1701 as 2-slot and the slot-unit monitoring occasion of the search space #2 (SS #2) 1702 as 4-slot. That is, the UE may change current monitoring occasion configuration by multiplying a current cycle by a scaling factor. The UE may monitor corresponding search spaces based on a changed monitoring occasion.

When α=1, the UE may changelessly maintain a pre-configured slot-unit monitoring occasion, without changing a monitoring occasion of a search space.

When α=0, the UE may not perform and may skip monitoring with respect to a configured search space.

When 0<α<1, the UE may change a monitoring occasion of a search space to a symbol-unit monitoring occasion and may apply it. In an embodiment, in a case where a slot-unit monitoring occasion of a configured search space is T slot and the UE receives α=A, a symbol-unit monitoring occasion Tsym may be calculated according to <Equation 5> below.

$$T_{sym} = \left\lfloor \frac{T}{A} \cdot N_{symb}^{slot} \right\rfloor \text{ or } \left\lceil \frac{T}{A} \cdot N_{symb}^{slot} \right\rceil$$ [Equation 5]

In [Equation 5], $\lfloor X \rfloor$ may be a function of outputting a largest integer smaller than X, and $\lceil X \rceil$ may be a function of outputting a smallest integer larger than X.

However, the disclosure is not limited to the above example, and in a case of 0<α<1, the UE may determine that a scaling factor (indicator) with respect to a PDCCH monitoring occasion is an error. That is, the UE may expect to be indicated as only a value of α=0 or a value of a being α>1.

Third-5-2 Embodiment

According to an embodiment of the disclosure, the UE may change a symbol-unit monitoring occasion and a slot-unit monitoring occasion, based on PDCCH monitoring-related configuration information (e.g., a scaling factor α with respect to a PDCCH monitoring occasion).

The UE may monitor a search space, based on monitoring occasion information (monitoringSymbolsWithinSlot) of a symbol unit in a slot from among configuration parameters with respect to the search space configured via higher layer signaling (e.g., RRC) (refer to [Table 8]). For example, bitmap information about a symbol in which monitoring is to be performed from among 14 symbols in a slot may be configured for the UE. When a symbol-unit monitoring occasion is configured for a particular search space, a monitoring pattern in a configured slot may be repeated at configured slot-unit cycles.

With respect to a search space A to which a symbol-unit monitoring occasion and a slot-unit monitoring occasion are configured from among search spaces configured for the UE, the UE may change a monitoring occasion, based on the PDCCH monitoring-related configuration information (e.g., the scaling factor α with respect to a PDCCH monitoring occasion) received via the GTS.

According to an embodiment of the disclosure, when the UE receives the GTS, the UE may not perform monitoring on the search space A. Alternatively, when α>1 or α=0 in a POSS received by the UE, the UE may not perform monitoring on the search space A.

Also, according to an embodiment of the disclosure, the UE may not change but may changelessly maintain monitoring configuration with respect to the search space A, regardless of a value of a indicated by the GTS. That is, the UE may apply a PDCCH monitoring occasion changing operation based on the value of a indicated by the GTS only to search spaces not being the search space A.

Also, according to an embodiment of the disclosure, when the UE receives the value of α via the GTS, the UE may changelessly maintain a symbol-unit monitoring occasion pattern in a slot of the search space A, and may change a slot-unit monitoring occasion, based on the received value of α. Here, the afore-described third-4-1 embodiment may be applied to a method of changing the slot-unit monitoring occasion with respect to the search space A.

Referring to FIG. 17, a symbol-unit monitoring occasion is configured for a search space A 1703 (for search space 3 of FIG. 17, 2 monitoring occasions per slot are configured), and a slot-unit monitoring occasion is configured as 2 slots. The UE may change the slot-unit monitoring occasion of the search space A 1703 from current 2 slots to 4 slots, based on α=2 received from the GTS, and may changelessly maintain a monitoring occasion pattern of a symbol unit in a slot.

Also, according to an embodiment of the disclosure, only when α>1 received via a GTS by the UE, a method of changing monitoring occasion configuration may be applied.

Third-5-3 Embodiment

According to an embodiment of the disclosure, regardless of a time when a GTS is received, the UE may apply PDCCH monitoring-related configuration information (e.g., a scaling factor α with respect to a PDCCH monitoring occasion) received via the GTS to a parameter value of a search space configured via higher layer signaling (e.g., MIB, SIB, or RRC), and thus, may change configuration related to PDCCH monitoring.

For example, in a case where a value of a particular parameter of the search space configured via higher layer signaling is configured as A, and a value of a scaling factor indicated by the GTS is α, the UE may change a value of the parameter of the corresponding search space to α×A and may apply it. A PDCCH-related parameter value of A which can be adjusted by the scaling factor indicated by the GTS may include, for example, configuration values of parameters below but are not limited thereto.

Slot-unit monitoring occasion
A symbol-unit monitoring occasion in a slot
The number of PDCCH candidates per AL (or, a total number of PDCCH candidates)
A monitoring length (corresponding to parameter duration of [Table 8])

Equally, the afore-described scaling factor α indicated by the GTS may correspond to a scaling factor for adjusting PDCCH-related parameters below.

A scaling factor for a slot-unit monitoring occasion
A scaling factor for a symbol-unit monitoring occasion in a slot
A scaling factor for the number of PDCCH candidates per AL (or, a total number of PDCCH candidates)
A scaling factor for a monitoring length (corresponding to parameter duration of [Table 8])

In detail, in a case where a slot-unit monitoring occasion of a search space is configured as T slot via higher layer signaling, and the UE receive α=A via first GTS, the UE may change the slot-unit monitoring occasion of the search space to AT (A×T) and apply it. Also, in a case where the UE receives α=B via GTS thereafter, the UE may change the slot-unit monitoring occasion of the search space to B×T and apply it.

That is, when the UE changes configuration of a search space, based on the third-1 embodiment and the third-2 embodiment described above, the UE may apply a received value of α, based on a slot-unit monitoring occasion or a symbol-unit monitoring occasion with respect to the search space which is configured via higher layer signaling (RRC).

Third-5-4 Embodiment

According to an embodiment of the disclosure, the UE may not always apply the change in configuration contents received via a GTS to a value configured via higher layer signaling (RRC). The UE may change the received configuration contents by using an accumulation method.

According to an embodiment of the disclosure, the UE may perform configuration changing by applying changed configuration content (e.g., a value of α) received via the GTS to a PDCCH parameter value (or a transmission and reception parameter) by which the UE assumes and thus operates in a previous time.

For example, in a case where the UE operates as A with respect to a particular parameter value of α search space in a particular point of time, e.g., a slot n, and a scaling factor value indicated by the GTS is α1, the UE may change a parameter value of the search space to A1=α×1A and may apply it. When a scaling factor value indicated again by the GTS at a point of time thereafter is α2, the UE may change the parameter value of the search space to A2=α2×A1=α2× α1×A and may apply it. That is, the UE may sequentially and accumulatively apply changed configuration contents received via a GTS according to time, and thus, may change PDCCH monitoring configuration.

The PDCCH parameter value which can be adjusted by a scaling factor corresponds to the third-4-3 embodiment described above, and thus, detailed descriptions thereof are not provided here.

In detail, in a case where the UE receives α=A value via a GTS in a slot n, and a monitoring occasion of a search space before the GTS is received is T slot, the UE may change the monitoring occasion of the search space to T=A×T after receiving the GTS and may apply it. When the UE re-receives α=B value via a GTS in a slot m(>n), the UE may change the monitoring occasion of the search space to B×T'=B×A×T and may apply it.

In the afore-described embodiments, the change in the PDCCH monitoring-related configuration information is described based on the change in a PDCCH monitoring occasion, but the disclosure is not limited to the above example. The afore-described embodiments may be equally applied to a case where a GTS indicates a scaling factor β with respect to the number of PDCCH candidates (or, equally, the number of times blind decoding is performed) per AL. Also, the afore-described embodiments may be equally applied to a case where a GTS indicates a scaling factor γ with respect to the number of times blind decoding is performed on a search space.

That is, the UE may be configured, by the BS via a GTS, to change PDCCH monitoring-related configuration information, and the UE may change (apply a scaling factor to each parameter) at least one PDCCH monitoring-related parameter (e.g., a slot-unit monitoring occasion, a symbol-unit monitoring occasion in a slot, the number of PDCCH candidates per AL (or, a total number of PDCCH candidates), or a monitoring length) via the received GTS.

Third-6 Embodiment

According to an embodiment of the disclosure, a GTS may be always transmitted according to a preset cycle. That is, the GTS may include information indicating to maintain current PDCCH monitoring configuration (e.g., a scaling factor by which PDCCH monitoring-related parameters are not changed), or may include information indicating to change PDCCH monitoring configuration (e.g., a scaling factor for changing PDCCH monitoring-related parameters).

Also, according to an embodiment of the disclosure, the GTS may be transmitted to the UE only when the BS attempts to change PDCCH monitoring configuration. That is, the GTS may include information indicating to change PDCCH monitoring configuration (e.g., a scaling factor for changing PDCCH monitoring-related parameters).

Third-7 Embodiment

Based on the afore-described embodiments, the UE may be configured, by the BS, to monitor a GTS, and according to the configuration, the UE may perform monitoring on the GTS. Here, the UE may receive or may not receive the GTS in an occasion configured to monitor the GTS. That is, even when the UE monitored a PDCCH according to an occasion configured to monitor a GTS, the UE may detect or may not detect the GTS.

If the UE successfully receives a GTS, the UE may change or adjust PDCCH configuration (or other various transmission and reception parameters) according to contents indicated by the GTS based on the afore-described embodiments, and then may perform monitoring on the PDCCH based on the changed configuration.

If the UE fails to successfully receive a GTS, different understanding (interpretation) with respect to the PDCCH configuration (or other various transmission and reception parameters) may occur between the BS and the UE. For example, in a case where the UE performs a monitoring operation on a PDCCH based on PDCCH configuration #1 and then the BS transmits GTS for the change to PDCCH configuration #2 but the UE fails to successfully receive the GTS, the UE may still perform the monitoring operation on a PDCCH based on PDCCH configuration #1. However, the BS may transmit a PDCCH based on PDCCH configuration #2. In this case, transmission and reception of PDCCH between the BS and the UE may not be smoothly performed. Therefore, in a case where the UE fails to successfully receive GTS, the US may operate as below.

The UE may be configured with one or more search space sets by the BS, and one or more of the configured search space sets may be defined as a "first search space". The "first search space" may be defined as a search space whose configuration is not changed by GTS. However, the disclosure is not limited to the above example, and the first search space may be referred to as a default search space, a basic search space, or the like.

For example, in a case where two search spaces, search space #1 and search space #2 are configured for the UE, and search space #1 among them is the "first search space", when the UE receives GTS, the UE may not apply changed configuration content with respect to PDCCH which is indicated by the GTS to search space #1 corresponding to the "first search space" and may apply the changed configuration content only to search space #2 that is not the "first search space".

That is, only configuration of search space #2 may be changed based on the GTS. Therefore, even when the UE fails to successfully receive the GTS, same understanding with respect to search space sets corresponding to the "first search space" may maintain between the BS and the UE, and thus, the UE may receive a PDCCH from the BS by using a search space set corresponding to the "first search space".

The "first search space" described above may correspond to a search space set having one feature or a combination of features below.
   A search space set whose search space type is configured as a common search space
   A search space set configured as a lowest (or highest) index
   A search space set whose index is configured as 0
   A search space set associated with a CORESET (e.g., configured to be monitored in the CORESET) configured as a lowest (or highest) index
   A search space set to be monitored in a CORESET whose index is configured as 0
   A search space set associated with a BWP (e.g., configured to be monitored in the BWP) configured as a lowest (or highest) index
   A search space set to be monitored in a BWP configured as a default BWP (e.g., a BWP configured as default-DownlinkBWP or defaultDownlinkBWP-Id) via higher layer signaling (e.g., RRC) (defaultDownlinkBWP may correspond to a BWP for fallback at which changing is performed when the UE does not receive a PDCCH during particular time duration defined by a timer)
   A search space set to be monitored in a BWP configured as firstActiveDownlinkBWP via higher layer signaling (e.g., RRC) (firstActiveDownlinkBWP may correspond to a BWP initially activated by the BS via higher layer signaling)
   A search space set configured to monitor a POSS
   A search space set configured or designated as the "first search space" by the BS Also, according to an embodiment of the disclosure, when the UE fails to successfully receive GTS, the UE may changelessly maintain current PDCCH configuration. When the BS determines that the UE fails to receive a GTS, the BS may transmit control information and data according to current PDCCH configuration of the UE, or may re-transmit a GTS.

Third-8 Embodiment

Based on the afore-described embodiments, the UE may be configured, by the BS, to monitor a GTS, and may perform monitoring on a GTS, according to the configuration. In particular, as described above, GTS may include information (Tgap) related to a point of time when changed configuration contents indicated by GTS is applied, and information (Tduration) related to time duration in which changed configuration contents indicated by GTS is applied.

A method by which the UE performs monitoring on a search space set configured to monitor a GTS based on the information (Tgap) related to a point of time of application and the information (Tduration) related to time duration and other search space sets may be as below.

Third-8-1 Embodiment

According to an embodiment of the disclosure, the UE may perform monitoring on a search space set configured to monitor a GTS based on the information (Tgap) related to a point of time of application and the information (Tduration) related to time duration and other search space sets may be as below.

According to an embodiment of the disclosure, the UE may perform monitoring only on a search space set configured to monitor a GTS at a particular point of time, and when the UE successfully receives the GTS, the UE may perform monitoring on other search space sets by applying changed configuration about a PDCCH, based on contents indicated by the detected GTS, during particular time duration (Tduration) from a point of time the GTS is detected by a particular time (Tgap≥0).

According to an embodiment of the disclosure, the UE may perform monitoring not only on a search space set configured to monitor a GTS at a particular point of time but also on other search space sets, and when the GTS is successfully received, the UE may perform monitoring on other search space sets by applying changed configuration about a PDCCH, based on contents indicated by the detected GTS, during particular time duration (Tduration) from a point of time the GTS is detected by a particular time (Tgap≥0).

Third-8-2 Embodiment

According to an embodiment of the disclosure, the UE may monitor or may not monitor a GTS based on information related to time duration (Tduration) to which changed configuration content is applied, and may always perform monitoring.

According to an embodiment of the disclosure, the UE may not perform monitoring on a search space set with respect to a GTS during Tduration.

According to an embodiment of the disclosure, the UE may continuously perform monitoring on a GTS during Tduration. The UE may perform monitoring on a GTS during Tduration, and when the GTS is detected, the UE may control a monitoring operation with respect to a PDCCH, based on configuration information included in the GTS that is newly detected. In more detail, after a time of Tgap after the UE detects first GTS, the UE may perform monitoring on a PDCCH and monitoring on a GTS during time duration Tduration. When the UE detects a second GTS during time duration Tduration, the UE may change configuration information-1 (e.g., afore-described various configuration information being indicatable by a POSS) indicated by a first-detected POSS to configuration information-2 indicated by a second-detected POSS and may newly apply it. According to the aforementioned method, it is possible for the UE to dynamically control a monitoring operation with respect to a PDCCH.

According to an embodiment of the disclosure, the BS may configure or indicate the UE whether to perform monitoring or not to perform monitoring on a GTS within Tduration via higher layer signaling (e.g., MAC CE signaling) or L1 signaling (DCI or POSS). The UE may be configured or indicated, by the BS, whether to perform monitoring or not to perform monitoring on a GTS within Tduration via higher layer signaling (e.g., MAC CE signaling) or L1 signaling (DCI or WUS), and may determine whether to monitor a GTS, depending on indication from the BS.

According to an embodiment of the disclosure, the UE may implicitly determine whether to perform or not to perform monitoring on a GTS within Tduration, based on configuration information about a GTS (a POSS monitoring occasion, Tduration, etc.). For example, when the POSS monitoring occasion is greater than a predefined or preset particular threshold value, the UE may not perform monitoring on a GTS within Tduration. As another example, when a monitoring occasion with respect to a GTS is smaller than the predefined or preset particular threshold value, the UE may not perform monitoring on a GTS within Tduration. As another example, when a time of Tduration is smaller than the predefined configured particular threshold, the UE may not perform monitoring on a GTS within Tduration. As another example, when a time of Tduration is greater than the predefined configured particular threshold, the UE may not perform monitoring on a GTS within Tduration.

According to an embodiment of the disclosure, a monitoring occasion of a GTS may be aligned with a time consisting of Tgap and Tduration. For example, the monitoring occasion of a GTS may be equal to Tduration. That is, the UE may not expect an additional monitoring occasion with respect to GTS would exist in time duration (e.g., Tduration) to which changed configuration indicated by a GTS is applied. That is, when the UE detects a GTS in a particular monitoring occasion, the UE may apply changed configuration contents of a PDCCH indicated by a POSS to time duration corresponding to a next monitoring occasion with respect to the GTS, and thus, may perform monitoring on other search space sets.

Also, according to an embodiment of the disclosure, the UE may always monitor search space sets configured as a common search space, regardless of whether a GTS is monitored.

According to an embodiment of the disclosure, regardless of indicated contents of a received GTS, the UE may changelessly maintain current configuration, which is configured via higher layer signaling, with respect to search space sets configured as a common search space, and may perform monitoring.

Third-9 Embodiment

According to an embodiment of the disclosure, a GTS may be transmitted in each cell, may be transmitted in each cell group, or may be transmitted in each BWP. Hereinafter, a unit group in which a GTS is transmitted will now be described.

Third-9-1 Embodiment

According to an embodiment of the disclosure, a GTS may be transmitted in each cell group including a plurality of cells. That is, one GTS corresponding to a plurality of cells may be transmitted, and the UE may receive a GTS corresponding to a plurality of cells by monitoring one CORESET or search space.

Figure 18:
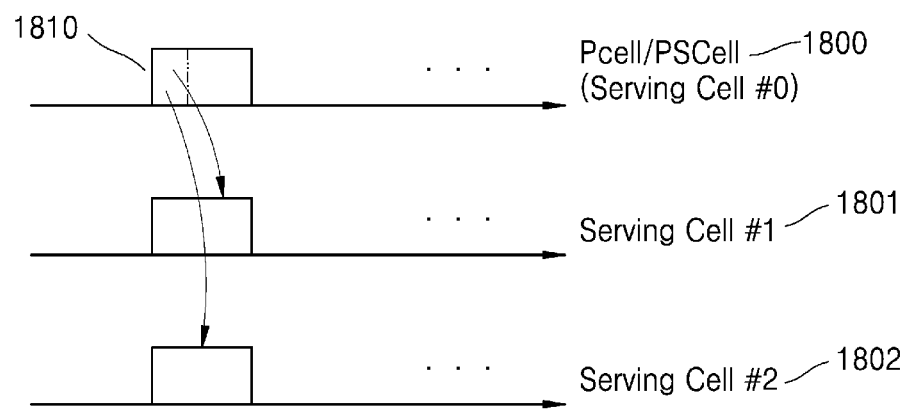
FIG. 18 is a diagram for describing a method of transmitting a GTS from each cell group including a plurality of cells according to an embodiment of the disclosure.

Referring to FIG. 18, one GTS 1810 may be transmitted in primary cell (Pcell) or primary SCll (PSCell) (Serving Cell #0) 1800. One GTS 1810 may control PDCCH monitoring configuration in Serving Cell #0 1800, Serving Cell #1 1801, and Serving Cell #2 1802.

According to an embodiment of the disclosure, a cross-carrier indicator may be included in one GTS 1810, and a cell to control PDCCH monitoring configuration may be indicated by the cross-carrier indicator in the GTS 1810. Alternatively, a cell to control PDCCH monitoring configuration may be indicated via a cross-carrier indication field (CIF). Also, PDCCH monitoring configuration in one GTS 1810 may be commonly applied to all cells.

Also, according to an embodiment of the disclosure, PDCCH monitoring configuration information about a plurality of cells may be included in one GTS 1810. For example, PDCCH monitoring configuration information with respect to a CA-configured cell or a CA-activated cell may be all included according to an order of cell indices. Also, a scaling factor of a PDCCH monitoring occasion may be included in one GTS 1810 according to an order of cell indices. According to an embodiment of the disclosure, when PDCCH monitoring configuration information about a plurality of cells is included in one GTS 1810, a cell to which PDCCH monitoring configuration information is mapped may be identified according to a bit location in the GTS 1810.

Also, a BWP in which one GTS for a plurality of cells is transmitted may be determined by the BS. The BS may configure a BWP in which one GTS for a plurality of cells is received, by using an identifier of the BWP.

Third-9-2 Embodiment

According to an embodiment of the disclosure, a GTS may be transmitted in each cell. That is, a GTS corresponding to each cell may be transmitted, and the UE may receive the GTS corresponding to each cell by monitoring a CORESET or search space corresponding to each cell.

Figure 19:
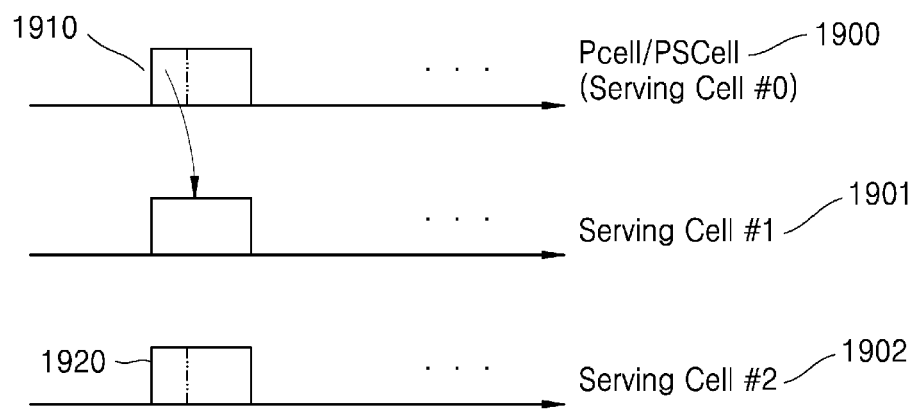
FIG. 19 is a diagram for describing a method of transmitting a GTS from each cell according to an embodiment of the disclosure.

Referring to FIG. 19, a first GTS 1910 may be GTS transmitted in a PCell or a PSCell (Serving Cell #0) 1900, and may control PDCCH monitoring configuration in the PCell or the PSCell. Also, a second GTS 1920 may be a GTS transmitted in a Serving Cell #2 1902, and may control PDCCH monitoring configuration in the Serving Cell #2 1902.

If it is a case in which cross-carrier scheduling is configured, the BS may control PDCCH monitoring configuration of another cell by using a cross-carrier indicator. Referring to FIG. 18, when cross-carrier scheduling is configured, the UE may control PDCCH monitoring configuration in a Serving Cell #1 1901, based on a carrier indicator or CIF and the first GTS 1910.

Also, when a GTS is transmitted in each cell, offset of the GTS in each cell may differ. That is, the BS may separately configure a GTS offset in each cell or may configure additional offset in each cell. In addition, a cycle of a GTS in each cell may differ.

Also, a BWP in which a GTS is transmitted in each cell may be same or differ. According to an embodiment of the disclosure, the BS may configure a BWP by using an identifier of the BWP in which a GTS for each cell is configured.

Third-9-3 Embodiment

Also, according to an embodiment of the disclosure, when a plurality of BWPs are configured, a GTS may be transmitted in a unit of an activated BWP. That is, GTSs respectively corresponding to BWPs may be transmitted, and the UE may receive a GTS corresponding to each BWP by monitoring a CORESET or search space corresponding to each BWP.

According to an embodiment of the disclosure, when a plurality of BWPs are configured, a GTS may be transmitted via a particular BWP for GTS transmission. The particular BWP for GTS transmission may be identified from other BWP, and may include an appropriate configuration for transmission of a PDCCH corresponding to the GTS by including a CORESET for GTS transmission and a search space configuration for GTS transmission.

According to an embodiment of the disclosure, a BWP switching indicator or BWP switching information may operate as a trigger for a GTS monitoring operation. For example, in a case where the UE monitors a BWP in which a GTS is not transmitted and then is switched to a BWP in which a GTS is transmitted, based on a BWP switching indicator or BWP switching information, a GTS monitoring operation may start.

Also, according to an embodiment of the disclosure, when the UE operates in a BWP in which a GTS is not transmitted, the BS may transmit an explicit indication to the UE to monitor a GTS.

According to an embodiment of the disclosure, PDCCH monitoring configuration information about a plurality of BWPs may be included in one GTS. When PDCCH monitoring configuration information about a plurality of BWPs is included in one GTS, a cell to which the PDCCH monitoring configuration information is mapped may be identified according to a bit location in the GTS.

Third-9-4 Embodiment

According to an embodiment of the disclosure, a GTS may include PDCCH monitoring configuration information about a plurality of UEs. That is, the GTS may be transmitted in units of a plurality of UEs. As described above, the BS may transmit a GTS via a CSS, and PDCCH monitoring configuration information about a plurality of UEs may be included in one GTS. For example, a scaling factor for a PDCCH monitoring occasion about each UE may be included in one GTS 1810.

According to an embodiment of the disclosure, when PDCCH monitoring configuration information about a plurality of UEs is included in one GTS 1810, the UE may identify a UE to which PDCCH monitoring configuration information is mapped, according to a bit location in the GTS 1810.

The embodiments described above may be combined with each other and operate. For example, a cycle and offset of a GTS may be configured to be associated with Active time or may be independently configured, a CORESET in which a GTS is transmitted may be configured via MIB or higher layer signaling, a search space in which a GTS is transmitted may be one or two search spaces, a method of controlling a PDCCH monitoring occasion of the UE via a GTS may be based on a value configured via higher layer signaling or may be accumulatively determined, and the disclosure is not limited to the above examples and the embodiments may be combined with each other.

Also, configuration of a GTS may correspond to at least some of configuration of a WUS. For example, configuration about a DCI format, RNTI, a cycle, offset, and the like of the GTS may correspond to configuration about a DCI format, RNTI, a cycle, offset, and the like of the WUS. Also, as described above, embodiments of a WUS may be all applied to a uni-POSS.

Fourth Embodiment

As described above, a WUS may be a POSS the UE monitors in inActive time. WUS may be preset DCI that is provided via a PDCCH. Hereinafter, a WUS will now be further described in detail.

Figure 20:
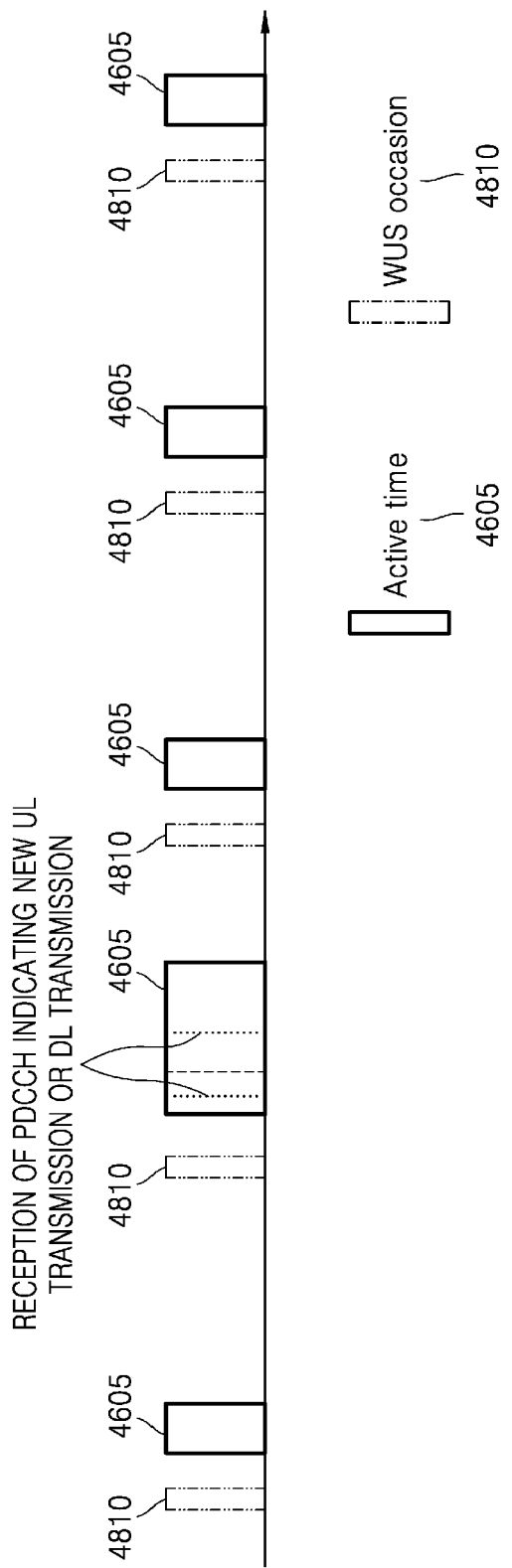
FIG. 20 is a diagram for describing a WUS according to an embodiment of the disclosure.

FIG. 20 is a diagram for describing a WUS according to an embodiment of the disclosure.

As described above, a WUS is a signal being transmitted to reduce power consumption of the UE. In an embodiment of the disclosure, a WUS may indicate whether the UE is to wake up to monitor a PDCCH. In more detail, a WUS may indicate whether the is to wake up in a DRX occasion so as to monitor a PDCCH. Also, a WUS may be transmitted in a PDCCH, and the UE may monitor the PDCCH and thus may detect DCI corresponding to the WUS. In the disclosure, DCI that corresponds to a POSS the UE detects by monitoring a PDCCH may be referred to as a WUS. Here, the DCI may be scrambled by a particular RNTI. The particular RNTI may be a newly-defined RNTI, or may use a legacy RNTI. The UE may receive a WUS, assuming that the WUS is scrambled by a particular RNTI. Here, the UE may de-scramble the WUS by using the particular RNTI. In an embodiment, DCI may be UE-specific DCI, or group-common DCI. Hereinafter, for convenience of descriptions, an operation of receiving DCI corresponding to WUS by monitoring a PDCCH is referred to as a WUS monitoring operation. Also, to receive a WUS may have the same meaning as to receive DCI corresponding to the WUS.

Referring to FIG. 20, when a WUS monitoring operation is configured, the UE may receive a WUS via a PDCCH in time duration configured for the UE to monitor a PDCCH after waking up in every DRX occasion, i.e., particular time duration before Active time 4605. In this manner, particular time duration for receiving a WUS is referred to as a WUS occasion 4810. In an embodiment, the WUS occasion 4810 may be located before minimally-configured offset from a start point of time of a DRX occasion, DRX onduration, activation of a drx-onDurationTimer, or Active time 4605, which is time duration in which the UE can receive a PDCCH or can monitor a PDCCH in a DRX operation. Here, offset may be configured as a time, the number of slots, the number of subframes, and the like.

In FIG. 20, it is illustrated that the WUS occasion 4810 is located in InActive time 4610 that is a time configured for the UE not to monitor a PDCCH in a DRX operation, i.e., a time configured not to receive the PDCCH, but the disclosure is not limited thereto, and the WUS occasion 4810 may be located in Active time 4605. This will be further described below.

When the UE detects a WUS by monitoring a PDCCH in the WUS occasion 4810, the UE may monitor or may not monitor a PDCCH in time duration configured as Active time 4605 according to indication by the WUS. In more detail, the UE may wake up in a DRX occasion according to indication by the WUS and may monitor a PDCCH in configured Active time 4605, or even when the DRX occasion starts, the UE may skip configured Active time 4605 and may continuously maintain a sleep or InActive state in InActive time 4610.

In an embodiment, a WUS may indicate the UE to wake up in a DRX occasion related to the WUS, may indicate the UE not to skip the DRX occasion related to the WUS, may indicate the UE to monitor a PDCCH in the DRX occasion related to the WUS, or may indicate the UE to start a drx-onDurationTimer in the DRX occasion related to the WUS. Alternatively/also, a WUS may not indicate the UE to wake up in a DRX occasion related to the WUS, may indicate the UE not to wake up in the DRX occasion related to the WUS, may indicate the UE not to monitor a PDCCH in the DRX occasion related to the WUS, may indicate the UE not to start a drx-onDurationTimer in the DRX occasion related to the WUS, or may indicate the UE to skip the associated DRX occasion.

In an embodiment, a length of the WUS occasion 4810 is shorter than that of Active time 4605. Therefore, a period of time in which a receiver is on to monitor a PDCCH to be received in the WUS occasion 4810 is shorter than a period of time in which the receiver is on to monitor a PDCCH to be received in Active time 4605. Therefore, the UE may monitor a PDCCH only when there is a PDCCH to be received, based on a WUS, and thus, may reduce power consumption of the UE.

Figure 21:
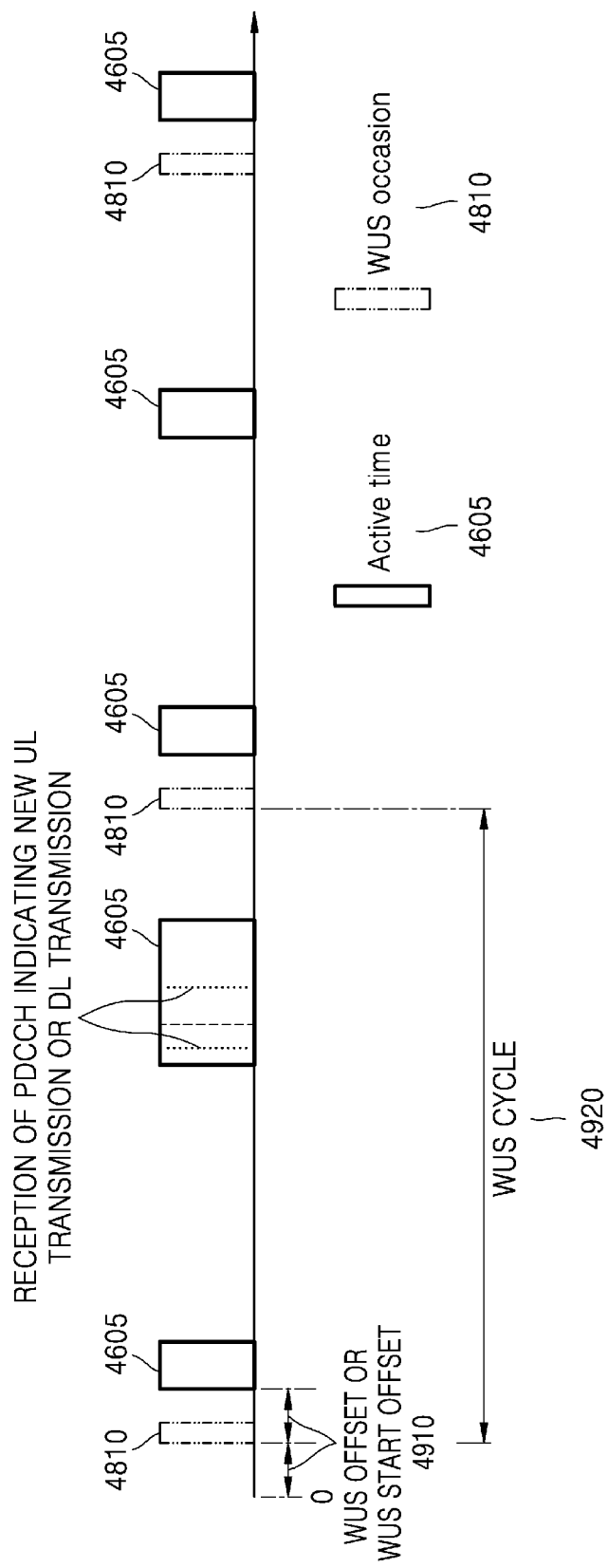
FIG. 21 is a diagram for describing a method of identifying a WUS occasion according to an embodiment of the disclosure.

FIG. 21 is a diagram for describing a method of identifying a WUS occasion region according to an embodiment of the disclosure.

Referring to FIG. 21, the BS may indicate a WUS occasion region for the UE. In more detail, the BS may provide the UE with WUS configuration information via higher layer signaling (RRC signaling, MIB, or SIB). In an embodiment, the WUS configuration information may include WUS-Offset or WUS-StartOffset 4910 and a WUS cycle 4920. The BS may configure a WUS monitoring operation by transmitting the WUS configuration information to the UE. The UE may detect DCI corresponding to a WUS by monitoring a PDCCH, based on the WUS configuration information provided by the BS.

Fourth-1-1 Embodiment

Hereinafter, in the fourth-1-1 embodiment, a method by which the BS configures the UE with a WUS monitoring operation, regardless of a DRX operation, will now be described.

In an embodiment of the disclosure, regardless of a DRX occasion that is time duration in which the UE can receive a PDCCH or monitors a PDCCH, the BS may configure the UE with WUS offset 4910 and a WUS cycle 4920. However, this indicates that a WUS can be configured, regardless of a DRX operation, and WUS configuration information may be expressed by using a parameter of DRX configuration information. In an embodiment, a WUS may consider a DRX operation or may independently operate regardless of the DRX operation, but in any case, the BS may configure the UE with a WUS occasion, regardless of the DRX operation.

In an embodiment of the disclosure, the BS may configure the UE with random values for the WUS-Offset or WUS-StartOffset 4910 and the WUS cycle 4920. Here, the WUS cycle 4920 may be configured as a time, the number of subframes, the number of slots, and the like. Also, the WUS-Offset or WUS-StartOffset 4910 may be configured as a time, the number of subframes, the number of slots, and the like. Furthermore, the WUS-Offset or WUS-StartOffset 4910 may have a negative value. In addition, WUS offset may be an absolute value, i.e., based on subframe 0, or may be a value relative to drx-startoffset.

In an embodiment of the disclosure, the BS may configure the UE with the WUS-Offset or WUS-StartOffset 4910 and the WUS cycle 4920, and may configure a subframe or a slot, which satisfies [Equation 6], [Equation 6A], or [Equation 6B], as a location of a WUS occasion. Furthermore, the BS may configure with WUS-SlotOffset, and a WUS occasion may be located on a slot after WUS-SlotOffset from a subframe which satisfies [Equation 6], [Equation 6A], or [Equation 6B]. Here, WUS-SlotOffset indicates a delay before a WUS-onDurationTimer is started. drx-SlotOffset may be configured as a time, the number of slots, and the like.

$$[(\mathit{SFN} \times 10) + \text{subframe number}] \bmod (\text{WUS-Cycle}) = \text{WUS-Offset(WUS-StartOffset)} \quad \text{[Equation 6]}$$

$$[(\mathit{SFN} \times 10) + \text{subframe number}] \bmod (\text{WUS-Cycle}) = (\mathit{drx}\text{-StartOffset} - \text{WUS-Offset}) \bmod (\text{WUS-Cycle}) \quad \text{[Equation 6A]}$$

$$[(\mathit{SFN} \times 10) + \text{subframe number}] \bmod (\text{WUS-Cycle}) = (\mathit{drx}\text{-StartOffset} - \text{WUS-Offset}) \bmod (\mathit{drx}\text{-ShortCycle}) \quad \text{[Equation 6B]}$$

Here, the WUS-Offset or WUS-StartOffset 4910 and the WUS cycle 4920 may be configured as WUS-CycleStartOffset (or WUS-CycleOffset). Also, WUS-CycleStartOffset (or WUS-CycleOffset) may be configured as a time, the number of subframes, the number of slots, and the like.

In an embodiment of the disclosure, the WUS-Offset or WUS-StartOffset 4910 may be configured based on a DRX occasion, DRX on duration, activation of a drx-onDurationTimer, or Active time 4605, which is time duration in which the UE can receive a PDCCH or can monitor a PDCCH. For example, a WUS occasion may be configured to start at a point before a start point (e.g., a start symbol) of the DRX occasion, the DRX on duration, activation of the drx-onDurationTimer, or Active time 4605 by the WUS-Offset or WUS-StartOffset 4910. Here, the WUS-Offset or WUS-StartOffset 4910 may also be configured as a time, the number of subframes, the number of slots, and the like, and may have a negative value.

In an embodiment of the disclosure, the WUS-Offset or WUS-StartOffset 4910 may be configured based on a DRX cycle. Here, the WUS-Offset or WUS-StartOffset 4910 may satisfy [Equation 7] below.

$$\text{WUS-Offset} < DRX \text{ cycle(or } drx\text{-LongCycle)} \qquad \text{[Equation 7]}$$

As described above, the WUS occasion 4810 may be located before minimally-configured offset from a start point of time of the DRX occasion, the DRX onduration, activation of the drx-onDurationTimer, or Active time 4605, which is time duration in which the UE can receive a PDCCH or can monitor a PDCCH. Accordingly, when the WUS-Offset or WUS-StartOffset 4910 is configured based on a DRX cycle, an absolute value of the WUS-Offset or WUS-StartOffset 4910 should be smaller than the DRX cycle (or a DRX-LongCycle).

Also, the WUS-Offset or WUS-StartOffset 910 may satisfy [Equation 8] below.

$$\text{WUS-Offset(or WUS-StartOffset)} = c^* DRX \text{ cycle(or } drx\text{-LongCycle)} (-1 < c < 1, c \text{ is a rational number)} \qquad \text{[Equation 8]}$$

Here, c may be a newly-configured parameter, or may be generated by combining legacy parameters.

In this case, the WUS occasion 4810 may be located before minimally-configured offset from a start point of time of the DRX occasion, the DRX onduration, activation of the drx-onDurationTimer, or Active time 4605, which is time duration in which the UE can receive a PDCCH or can monitor a PDCCH. Therefore, the WUS-Offset or WUS-StartOffset 4910 has to be smaller than a positive DRX cycle (or drx-LongCycle) and greater than negative DRX cycle (or drx-LongCycle). Here, the WUS-Offset or WUS-StartOffset 910 may also be configured as a time, the number of subframes, the number of slots, and the like, and may have a negative value.

In an embodiment, the WUS cycle 4920 may be configured to be N times (where N is a natural number) a DRX cycle. In more detail, the WUS cycle 4920 may be configured to be N times (where N is a natural number) a Long DRX cycle.

Fourth-1-2 Embodiment

Hereinafter, in the fourth-1-2 embodiment, a method by which the BS indicates a WUS occasion for the UE, in consideration of DRX configuration information, will now be described. In more detail, in consideration of a DRX occasion that is time duration in which the UE can receive a PDCCH or monitors a PDCCH, the BS may configure the UE with the WUS offset 4910 and the WUS cycle 4920. Also, WUS configuration information may be expressed by using a parameter of DRX configuration information. In an embodiment, WUS may operate, in consideration of a DRX operation. Here, the WUS cycle 4920 may be configured as a time, the number of subframes, the number of slots, and the like. Also, the WUS-Offset or WUS-StartOffset 4910 may be configured as a time, the number of subframes, the number of slots, and the like.

In an embodiment, the WUS cycle 4920 may differ, according to a length of a DRX cycle (or DRX-LongCycle). In more detail, the DRX cycle (or DRX-LongCycle) is compared with a preset value or a value set by the BS, and as a result of the comparison, the WUS cycle 4920 may be differently configured. For example, in a case where the preset value or the value set by the BS is X, when DRX cycle (or DRX-LongCycle)<X, the WUS cycle 4920=N*DRX cycle (or DRX-LongCycle) (N is a natural number). In this case, according to a value of N, one WUS and a plurality of DRX occasions may be one-to-N mapped. Also, in a case where the preset value or the value set by the BS is X, when DRX cycle (or DRX-LongCycle)≥X, it is possible that the WUS cycle 920=DRX cycle (or DRX-LongCycle). In this case, one WUS and one DRX occasion may be one-to-one mapped. Alternatively, when DRX cycle (or DRX-LongCycle)≥X, it is possible that WUS cycle=K*DRX cycle (or DRX-LongCycle) (K is a natural number). In this case, N and K may be different values and may be respectively indicated by the BS. Here, the WUS cycle 4920 and/or DRX cycle (or DRX-LongCycle) may be configured as a time, the number of subframes, the number of slots, and the like.

Also, in an embodiment, according to a length of the DRX cycle (or DRX-LongCycle, the WUS cycle 4920 may be preset or predefined. Here, a length of at least one DRX cycle (or DRX-LongCycle) and at least one WUS cycle 4920 may be mapped and stored in the form of Table. Here, the length of the DRX cycle (or DRX-LongCycle) and the WUS cycle 4920 are not required to necessarily correspond in 1:1 manner, and one or more WUS cycles 4920 may be mapped to a length of one DRX cycle (or DRX-LongCycle), or on the other hand, one WUS cycle 4920 may be mapped to a length of one or more DRX cycles (or DRX-LongCycles). In an embodiment, when a DRX cycle (or DRX-LongCycle) is set, the WUS cycle 4920 is also set according to Table. Here, the WUS cycle 4920 and/or the DRX cycle (or DRX-LongCycle) may be configured as a time, the number of subframes, the number of slots, and the like.

In an embodiment, the WUS-Offset or WUS-StartOffset 4910 may be configured based on the DRX occasion, the DRX onduration, activation of the drx-onDurationTimer, or Active time 4605, which is time duration in which the UE can receive a PDCCH or can monitor a PDCCH. For example, a WUS occasion may be configured to start at a point of time before a start point of time of the DRX occasion, the DRX onduration, activation of the drx-onDurationTimer, or Active time 4605 by the WUS-Offset or WUS-StartOffset 4910. Here, the WUS-Offset or WUS-StartOffset 4910 may also be configured as a time, the number of subframes, the number of slots, and the like, and may have a negative value.

In an embodiment, the WUS-Offset or WUS-StartOffset 4910 may be configured based on a DRX cycle. Here, the WUS-Offset or WUS-StartOffset 4910 may satisfy [Equation 9] below.

$$\text{WUS-Offset} < DRX \text{ cycle(or } drx\text{-LongCycle)} \qquad \text{[Equation 9]}$$

As described above, the WUS occasion 4810 may be located before minimally-configured offset from a start point of time of the DRX occasion, the DRX onduration, activation of the drx-onDurationTimer, or Active time 4605, which is time duration in which the UE can receive a PDCCH or can monitor a PDCCH. Accordingly, when the WUS-Offset or WUS-StartOffset 4910 is configured based on a DRX cycle, an absolute value of the WUS-Offset or WUS-StartOffset 4910 should be smaller than the DRX cycle (or a DRX-LongCycle).

Also, the WUS-Offset or WUS-StartOffset 910 may satisfy [Equation 10] below.

$$\text{WUS-Offset(or WUS-StartOffset)} = c^* DRX \text{ cycle(or } drx\text{-LongCycle)} (-1 < c < 1, c \text{ is a rational number)} \qquad \text{[Equation 10]}$$

Here, c may be a newly-configured parameter, or may be generated by combining legacy parameters.

In this case, the WUS occasion 4810 may be located before minimally-configured offset from a start point of time of the DRX occasion, the DRX onduration, activation of the drx-onDurationTimer, or Active time 4605, which is time duration in which the UE can receive a PDCCH or can monitor a PDCCH. Therefore, the WUS-Offset or WUS-StartOffset 4910 has to be smaller than a positive DRX cycle (or drx-LongCycle) and greater than negative DRX cycle (or drx-LongCycle). Here, the WUS-Offset or WUS-StartOffset 4910 may also be configured as a time, the number of subframes, the number of slots, and the like, and may have a negative value.

In an embodiment, WUS may include a BWP switching indicator or BWP switching information for indicating switching to a particular bandwidth. In this regard, BWP switching requires a physical time. A time taken for the BWP switching may be referred to as a BWP switching delay TBWP_delay. The WUS-Offset or WUS-StartOffset 4910 may be configured to be greater than a BWP switching delay value, in consideration of the BWP switching delay. In more detail, the WUS-Offset or WUS-StartOffset 4910 may be configured to be greater than a maximum BWP switching delay value.

As described above, in the next-generation mobile communication system (the 5G or NR system), the BS may configure the UE with one or more BWPs. At least one BWP from among the configured one or more BWPs may be activated. For example, the BS may transmit WUS via the activated BWP, the WUS indicating whether to wake up to monitor a PDCCH in a CORESET of an inactivated BWP. In this case, a hardware and/or software processing procedure may be required to activate the inactivated BWP, and a delay may occur in the processing procedure. Therefore, in an embodiment, the BS may configure the WUS-Offset or WUS-StartOffset 4910 to be greater than a BWP switching delay value, in consideration of such BWP switching delay.

Figure 22:
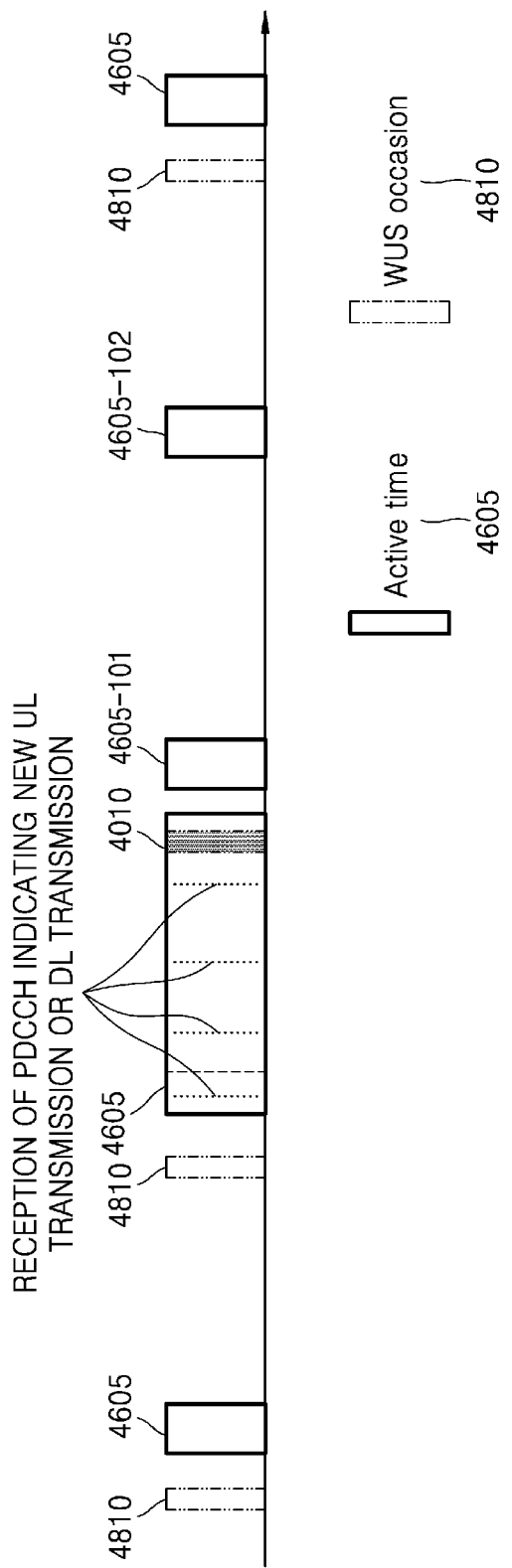
FIG. 22 is a diagram for describing a method of monitoring a physical downlink control channel (PDCCH) for receiving a WUS when a WUS occasion is located in Active time according to an embodiment of the disclosure.

FIG. 22 is a diagram for describing a method of monitoring a PDCCH for receiving a WUS when a WUS occasion is located in Active time according to an embodiment of the disclosure.

Referring to FIG. 22, when the UE operates in a Long DRX cycle and then receives a preset event, e.g., a PDCCH indicating new UL transmission or DL transmission (4630) in Active time 605, the UE starts or re-starts drx-InactivityTimer. Although not illustrated in FIG. 10, in this case, the UE may operate in a short DRX cycle. When the UE receives the PDCCH indicating new UL transmission or DL transmission (4630), the UE expects additional UL transmission or DL transmission at a later time and thus extends Active time 4605 and/or delays a start of InActive time.

Here, in a case where the PDCH indicating new UL transmission or DL transmission is continuously received and thus the drx-InactivityTimer is continuously re-started, Active time 4605 is repeatedly extended and/or a start of InActive time is delayed, such that a WUS occasion 4010 may be located within Active time 4605 due to various reasons. According to an embodiment, in order to power consumption of the UE, the UE wakes up from a sleep or InActive state in a DRX operation so as to receive WUS to check whether there is a PDCCH to receive. However, when the WUS occasion is within Active time 4605, the UE is already awake and thus is in Active state, such that it is required for the BS to determine whether to transmit WUS. Also, the UE may need to determine whether to monitor a PDCCH to detect DCI corresponding to the WUS.

Fourth-2-1 Embodiment

Hereinafter, in the fourth-2-1 embodiment, a method of not monitoring WUS when a WUS occasion is located in Active time 4605 will now be described.

In an embodiment, when Active time 4605 is repeatedly extended or and/or a start of InActive time is delayed, and thus, the WUS occasion 4010 is located within Active time 4605 due to various reasons, the BS may not transmit WUS. Also, the UE may not monitor a PDCCH to detect DCI corresponding to WUS. WUS is a signal for waking up the UE in a sleep or InActive state, but in this case, as the UE is already awake, there is no need to monitor a PDCCH to detect DCI corresponding to the WUS.

In an embodiment, a DRX occasion related to a WUS occasion in which a PDCCH is not monitored may perform a particular operation. Here, the particular operation may include an operation for which it is assumed that the UE always wakes up in the DRX occasion, or may include a default operation. The default operation may be pre-defined or may be pre-configured by the BS. The default operation may include a wake-up operation. For example, in FIG. 22, in a DRX occasion 4605-101 related to the WUS occasion 4010 located in Active time 4605, the UE may perform an operation, assuming that the UE wakes up, or may perform the default operation, e.g., a wake-up operation. Furthermore, FIG. 10 illustrates that the WUS occasion 4010 is related to one DRX occasion 4605-101 but is not limited thereto and may be related to a plurality of DRX occasions 4605-101 and 4605-102. In this case, in all the DRX occasions 4605-101 and 4605-102, the UE may perform an operation, assuming that the UE wakes up, or may perform the default operation, e.g., a wake-up operation.

Fourth-2-2 Embodiment

Hereinafter, in the fourth-2-2 embodiment, a method of monitoring WUS when a WUS occasion is located within Active time 4605 will now be described.

In an embodiment, even in a case where Active time 4605 is repeatedly extended and/or a start of InActive time is delayed, and thus, the WUS occasion 4010 is located within Active time 4605 due to various reasons, the BS may transmit WUS. Also, the UE may monitor a PDCCH to detect DCI corresponding to the WUS.

In an embodiment, when the WUS occasion 4010 is located within Active time 4605, in a case where, as a result of detecting DCI corresponding to WUS by monitoring a PDCCH, when it is not indicated for the UE to wake up in a DRX occasion related to the WUS, when it is indicated for the UE not to wake up in the DRX occasion related to the WUS, when a PDCCH is not monitored in the DRX occasion related to the WUS, when it is indicated not to start the drx-onDurationTimer 615, or when it is indicated to skip the DRX occasion, the UE may stop Active time 4605. In more detail, the UE may stop drx-onDurationTimer and/or may stop drx-InactivityTimer. Then, the UE may switch to a sleep or InActive state.

Also, in an embodiment, when the WUS occasion 4010 is located within Active time 4605, a size of DCI corresponding to WUS may be aligned to have a same size as legacy DCI formats (e.g., DCI format 0_0/1_0). Descriptions will now be provided with reference to FIG. 23.

Figure 23:
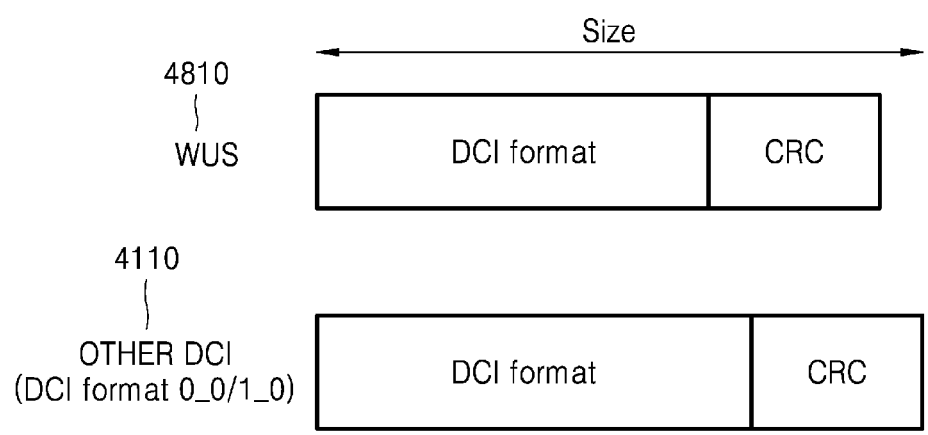
FIG. 23 is a diagram for describing a DCI format and size which correspond to a WUS according to an embodiment of the disclosure.

FIG. 23 is a diagram for describing a DCI format and size corresponding to WUS according to an embodiment of the disclosure.

According to an embodiment of the disclosure, DCI corresponding to WUS may have a size different from legacy DCI formats (e.g., DCI format 0_0/1_0). In order to decrease complexity of the UE due to DCI decoding, the next-generation mobile communication system (the 5G or NR system) may limit the number of DCIs to a particular number or less, the DCIs having different sizes to be monitored by the UE at a particular time. For example, the next-generation mobile communication system (the 5G or NR system) may always satisfy both two conditions below.
[Condition 1]
The UE may monitor a maximum of X DCIs having different sizes per slot (e.g., X=4).
[Condition 2]
The UE may monitor a maximum of Y DCIs having different sizes per slot with respect to a particular RNTI. For example, the particular RNTI may indicate C-RNTI, CS-RNTI, MCS-C-RNTI, or other UE-specific RNTI (e.g., Y=3).

The BS may appropriately adjust a DCI size to satisfy [Condition 1] and [Condition 2] described above. The UE may not expect configuration of a DCI size that fails to satisfy [Condition 1] and [Condition 2] described above. A size of a frequency-axis resource allocation field of DCI format 0_0/1_0 being monitored in a UE-specific search space may be determined as a size of a currently-activated BWP. However, in a case where a size of DCI format 0_0/1_0 being monitored in the UE-specific search space is determined as the size of the currently-activated BWP, and the afore-described conditions of the DCI size limit are not satisfied, the size of the frequency-axis resource allocation field of the corresponding DCI format 0_0/1_0 may be determined as a size of an initial BWP. That is, a size of DCI format 0_0/10 being monitored in a common search space, and a size of DCI format 0_0/1_0 being monitored in a UE-specific search space become equal, and thus, the number of DCIs having different sizes may be decreased.

In general, WUS is transmitted in InActive time, and thus, other DCIs 4110 being transmitted together are not present. Therefore, DCI corresponding to the WUS 810 being transmitted in InActive time 610 may be configured to have a same size as formats of other DCIs 4110, and may not consider other DCIs 4110. However, as illustrated in FIG. 22, when the WUS occasion 4010 is located within Active time 4605, the WUS is transmitted in Active time, and thus, the WUS may be configured to have a size equal to other DCI formats 4110 (e.g., DCI format 0_0/1_0, etc.) that are transmitted together. Even when [Condition 1] or [Condition 2] described above is not satisfied, the size of the WUS may not be aligned to have a same size as other DCI format 1110 (e.g., the DCI format 0_0/1_0, etc.).

Alternatively, when [Condition 1] or [Condition 2] described above is not satisfied, the size of the WUS 810 may be aligned to have a same size as other DCI format 1110 (e.g., the DCI format 0_0/1 0, etc.). In order to align sizes of DCIs being transmitted, when a size of DCI corresponding to the WUS 810 is smaller than other DCI format 4110, 0 may be inserted (zero-padding), and when the size of the DCI corresponding to the WUS 810 is larger than other DCI format 4110, a bit corresponding to some fields may be truncated.

According to an embodiment, the size of the DCI corresponding to the WUS 4810 may be aligned, such that the number of times the UE performs blind decoding with respect to a search space may be decreased and thus power of the UE may be saved.

In addition, in an embodiment, in a case where the WUS occasion is located within Active time 4605, when WUS indicates the UE to wake up in a DRX occasion, the UE may start a drx-ShortCycletimer and may operate in a short DRX cycle. The fact that the WUS indicates the UE to wake up in the DRX occasion means that there is data to be transmitted in the DRX occasion, and thus, the UE may immediately operate in the short DRX cycle.

According to an embodiment, WUS may indicate an operation of the UE in a DRX occasion related to the WUS. In order for the WUS to indicate the operation of the UE in the DRX occasion related to the WUS, a method of mapping the WUS and the DRX occasion is requested.

Fourth-3-1 Embodiment

Hereinafter, in the fourth-3-1 embodiment, a method of mapping a WUS and a DRX occasion in one-to-one manner will now be described.

Figure 24:
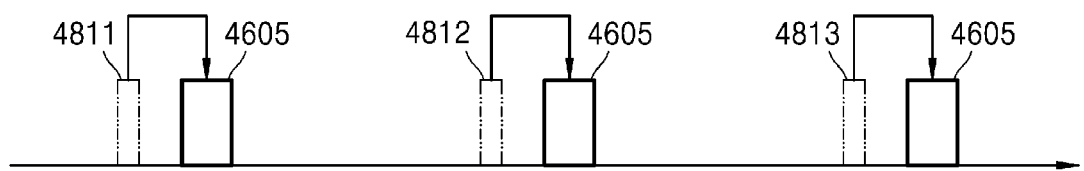
FIG. 24 is a diagram for describing a method of mapping a WUS and a DRX occasion in one-to-one manner according to an embodiment of the disclosure.

FIG. 24 is a diagram for describing a method of mapping a WUS and a DRX occasion in one-to-one manner according to an embodiment of the disclosure.

Referring to FIG. 24, in an embodiment, each of WUSs 4811, 4812, and 4813 and one DRX occasion 4605 may be one-to-one mapped. In more detail, one WUS may indicate the UE to wake up in one DRX occasion related to the WUS, may indicate the UE not to skip one DRX occasion related to the WUS, may indicate the UE to monitor a PDCCH in one DRX occasion related to the WUS, or may indicate the UE to start a drx-onDurationTimer in one DRX occasion related to the WUS.

Also, one WUS may not indicate the UE to wake up in one DRX occasion related to the WUS, may indicate the UE not to wake up in one DRX occasion related to the WUS, may indicate the UE not to monitor a PDCCH in one DRX occasion related to the WUS, may indicate the UE not to start the drx-onDurationTimer, or may indicate the UE to skip one DRX occasion related to the WUS.

In an embodiment, when each of WUSs 4811, 4812, and 4813 and one DRX occasion 4605 are one-to-one mapped, a WUS cycle and a DRX cycle (or DRX-LongCycle) may be equal.

Fourth-3-2 Embodiment

Hereinafter, in the fourth-3-2 embodiment, a method of mapping a WUS and a DRX occasion in one-to-one manner will now be described.

Figure 25:
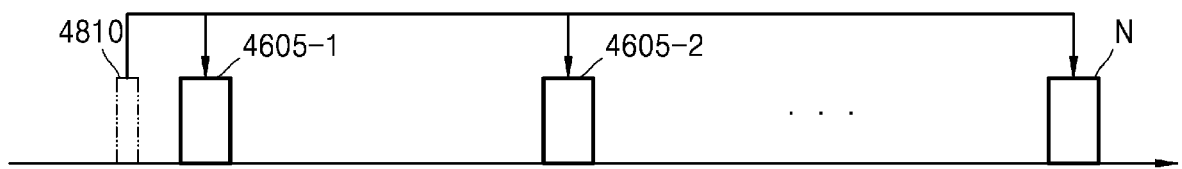
FIG. 25 is a diagram for describing a method of mapping a WUS and a DRX occasion in one-to-one manner according to an embodiment of the disclosure.

FIG. 25 is a diagram for describing a method of mapping a WUS and a DRX occasion in one-to-one manner according to an embodiment of the disclosure.

Referring to FIG. 25, in an embodiment, one WUS 4810 and a plurality of DRX occasions 4605-1, 4605-2, and 4605-3 may be one-to-N mapped (where, N is a natural number). In more detail, one WUS may indicate the UE to wake up in and a plurality of DRX occasions related to the WUS, may indicate the UE not to skip the plurality of DRX occasions related to the WUS, may indicate the UE to monitor a PDCCH in the plurality of DRX occasions related to the WUS, or may indicate the UE to start a drx-onDurationTimer in the plurality of DRX occasions related to the WUS.

Also, one WUS may not indicate the UE to wake up in a plurality of DRX occasions related to the WUS, may indicate the UE not to wake up in the plurality of DRX occasions related to the WUS, may indicate the UE not to monitor a PDCCH in the plurality of DRX occasions related to the WUS, may indicate the UE not to start a drx-onDurationTimer, or may indicate the UE to skip the plurality of DRX occasions related to the WUS.

In an embodiment, when one WUS 4810 and a plurality of DRX occasions 4605 are one-to-N mapped, same content may be indicated in the plurality of DRX occasions 4605-1, 4605-2, and 4605-3, and content to be indicated may differ in each of the DRX occasions 4605-1, 4605-2, and 4605-3. For example, in FIG. 13, one WUS 4810 may indicate the UE to wake up in all of the plurality of DRX occasions 4605-1, 4605-2, and 4605-3. Also, one WUS 4810 may indicate the UE to wake up in the DRX occasion 4605-1, to skip the DRX occasion 4605-2, and to wake up in the DRX occasion 4605-3.

In an embodiment, N may be a preset value. For example, N may be a fixed value related to a WUS monitoring operation in a communication system, or may be a value included in WUS configuration information when the BS provides the UE with the WUS configuration information via higher layer signaling (RRC signaling, MIB, or SIB).

Also, in an embodiment, N may be a value indicated by a WUS. In this case, N may be indicated as a natural number or may be indicated in the form of a bitmap. For example, in a case where 3 DRX occasions exist after a WUS occasion, the BS may indicate N in the form of a bitmap such as 101, and thus, may indicate that a WUS indicates an operation in first and third DRX occasions. Alternatively, the BS may indicate N in the form of a bitmap such as 111, and thus, may indicate that a WUS indicates an operation in first, second, and third DRX occasions.

Furthermore, in an embodiment, N may be implicitly indicated by a WUS occasion and a DRX occasion. For example, the UE may monitor a PDCCH, assuming that all DRX occasions located between two adjacent WUS occasions are associated with a WUS that is located temporally ahead. That is, a WUS received in one WUS occasion may be mapped to all DRX occasions that exist after the WUS occasion and before a next WUS occasion. In more detail, a WUS being located temporally ahead may indicate the UE to wake up in all DRS occasions located between a next WUS occasion and monitor a PDCCH, may indicate the UE not to wake up in all DRX occasions located between two adjacent WUS occasions, or may indicate the UE to wake up only in a configured DRX occasion and monitor a PDCCH. For example, when 7 DRX occasions exist between a first WUS occasion located temporally ahead and a second WUS occasion being adjacent to the first WUS occasion or located immediately after the first WUS occasion, N=7. Here, a WUS received in the first WUS occasion may be implicitly mapped to the 7 DRX occasions. Also, the WUS received in the first WUS occasion may indicate the UE to wake up in all of the 7 DRX occasions between the first WUS occasion and the second WUS occasion and monitor a PDCCH, may indicate the UE not to wake up in all DRX occasions, or may indicate the UE to wake up only in a configured DRX occasion and monitor a PDCCH. However, this is merely an example, and the disclosure is not limited thereto and N may be implicitly indicated by using various methods.

In addition, according to an embodiment of the disclosure, N may be indicated based on a time interval between adjacent WUS occasions. For example, when the time interval between adjacent WUS occasions is greater or smaller than a particular value, N may be implicitly or explicitly configured.

In an embodiment, a WUS may indicate an operation of the UE in a DRX occasion related to the WUS. Here, the WUS may indicate, by 1 bit, whether the UE is to wake up in all related DRX occasions, or may indicate, by N bits, whether the UE is to wake up in each of related DRX occasions. Alternatively, by K bit, additional information, e.g., when the UE is to wake up may be provided along with whether the UE is to wake up.

Fourth-4-1 Embodiment

Hereinafter, in the fourth-4-1 embodiment, a method by which a WUS only indicates, by 1 bit, whether the UE is to wake up will now be described.

In an embodiment, when a WUS indicates an operation of the UE in a DRX occasion related to the WUS, the WUS may only indicate, by 1 bit, whether the UE is to wake up. According to an embodiment, overhead may be decreased by transmitting only minimum data.

Also, in an embodiment, indicating whether the UE is to wake up may include indicating the UE to wake up in a DRX occasion related to a corresponding WUS, indicating the UE not to skip the DRX occasion related to the corresponding WUS, indicating the UE to monitor a PDCCH in the DRX occasion related to the corresponding WUS, or indicating the UE to start a drx-onDurationTimer in the DRX occasion related to the corresponding WUS. Also, the indication may include not indicating the UE to wake up in the DRX occasion related to the corresponding WUS, indicating the UE not to wake up in the DRX occasion related to the corresponding WUS, indicating the UE not to monitor a PDCCH in the DRX occasion related to the corresponding WUS, indicating the UE not to start the drx-onDuration-Timer in the DRX occasion related to the corresponding WUS, or indicating the UE to skip the DRX occasion related to the corresponding WUS.

Figure 26:
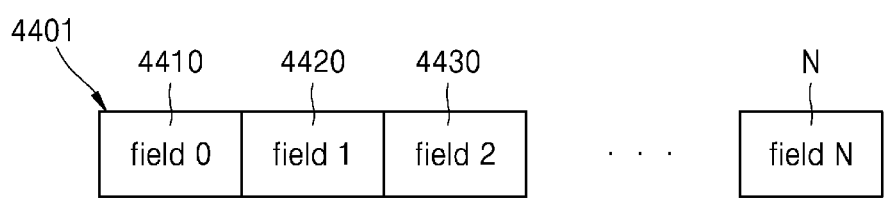
FIG. 26 is a diagram for describing a method by which a WUS and DRX occasions are one-to-N mapped, and the WUS indicates, by 1 bit, whether the UE is to wake up, according to an embodiment of the disclosure.

FIG. 26 is a diagram for describing a method by which a WUS and DRX occasions are one-to-N mapped, and the WUS indicates, by 1 bit, whether the UE is to wake up, according to an embodiment of the disclosure.

In an embodiment, when a WUS indicates, by 1 bit, whether the UE is to wake up, and the WUS and DRX occasions are one-to-N mapped, the WUS may be indicated in the form of a bitmap 4401. Referring to FIG. 14, the bitmap may consist of N bits, and fields (4410, 4420, 4430, . . . . N) respectively corresponding to bits may indicate, by 0 or 1, whether the UE is to wake up in a mapped DRX occasion.

Fourth-4-2 Embodiment

Hereinafter, in the fourth-4-2 embodiment, a method by which a WUS indicates, by K bit, whether the UE is to wake up, and additional information, e.g., information about a point of time in Active time 4605 at which the UE is to wake up will now be described.

In an embodiment, a size of a field indicating the additional information, i.e., a value of K, may be indicated by the BS. The BS may provide the UE with the value of K via higher layer signaling (RRC signaling, MIB, or SIB). Also, the additional information may include information indicating at which point of time in Active time 4605 the UE is to wake up, information indicating at which point of time the UE is not to wake up, information related to changing WUS configuration (e.g., indication of performing a default operation), and the like. Also, in an embodiment, indicating whether the UE is to wake up may include indicating the UE to wake up in a DRX occasion related to a corresponding WUS, indicating the UE not to skip the DRX occasion related to the corresponding WUS, indicating the UE to monitor a PDCCH in the DRX occasion related to the corresponding WUS, or indicating the UE to start a drx-onDurationTimer in the DRX occasion related to the corresponding WUS. Also, the indication may include not indicating the UE to wake up in the DRX occasion related to the corresponding WUS, indicating the UE not to wake up in the DRX occasion related to the corresponding WUS, indicating the UE not to monitor a PDCCH in the DRX occasion related to the corresponding WUS, indicating the UE not to start the drx-onDurationTimer in the DRX occasion related to the corresponding WUS, or indicating the UE to skip the DRX occasion related to the corresponding WUS.

Hereinafter, for convenience of descriptions, the additional information will now be described as the information indicating at which point of time in Active time 4605 the UE is to wake up. However, the disclosure is not limited thereto, and the additional information may include various information.

Figure 27:
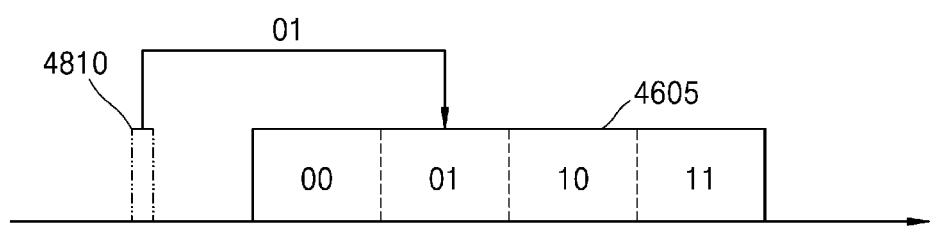
FIG. 27 is a diagram for describing a method by which a WUS indicates information indicating at which point of time in Active time the UE is to wake up, according to an embodiment of the disclosure.

In an embodiment, one field consisting of K bits may all include information about whether the UE is to wake up and information indicating at which point of time in Active time 4605 the UE is to wake up. With reference to FIG. 27, the information indicating at which point of time in Active time 4605 the UE is to wake up will now be described.

FIG. 27 is a diagram for describing a method by which a WUS indicates information indicating at which point of time in Active time the UE is to wake up, according to an embodiment of the disclosure.

Referring to FIG. 27, Active time 4605 is divided into 4 time durations, and each time duration may be indicated by 2 bits. In more detail, each time duration may be indicated by a code point of 00, 01, 10, or 11. In an embodiment, a WUS may include information about whether the UE is to wake up along with information about time duration in which the UE is to wake up. As an example of the situation of FIG. 15, a WUS may consist of a total of 3 bits by indicating, by 1 bit, the information about whether the UE is to wake up, and by 2 bits, the information about time duration in which the UE is to wake up. That is, it is possible that K=3. In this case, time duration may be each of N DRX occasions mapped to a WUS occasion.

Referring back to the descriptions of the fourth-4-2 embodiment, in an embodiment, in the WUS, the information about whether the UE is to wake up and the information indicating at which point of time in Active time 4605 the UE is to wake up may be separated and included in different fields. In this case, as in the third-2 embodiment, the fields may respectively indicate operations about a plurality of DRX occasions corresponding to the WUS. Also, in an embodiment, each field may be expressed as a bitmap. For example, when a WUS is mapped to 5 DRX occasions (N=5), whether the UE is to wake up in each DRX occasion may be indicated by a bitmap of 5 bits. Also, additional information, e.g., information indicating at which point of time in Active time 4605 the UE is to wake up may be indicated by a bitmap of K bits.

In an embodiment, according to a relation between a value of N indicating how many DRX occasions are mapped to a WUS and a value of K indicating a size of additional information, interpretation of a region indicated by a bitmap may vary. For example, when N=5 and K=3, some of K bits may indicate information about 2 DRX occasions according to ceil(N/K)=2, and some of the others may indicate information about 1 DRX occasion according to Floor(N/K)=1.

In an embodiment, a WUS may be transmitted for one UE or may be transmitted for a plurality of UEs. In more detail, the WUS may include PDCCH monitoring configuration information for one UE, or may include PDCCH monitoring configuration information for a plurality of UEs. That is, the WUS may be transmitted in units of a plurality of UEs.

In an embodiment, the BS may transmit a WUS via a CSS, and one WUS may include PDCCH monitoring configuration information for a plurality of UEs. For example, one WUS may include a scaling factor for a PDCCH monitoring cycle with respect to each UE. Also, according to a bit location in a WUS, a cell to which PDCCH monitoring configuration information is to be mapped may be identified.

When a WUS only indicates, by 1 bit, whether the UE is to wake up, it is possible to decrease overhead but it is difficult to transmit a huge amount of information.

According to an embodiment, by increasing a size of data transmitted in a WUS up to K bits and also transmitting additional information, an operation of the WUS may be more elaborately controlled.

Figure 28:
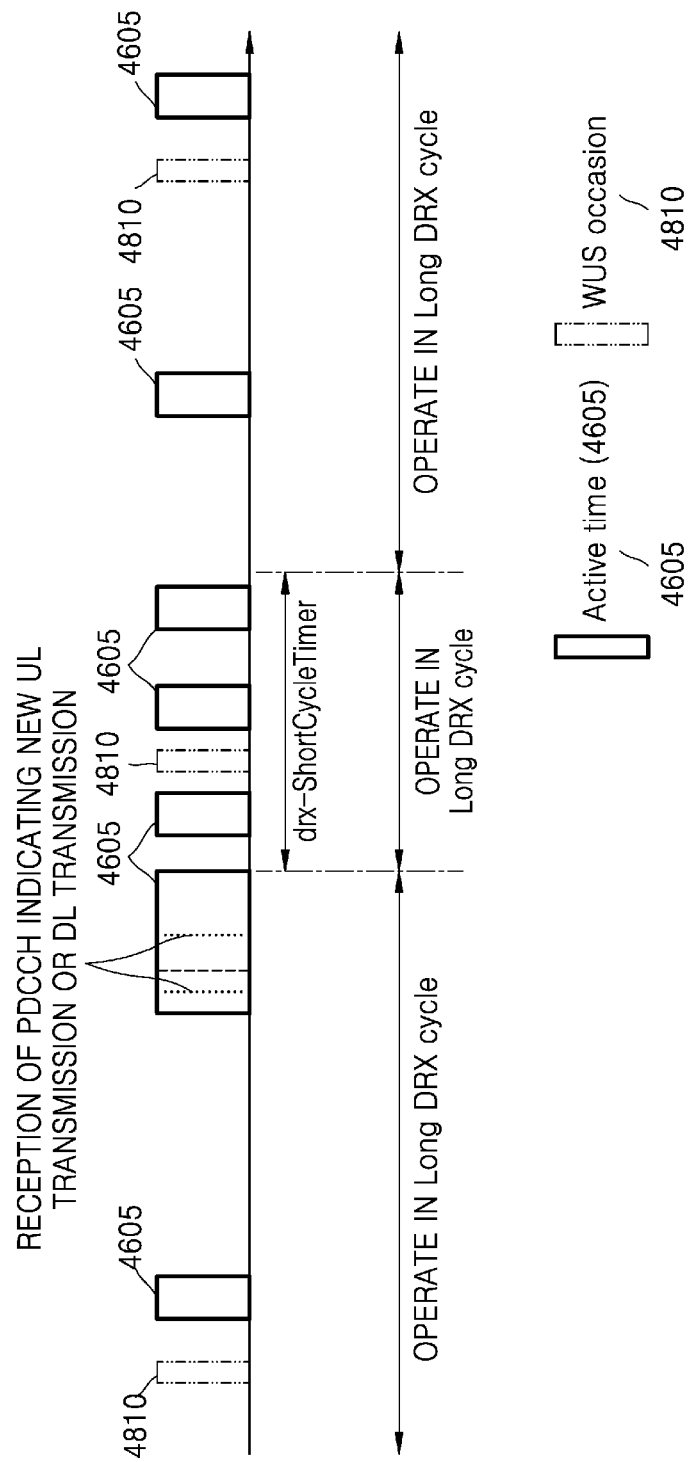
FIG. 28 is a diagram for describing a relation between a WUS operation and Short DRX according to an embodiment of the disclosure.

FIG. 28 is a diagram for describing a relation between a WUS monitoring operation and Short DRX according to an embodiment of the disclosure.

Referring to FIG. 28, while the UE operates in a Long DRX cycle, when a preset event, e.g., reception of a PDCCH indicating new UL transmission or DL transmission, occurs in Active time 605, the UE may operate in a short DRX cycle. The short DRX cycle may be optionally applied. In more detail, the UE starts a drx-ShortCycleTimer before expiry of a previous drx-onDurationTimer or a drx-InactivityTimer, and operates in a short DRX cycle until the drx-ShortCycleTimer expires. Afterward, when the drx-ShortCycleTimer expires, the UE operates in the Long DRX cycle again.

There is a need to determine a relation between a short DRX cycle operation and a WUS monitoring operation.

Fourth-5-1 Embodiment

Hereinafter, in the fourth-5-1 embodiment, in a case where a short DRX cycle operation and a WUS monitoring operation are all configured, a method of performing only one of the short DRX cycle operation or the WUS monitoring operation will now be described.

In an embodiment, the UE may not be configured simultaneously with the short DRX cycle operation and the WUS monitoring operation. In a case where one of operations is first configured, the UE may not be configured with the other operation, or even when the UE receives configuration information from the BS, the UE may ignore it.

Alternatively, in an embodiment, in a case where the UE is configured simultaneously with the short DRX cycle operation and the WUS monitoring operation, the UE may determine that one of the two operations is released. That is, when the short DRX cycle operation and the WUS monitoring operation are simultaneously configured for the UE, the UE may perform only the short DRX cycle operation or the WUS monitoring operation. Here, according to an order of time in which the short DRX cycle operation and the WUS monitoring operation are configured, at least one of operations may be released. For example, an early-configured operation may be released, and thus, the UE may perform only a later-configured operation, or the later-configured operation may be released, and thus, the UE may perform only the early-configured operation.

In an embodiment, a WUS monitoring operation may operate only in relation to a Long DRX cycle, and when a short DRX cycle is configured, the WUS monitoring operation may not be performed. In detail, when a drx-ShortCycleTimer is running, the UE may not perform a monitoring operation on a WUS.

Fourth-5-2 Embodiment

Hereinafter, in the fourth-5-2 embodiment, a method of not performing a WUS monitoring operation when a short DRX cycle operation and a WUS operation are all configured will now be described.

In an embodiment, when the UE operates in a short DRX cycle, the UE may not perform the WUS monitoring operation. That is, when a drx-ShortCycleTimer is running, the UE may not wake up in a WUS occasion. In more detail, the UE may not monitor a PDCCH to detect DCI corresponding to a WUS in the WUS occasion. Afterward, when the drx-ShortCycleTimer is stopped or is expired, the UE may resume the WUS monitoring operation. Also, in an embodiment, when the UE operates again in a Long DRX cycle, the UE may resume the WUS monitoring operation. The fact that the UE resumes the WUS monitoring operation means that the UE wakes up in a WUS occasion and monitors a PDCCH to detect DCI corresponding to a WUS.

In an embodiment, when the UE operates in a short DRX cycle, the UE may always wake up in a DRX occasion and monitor a PDCCH. As described above, in a case where the UE operates in the short DRX cycle, when the UE does not perform a WUS monitoring operation, the UE cannot identify whether transmission of data is scheduled in a DRX occasion corresponding to a WUS occasion, and thus, in order to receive data, the UE may always wake up in the DRX occasion and monitor a PDCCH. Furthermore, even when the UE operates in a short DRX cycle and then operates again in a Long DRX cycle, in order to detect DCI corresponding to a WUS, the UE may always wake up in a DRX occasion corresponding to a WUS occasion in which a PDCCH is not monitored, and may monitor a PDCCH.

Fourth-5-3 Embodiment

Hereinafter, in the fourth-5-3 embodiment, in a case where a short DRX cycle operation and a WUS monitoring operation are all configured, a method of performing both a WUS short DRX cycle operation and the WUS monitoring operation will now be described.

In an embodiment, in order to apply the WUS monitoring operation during the short DRX cycle operation, new WUS configuration information may be applied. In this case, a WUS monitoring operation performed in a Long DRX cycle may be referred to as a Long-WUS, and a WUS monitoring operation performed in a short DRX cycle may be referred to as a short-WUS. The Long-WUS and the short-WUS may be differently configured in WUS offset and a WUS cycle. In an embodiment, the BS may start a short on duration timer for the UE as in the Long-WUS. In more detail, the BS may provide the UE with short-WUS configuration information via higher layer signaling (RRC signaling, MIB, or SIB). Furthermore, when operating in response to the short-WUS, DCI corresponding to the short-WUS may have a DCI format different from DCI corresponding to the Long-WUS. Here, the DCI corresponding to the short-WUS may be scrambled by an RNTI different from the DCI that corresponds to the Long-WUS. Also, the DCI corresponding to the short-WUS may be transmitted in a control region, i.e., a CORESET, which is different from a control region in which the DCI corresponding to the Long-WUS is transmitted. Also, the DCI corresponding to the short-WUS may be transmitted in a search space different from a search space in which the DCI corresponding to the Long-WUS is transmitted.

In an embodiment, a short-WUS cycle may vary according to a length of a short DRX cycle. In more detail, a drx-ShortCycletimer value is compared with a preset value or a value set by the BS, and as a result of the comparison, the short-WUS cycle may be differently configured. Here, drx-ShortCycletimer value=M*drx-ShortCycle(M=natural value). For example, in a case where the preset value or the value set by the BS is X, when drx-ShortCycletimer value <X, short-WUS cycle=N*drx-ShortCycle(N is a natural number). In this case, according to a value of N, one WUS and a plurality of DRX occasions may be one-to-N mapped. In this regard, the short-WUS cycle and/or the drx-ShortCycle may be configured as a time, the number of subframes, the number of slots, and the like.

In an embodiment, N may be a preset value. For example, N may be a fixed value related to a short-WUS monitoring operation in a communication system, or may be a value included in short-WUS configuration information when the BS provides the UE with short-WUS configuration information via higher layer signaling (RRC signaling, MIB, or SIB).

Also, in an embodiment, N may be a value indicated by a short-WUS. In this case, N may be indicated as a natural number or may be indicated in the form of a bitmap. For example, in a case where 3 DRX occasions exist after a short-WUS occasion, the BS may indicate N in the form of a bitmap such as 101, and thus, may indicate that a short-WUS indicates an operation in first and third DRX occasions. Alternatively, the BS may indicate N in the form of a bitmap such as 111, and thus, may indicate that a short-WUS indicates an operation in first, second, and third DRX occasions.

Furthermore, in an embodiment, N may be implicitly indicated by a short-WUS occasion and a DRX occasion. For example, the UE may wake up in all DRX occasions located between two adjacent short-WUS occasions and then may monitor a PDCCH.

Also, in an embodiment, in a case where the preset value or the value set by the BS is X, when drx-ShortCycle ≥X, short-WUS cycle=drx-ShortCycle. In this case, one WUS and one DRX occasion may be one-to-one mapped. In this regard, the short-WUS cycle and/or the drx-ShortCycle may be configured as a time, the number of subframes, the number of slots, and the like.

In an embodiment, while operating in a short DRX cycle, the UE may changelessly apply a WUS monitoring operation by using current WUS configuration information. In this case, when a WUS indicates the UE to wake up in a DRX occasion or a WUS is not received, the UE may perform the short DRX cycle operation while maintaining a short DRX cycle. Also, when a WUS does not indicate the UE to wake up in a DRX occasion, the UE may no more start a drx-onDurationTimer thereafter. Furthermore, the UE may stop a drx-ShortCycletimer, and may operate in a Long DRX cycle thereafter. The fact that the WUS does not indicate the UE to wake up in the DRX occasion means that there is no data to be transmitted in the DRX occasion, and thus, the UE may immediately operate in the Long DRX cycle.

In an embodiment of the disclosure, a WUS cycle indicates a cycle of occurrence of a WUS occasion. Therefore, the UE has to wake up in every WUS cycle and monitor a PDCCH based on WUS configuration information provided by the BS. In comparison thereto, the BS does not have to always transmit a WUS in a WUS cycle. The BS may transmit a WUS only when the BS has information to transmit, or may transmit a WUS in every WUS cycle.

Therefore, there is a need to determine how a WUS is to be transmitted by using a WUS cycle.

Fourth-6-1 Embodiment

Hereinafter, in the fourth-6-1 embodiment, a method by which a WUS is transmitted only when the UE needs to wake up or there is changed content will now be described.

In an embodiment, the UE has to wake up in every WUS cycle and monitor a PDCCH based on WUS configuration information provided by the BS, but the BS may transmit a WUS only when the BS has information to transmit. For example, the BS may transmit a WUS, only when the UE needs to wake up or there is changed content. A case where there is changed content may indicate a case where, for example, when the UE receives a WUS mapped to a plurality of DRX occasions and operates according to indication by the received WUS, a different operation is configured to a DRX occasion mapped to the WUS. In detail, the case may indicate a case where a WUS indicated the UE not to wake up in a DRX occasion at a particular point of time, but data to be transmitted at the particular point of time occurs before the particular point of time starts, and thus, the UE needs to wake up.

In an embodiment, even when the UE monitors a PDCCH at a point of time when a WUS has to be received but DCI corresponding to the WUS is not detected, the UE may operate according to indication of a previously-received WUS or may perform a default operation. The default operation may be pre-defined or may be pre-configured by the BS. The default operation may include a wake-up operation. Also, in an embodiment, when a WUS is not received in at least preset period of time, the UE may perform the default operation. Here, the preset period of time may be predefined or may be pre-configured by the BS.

Fourth-6-2 Embodiment

Hereinafter, in the fourth-6-2 embodiment, a method by which a WUS is always transmitted in WUS cycles will now be described.

In an embodiment, the BS may wake up in every WUS cycle and may transmit a WUS to the UE. Here, the WUS may only indicate, by 1 bit, whether the UE is to wake up, or may provide, by K bits, whether the UE is to wake up along with additional information, e.g., when the UE is to wake up.

In an embodiment, even when the UE monitors a PDCCH at a point of time when a WUS has to be received, i.e., a WUS cycle, but DCI corresponding to the WUS is not detected, the UE may operate according to indication of a previously-received WUS or may perform a default operation. The default operation may be pre-defined or may be pre-configured by the BS. The default operation may include a wake-up operation. Also, in an embodiment, the UE may skip a DRX occasion related to the WUS that is not received.

According to an embodiment of the disclosure, a WUS monitoring operation may be applied to a case where Carrier Aggregation (CA) is configured or a BWP is configured. In more detail, a WUS may be transmitted from each cell, may be transmitted from each cell group, or may be transmitted from each BWP or a particular BWP. A unit group from which a WUS is transmitted when CA or a BWP is configured will now be described.

Fourth-7-1 Embodiment

Hereinafter, in the fourth-7-1 embodiment, a method of transmitting a WUS from each cell group including a plurality of cells will now be described.

According to an embodiment of the disclosure, a WUS may be transmitted from each cell group including a plurality of cells. That is, one WUS corresponding to a plurality of cells may be transmitted, and the UE may receive the WUS corresponding to the plurality of cells by monitoring one CORESET or one search space.

Figure 29:
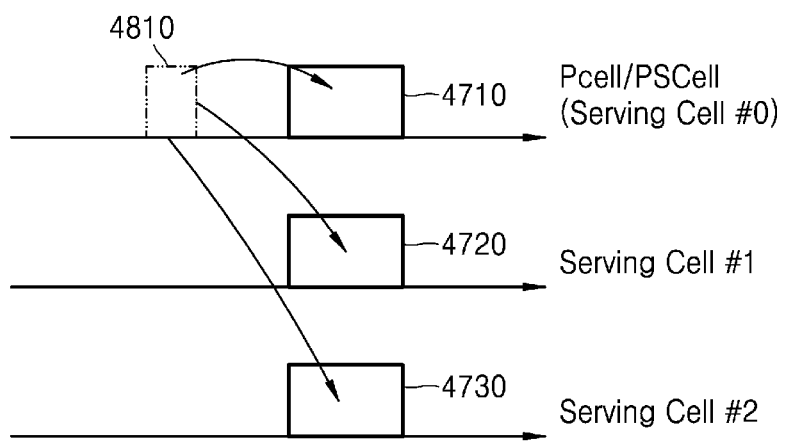
FIG. 29 is a diagram for describing a method by which a WUS is transmitted from each cell group including a plurality of cells according to an embodiment of the disclosure.

FIG. 29 is a diagram for describing a method by which a WUS is transmitted from each cell group including a plurality of cells according to an embodiment of the disclosure.

For example, a WUS may be transmitted from each of a PCell and a PSCell of two cell groups that are a Master Cell Group (MCG) and a Secondary Cell Group (SCG), and a WUS transmitted from each cell group may control a PDCCH monitoring operation of cells existing each cell group.

Referring to FIG. 29, one WUS may be transmitted from a PCell or PSCell (Serving Cell #0) 4710. One WUS may control PDCCH monitoring configuration in Serving Cell #0 4710, Serving Cell #1 4720, and Serving Cell #2. By using the WUS transmitted from the PCell or PSCell (Serving Cell #0), the UE may be indicated to wake up in a DRX occasion related to the WUS of Serving Cell #0 1710, Serving Cell #1 1720, and Serving Cell #2 1730, the UE may be indicated not to skip the DRX occasion related to the WUS, the UE may be indicated to monitor a PDCCH in the DRX occasion related to the WUS, or the UE may be indicated to start the drx-onDurationTimer 615 in the DRX occasion related to the WUS. Alternatively, the UE may not be indicated to wake up in the DRX occasion related to the WUS, the UE may be indicated not to wake up in the DRX occasion related to the WUS, the UE may be indicated not to monitor a PDCCH in the DRX occasion related to the WUS, the UE may be indicated not to start the drx-onDurationTimer 615 in the DRX occasion related to the WUS, or the UE may be indicated to skip the DRX occasion related to the WUS.

According to an embodiment of the disclosure, a cross-carrier indicator may be included in one WUS 4810, and a cell to control PDCCH monitoring configuration may be indicated by the cross-carrier indicator in the WUS 4810. Alternatively, a cell to control PDCCH monitoring configuration may be indicated via a cross-carrier indication field (CIF). Also, PDCCH monitoring configuration in one WUS 4810 may be commonly applied to all cells. In an embodiment of the disclosure, when the cross-carrier indicator or the CIF is configured, a WUS may be transmitted from a cell controlling PDCCH monitoring configuration of another cell by using the cross-carrier indicator or the CIF. That is, when P(S)Cell (Serving Cell #0) controls PDCCH monitoring configuration of Serving Cell #1 by using the cross-carrier indicator or the CIF, a WUS may be transmitted from P(S)Cell (Serving Cell #0).

According to an embodiment of the disclosure, PDCCH monitoring configuration information or WUS configuration information about a plurality of cells may be included in one WUS 4810. For example, PDCCH monitoring configuration information or WUS configuration information about a CA configured cell or a CA activated cell may be provided in the WUS 4810, in the form of indication of a cell index. In more detail, the WUS 4810 may include a parameter that indicates or determines an index of cells to which PDCCH monitoring configuration information or WUS configuration information is to be applied. The PDCCH monitoring configuration information or the WUS configuration information may be applied to the cells having a cell index indicated or determined by the parameter included in the WUS 4810. According to an embodiment, when one WUS 4810 includes PDCCH monitoring configuration information or WUS configuration information about a plurality of cells, a cell to which the PDCCH monitoring configuration information or the WUS configuration information is mapped may be identified according to a bit location in the WUS 4810. To do so, the BS may configure, via higher layer signaling (e.g., RRC signaling), the UE with locations of bits in the WUS which respectively control cells. The UE may identify which bit in the received WUS controls which cell, based on PDCCH monitoring configuration information or WUS configuration information received from the BS, and thus, may control PDCCH monitoring based on WUSs with respect to a plurality of cells (e.g., see the afore-described WUS-related functions including whether to monitor a PDCCH in a DRX occasion related to a WUS). Also, one WUS may include a scaling factor with respect to a PDCCH monitoring occasion in order of cell indices.

Also, a BWP in which one WUS for a plurality of cells is transmitted may be determined by the BS. The BS may configure a BWP in which one WUS for a plurality of cells is received, by using an identifier of the BWP.

Fourth-7-2 Embodiment

Hereinafter, in the fourth-7-2 embodiment, a method by which a WUS is transmitted from each cell will now be described.

According to an embodiment of the disclosure, a WUS may be transmitted from each of cells. That is, WUSs respectively corresponding to cells may be transmitted, and the UE may receive the WUSs respectively corresponding to the cells by monitoring CORESETs or search spaces corresponding to the cells.

Figure 30:
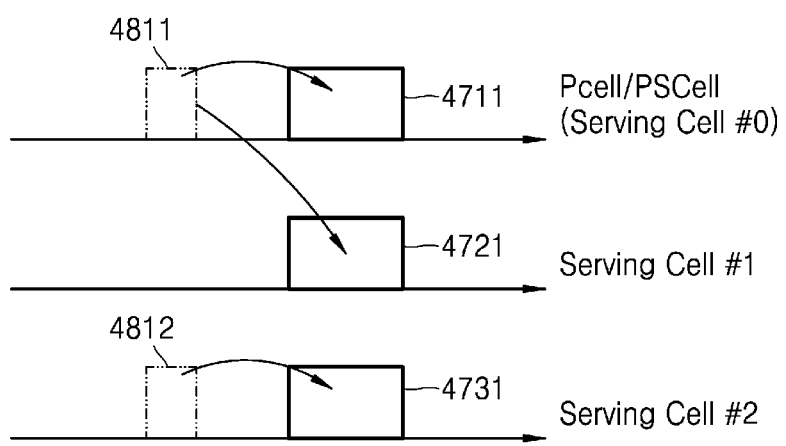
FIG. 30 is a diagram for describing a method by which a WUS is transmitted from each cell according to an embodiment of the disclosure.

FIG. 30 is a diagram for describing a method by which a WUS is transmitted from each cell according to an embodiment of the disclosure.

Referring to FIG. 30, a first WUS may be the WUS 4811 transmitted from a PCell or PSCell (Serving Cell #0) 4711, and may control PDCCH monitoring configuration in the PCell or PSCell 4711. Also, a second WUS 4812 may be the WUS 4812 transmitted from a Serving Cell #2 4731, and may control PDCCH monitoring configuration in the Serving Cell #2 4731. That is, by using the WUSs 4811 and 4812 respectively transmitted in the Cells 4711 and 4731, it is possible to indicate the UE to wake up in DRX occasions related to the respective WUSs 4811 and 4812 of the Cells 4711 and 4731, indicate the UE not to skip the DRX occasions related to the WUSs 4811 and 4812, indicate the UE to monitor a PDCCH in the DRX occasions related to the WUSs 4811 and 4812, or indicate the UE to start a drx-onDurationTimer in the DRX occasions related to the WUSs 4811 and 4812. Alternatively, it is possible not to indicate the UE to wake up in the DRX occasions related to the WUSs 4811 and 4812, it is possible to indicate the UE not to wake up in the DRX occasions related to the WUSs 4811 and 4812, it is possible to indicate the UE not to monitor a PDCCH in the DRX occasions related to the WUSs 4811 and 4812, it is possible to indicate the UE not to start the drx-onDurationTimer in the DRX occasions related to the WUSs 4811 and 4812, or it is possible to indicate the UE to skip the DRX occasions related to the WUSs 4811 and 4812.

If cross-carrier scheduling is configured, the BS may control PDCCH monitoring configuration of another cell by using a cross-carrier indicator. Referring to FIG. 30, if cross-carrier scheduling is configured, the UE may control PDCCH monitoring configuration in a Serving Cell #1 4721 based on the cross-carrier indicator or a CIF transmitted from the Serving Cell #0 4711 and the first WUS 4811. In other words, when a cross-carrier indicator or a CIF is configured, a WUS may be transmitted from a cell that controls PDCCH monitoring configuration of another cell by using the cross-carrier indicator or the CIF. A WUS that controls a cell (referred to as a second cell) equally configured via cross-carrier scheduling may be transmitted from a cell (referred to as a first cell) that schedules the second cell. For example, in a case where the P(S)Cell (Serving Cell #0) 4711 controls PDCCH monitoring configuration of a Serving Cell #1 4721 by using a cross-carrier indicator or a CIF, the WUS 4811 may be transmitted from the PSCell (Serving Cell #0) 4711.

When cross-carrier scheduling is configured, as in an afore-described case where the PDCCH monitoring configuration information or the WUS configuration information about a plurality of cells is included in one WUS 4810, PDCCH monitoring configuration information or WUS configuration information about a plurality of cells controlled by the WUS 4811 may be included in the WUS 4811. For example, the PDCCH monitoring configuration information or the WUS configuration information about the plurality of cells may be provided in the WUS 4811, in the form of indication of a cell index. In more detail, the WUS 4811 may include a parameter that indicates or determines an index of cells to which PDCCH monitoring configuration information or WUS configuration information is to be applied. The PDCCH monitoring configuration information or the WUS configuration information may be applied to the cells having a cell index indicated or determined by the parameter included in the WUS 4811. According to an embodiment, when one WUS 4811 includes PDCCH monitoring configuration information or WUS configuration information about a plurality of cells, a cell to which the PDCCH monitoring configuration information or the WUS configuration information is mapped may be identified according to a bit location in the WUS 4811. To do so, the BS may configure, via higher layer signaling (e.g., RRC signaling), the UE with locations of bits in the WUS 4810 which respectively control cells. The UE may identify which bit in the received WUS 4810 controls which cell, based on configuration information received from the BS, and thus, may control PDCCH monitoring based on WUSs with respect to a plurality of cells (e.g., see the afore-described WUS-related functions including whether to monitor a PDCCH in a DRX occasion related to a WUS). Also, one WUS 4811 may include a scaling factor with respect to a PDCCH monitoring occasion in order of cell indices.

Also, when WUSs are respectively transmitted from cells, WUS offset in each cell may differ. That is, the BS may separately configure WUS offset for each cell, or may configure additional offset for each cell. In addition thereto, WUS cycles in respective cells may be different.

Also, BWPs in which the WUSs are transmitted from the cells may be equal or different. According to an embodiment of the disclosure, the BS may configure, by using an identifier, the BWPs in which the WUSs for the cells are transmitted.

Fourth-7-3 Embodiment

Hereinafter, in the fourth-7-3 embodiment, a method by which a WUS is transmitted in a unit of a BWP will now be described.

According to an embodiment of the disclosure, when a plurality of BWPs are configured, a WUS may be transmitted in a unit of an activated BWP. That is, WUSs respectively corresponding to BWPs may be transmitted, and the UE may receive the WUSs respectively corresponding to the BWPs, by monitoring CORESETs or search spaces which respectively correspond to the BWPs.

According to an embodiment of the disclosure, when a plurality of BWPs are configured, a WUS may be transmitted via a particular BWP for WUS transmission, e.g., a wake up BWP. The wake up BWP may be distinguished from other BWPs, and may have a configuration including a wake up CORESET and wake up search space configuration, which is appropriate for a wake up PDCCH. In an embodiment, a BWP switching indicator or BWP switching information may operate as a trigger for a WUS monitoring operation. For example, in a case where the UE monitors a BWP for which a WUS is not configured, and then switches to a BWP, based on a BWP switching indicator or BWP switching information, when a WUS is configured for the switched BWP, a WUS monitoring operation may start. Also, in an embodiment, when the UE operates in a BWP in which a WUS is not transmitted, the BS may transmit an explicit indication to the UE to identify a WUS. Furthermore, in an embodiment, in a case where the UE operates in a BWP in which a WUS is not transmitted, when DRX is applied, and Inactive Time starts due to expiry of an on-duration Timer, the UE may switch to a BWP in which a WUS is transmitted.

According to an embodiment of the disclosure, PDCCH monitoring configuration information about a plurality of BWPs may be included in one WUS 4810. For example, PDCCH monitoring configuration information or WUS configuration information about a plurality of BWPs may be provided in the WUS 4810, in the form of indication of a BWP index. In more detail, the WUS 4810 may include a parameter that indicates or determines an index of BWPs to which PDCCH monitoring configuration information or WUS configuration information is to be applied. The PDCCH monitoring configuration information or the WUS configuration information may be applied to cells having a BWP index indicated or determined by the parameter included in the WUS 4810. According to an embodiment, when one WUS 4810 includes PDCCH monitoring configuration information or WUS configuration information about a plurality of cells, a BWP to which the PDCCH monitoring configuration information or the WUS configuration information is mapped may be identified according to a bit location in the WUS 4810. Also, one WUS 4810 may include a scaling factor with respect to a PDCCH monitoring occasion in order of BWP indices.

The embodiments described above may be combined with each other and operate. For example, a cycle and offset of a WUS may be configured to be associated with DRX or may be independently configured, a WUS may be monitored or may not be monitored when a WUS occasion is located in Active time, a WUS and a DRX occasion may be one-to-one mapped or may be one-to-N mapped, a WUS may be indicated by 1 bit or may be indicated by K bits, both Short DRX and a WUS may be used or only one of them may be used, a WUS may be transmitted only to wake the UE up or may be always transmitted, or a WUS may be transmitted from each cell or in each BWP or may be transmitted in a unit of a cell group. That is, the disclosure is not limited to the above examples and the embodiments may be combined with each other.

Also, configuration of a WUS may correspond to at least some of configuration of GTS. For example, configuration about a DCI format, RNTI, a cycle, offset, and the like of a WUS may correspond to configuration about a DCI format, RNTI, a cycle, offset, and the like of GTS. Also, as described above, embodiments of a WUS may be all applied to a uni-POSS.

Figure 31:
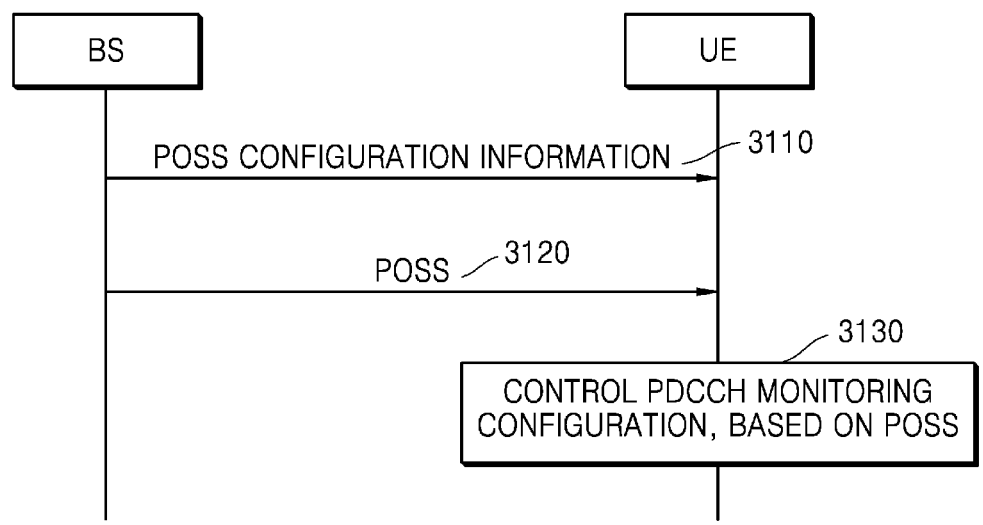
FIG. 31 is a diagram for describing a system providing POSS configuration information according to an embodiment of the disclosure.

FIG. 31 is a diagram for describing a system providing POSS configuration information according to an embodiment of the disclosure.

As described above, the BS may notify the UE of POSS configuration information by using higher layer signaling (MIB, SIB, RRC, etc.) (Operation 3110).

According to an embodiment of the disclosure, the POSS configuration information may include at least one of information of a CORESET in which a POSS is transmitted, search space information, occasion cycle information, offset information, DRX cycle information, information of a DCI format corresponding to the POSS, DCI size information, RNTI information, mapping configuration information of the POSS, or configuration of an operation performed when the POSS is missed. However, the disclosure is not limited to the above example, and the POSS configuration information may include all information to detect the POSS or interpret the POSS. The POSS configuration information may correspond to what is described above, and thus, detailed descriptions are not provided here.

Also, according to an embodiment of the disclosure, the BS may transmit the POSS to the UE, based on the POSS configuration information notified to the UE. The UE monitors a PDCCH based on the received POSS configuration information, thereby obtaining the POSS (Operation 3120).

According to an embodiment of the disclosure, the POSS may include at least one of DL control channel monitoring occasion information of the UE, DRX configuration information, or UE-state switching indication information. The UE-state switching indication information may be information indicating to terminate on duration or to switch to a UE-inactive state, as described above. As contents included in the POSS correspond to what is described above, detailed descriptions are not provided here.

According to an embodiment of the disclosure, the UE may control a PDCCH monitoring configuration, based on the received POSS (Operation 3130).

For example, the UE may be indicated to perform PDCCH monitoring based on the received POSS. In more detail, the UE may perform monitoring on a PDCCH at a point of time after the UE detects the POSS. For example, the UE in an inActive state may switch to an Active state so as to perform monitoring on a PDCCH since a preset point of time after the UE detects the POSS.

As another example, the UE may not perform monitoring on a PDCCH in a particular period of time, based on the received POSS. For example, the UE in an Active state may switch to an inActive state (e.g., a power saving mode or a sleep mode) without performing monitoring on a PDCCH since a preset point of time after the UE detects the POSS.

As another example, the UE may change PDCCH monitoring configuration information, based on the received POSS. As described above, PDCCH configuration information may include at least one of parameters about a CORESET of [Table 7] and/or at least one of parameters about a search space of [Table 8]. The UE may monitor a PDCCH since a preset point of time, based on changed PDCCH monitoring configuration information.

Figure 32:
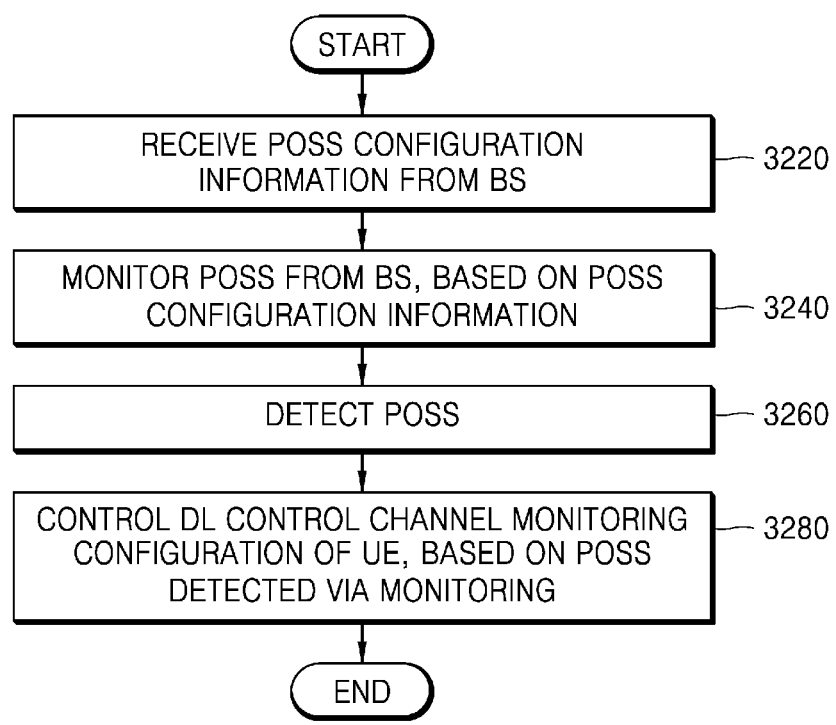
FIG. 32 is a flowchart of operations of a user equipment (UE) that controls PDCCH monitoring configuration according to an embodiment of the disclosure.

FIG. 32 is a flowchart of operations of the UE that controls PDCCH monitoring configuration according to an embodiment of the disclosure.

In operation 3220, the UE may receive POSS configuration information from the BS.

According to an embodiment of the disclosure, the POSS configuration information may include at least one of information of a CORESET in which a POSS is transmitted, search space information, occasion cycle information, offset information, DRX cycle information, information of a DCI format corresponding to the POSS, DCI size information, RNTI information, mapping configuration information of the POSS, or configuration of an operation performed when the POSS is lost. However, the disclosure is not limited to the above example, and the POSS configuration information may include all information to detect the POSS or interpret the POSS. The POSS configuration information may correspond to what is described above, and thus, detailed descriptions are not provided here.

Also, according to an embodiment of the disclosure, a POSS may include all DL control information corresponding to the POSS. That is, the POSS may include all of a WUS, GTS, and a uni-POSS which are described above.

In operation 3240, the UE may monitor a POSS from the BS, based on the POSS configuration information.

According to an embodiment of the disclosure, the POSS may include at least one of DL control channel monitoring occasion information of the UE, DRX configuration information, or UE-state switching indication information. As contents included in the POSS correspond to what is described above, detailed descriptions are not provided here.

According to an embodiment of the disclosure, the UE-state switching indication information may be information indicating the UE to switch from an Active state to an inActive state or information indicating the UE to switch from an inActive state to an Active state, and may further include information about a state switching point of time and a state switching period of time. However, the disclosure is not limited thereto.

In operation 3260, the UE may detect the POSS.

According to an embodiment of the disclosure, the UE may monitor a preset search space in at least one of Active time or inActive time, and may detect the POSS, based on the monitoring. As described above, the UE may detect GTS in Active time and may detect a WUS in inActive time.

However, the disclosure is not limited thereto. For example, the UE may detect a uni-POSS in Active time and inActive time. That is, described above, the UE may detect a same type of a POSS in Active time and inActive time.

As another example, the UE may detect GTS in Active time and cannot detect a POSS in inActive time, or may detect a WUS in inActive time and cannot detect a POSS in Active time. That is, the BS may configure the UE to use only one of a WUS or GTS.

Also, according to an embodiment of the disclosure, a format of DL control information corresponding to the POSS detected in Active time of the UE and a format of DL control information corresponding to the POSS detected in inActive time of the UE may be different. As this corresponds to what is described above, detailed descriptions are not provided here.

Also, according to an embodiment of the disclosure, DL control information corresponding to a POSS detected in Active time of the UE may be scrambled by an RNTI different from DL control information detected in inActive time of the UE. Obviously, the disclosure is not limited thereto.

In operation 3280, the UE may control DL control channel (PDCCH) monitoring configuration of the UE, based on the POSS detected via monitoring.

According to an embodiment of the disclosure, the UE may change a DL control channel (PDCCH) monitoring occasion of the UE, based on the POSS detected in Active time, and may stop DL control channel monitoring of the UE during a preset time since a preset point of time, based on the POSS detected in inActive time. A method, performed by the UE, of changing PDCCH monitoring configuration, based on a POSS, corresponds to what is described above, and thus, detailed descriptions are not provided here.

A method, performed by the UE, of controlling PDCCH monitoring configuration, which is described with reference to FIG. 32, is merely an embodiment, and the UE may perform operations afore-described in the first embodiment to the fourth embodiment, and may apply all configurations described in the first embodiment to the fourth embodiment.

Figure 33:
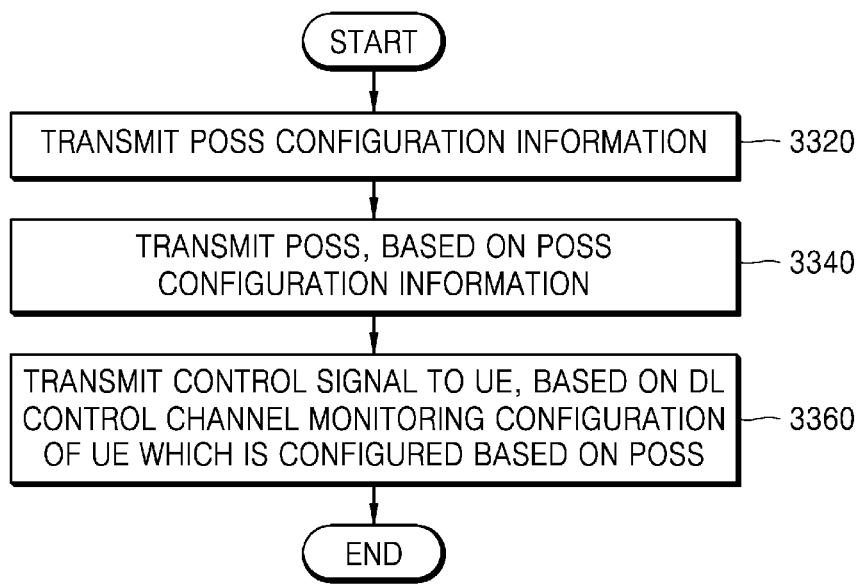
FIG. 33 is a flowchart of operations of a base station (BS) that controls PDCCH monitoring configuration according to an embodiment of the disclosure.

FIG. 33 is a flowchart of operations of the BS that controls PDCCH monitoring configuration according to an embodiment of the disclosure.

In operation 3320, the BS may transmit POSS configuration information. The POSS configuration information may correspond to what is described with reference to FIG. 32, and thus, detailed descriptions are not provided here.

In operation 3340, the BS may transmit a POSS, based on the POSS configuration information.

According to an embodiment of the disclosure, the BS may transmit DCI that corresponds to the POSS and is aligned to have a size equal to a size of another DCI to be monitored in a search space configured for the UE. As this corresponds to the afore-described embodiments of a DCI size, detailed descriptions are not provided here.

In operation 3360, the BS may transmit a control signal and data to the UE, based on DL control channel monitoring configuration of the UE which is configured based on the POSS. That is, the BS may transmit the control signal and the data to the UE, based on PDCCH monitoring configuration the UE changed based on the POSS.

The method by which the BS controls PDCCH monitoring configuration of the UE, which is described with reference to FIG. 33, is merely an embodiment, and the BS may perform operations afore-described in the first embodiment to the fourth embodiment, and may apply all configurations described in the first embodiment to the fourth embodiment.

Fifth Embodiment

Hereinafter, in the fifth embodiment, a method of allocating a time domain resource for a data channel in the next-generation mobile communication system (the 5G or NR system) will now be described.

The BS may configure the UE with Table of time domain resource allocation information about a PDSCH and a PUSCH via higher layer signaling (e.g., SIB or RRC signaling). With respect to the PDSCH, Table consisting of a maximum of maxNrofDL-Allocations=16 entries may be configured, and with respect to the PUSCH, Table consisting of a maximum of maxNrofUL-Allocations=16 entries may be configured. For example, time domain resource allocation information may include PDCCH-to-PDSCH slot timing (corresponding to a time interval of slot units between a time when a PDCCH is received and a time when a PDSCH scheduled by the received PDCCH is transmitted, and marked as K0), PDCCH-to-PUSCH slot timing (corresponding to a time interval of slot units between a time when a PDCCH is received and a time when a PUSCH scheduled by the received PDCCH is transmitted, and marked as K2), information about a location and length of a start symbol in a slot on which PDSCH or PUSCH is scheduled, a mapping type of PDSCH or PUSCH, and the like. For example, a plurality of pieces of information as in Table below may be notified from the BS to the UE (see [Table 12] or [Table 13] described above).

According to an embodiment of the disclosure, the BS may notify the UE of one of entries of Table about the time domain resource allocation information via L1 signaling (e.g., DCI) (e.g., may be indicated using a 'time domain resource allocation' field in the DCI). The UE may obtain the time domain resource allocation information about PDSCH or PUSCH, based on the DCI received from the BS.

When entries with K0/K2 values of 0 are indicated, this may mean that a PDCCH and a data channel are scheduled in a same slot. This will now be referred to as "self-slot scheduling".

When entries with K0/K2 values whose values are greater than 0 is indicated, this may mean that a PDCCH and a data channel are scheduled in different slots. This will now be referred to as "cross-slot scheduling".

In the next-generation mobile communication system (the 5G or NR system), the cross-slot scheduling may be used to reduce power consumption of the UE. When the cross-slot scheduling is supported, the UE may operate in a sleep mode in an interval between a point of time when a PDCCH is received and a point of time when transmission and reception of a data channel occur, and thus, may reduce power consumption. Also, when the cross-slot scheduling is supported, the UE may have a long processing time with respect to the PDCCH, and thus, may increase an operation speed, thereby reducing power consumption. Also, when the PDCCH is received and then is completely decoded, time domain scheduling information about a PDSCH may be finally obtained. Therefore, during time duration in which the UE receives and decodes the PDCCH, the UE is not able to detect whether the PDSCH is scheduled, such that the UE may have to perform buffering on OFDM symbols on which the PDSCH may be scheduled, which may sharply increase power consumption of the UE. If the UE is able to detect in advance the time domain scheduling information about the PDSCH before the UE decodes the PDCCH, that is, the UE can detect in advance that cross-slot scheduling is performed, and then the UE may minimize buffering with respect to the PDSCH, thereby reducing power consumption.

In order to reduce power consumption, the BS may configure the UE with a minimum K0/K2 value to be used in scheduling a data channel, via higher layer signaling or L1 signaling. The UE may expect that scheduling is to be always performed with a K0/K2 value corresponding to a value that is equal to or greater than the minimum K0/K2 value.

For convenience of descriptions, a minimum K0/K2 value the BS configures for the UE will now be referred to as "minimum offset".

The UE may be indicated, by the BS, with a minimum offset value via PDSCH or PUSCH scheduling DCI (e.g., DCI format 1_1 or DCI format 0_1) or non-scheduling DCI (e.g., a new DCI format (e.g., a WUS or a GTS) or DCI format 2_0 or DCI format 2_1 etc. defined to reduce power consumption).

The UE may separately receive, from the BS, different values for a minimum offset value (K0min) for K0 and a minimum offset value (K2 min) for K2, or may receive, from the BS, one value as a minimum offset value (Kmin) for K0 and K2. In the disclosure, provided is a case where one minimum offset value, Kmin, is indicated, but even when K0min and K2 min are separately indicated, contents of the disclosure may be equally applied.

The UE may receive a minimum offset value from the BS via DCI transmitted at a particular point of time, and may apply content of the received minimum offset value since a point of time after the particular point of time. For example, the UE may be indicated, by the BS, with a minimum offset value via DCI received through a PDCCH transmitted in a slot n, and may apply contents of the obtained minimum offset value in a slot n+k (k≥0). Here, k (referred to as "application delay time") may be a predefined fixed value, a value the BS configures for the UE, a value of minimum K0 (or K2) in configured Time domain resource allocation table, or a value the UE assumes at a point of time before the slot n (i.e., a minimum offset value received at a point of time before the slot n).

According to an embodiment of the disclosure, when the minimum offset value received in the slot n is applied to a slot m, the slot m (=slot n+k) to which the minimum offset value is applied may be defined by a function of various system parameters. For example, m may be defined below. However, the disclosure is not limited to the example below.

$$m = \text{floor}((n+X) \cdot 2^{(\mu 1 - \mu 0)}) \quad \text{[Equation 11]}$$

X=max(Y,Z)
Y: Minimum offset value UE assumes in slot n
Z: Pre-defined value (subject to change according to DL subcarrier spacing)
µ1: Subcarrier spacing of data channel (PDSCH or PUSCH)
µ0: Subcarrier spacing of control channel (PDCCH)
floor(x): Function of outputting maximum value among integers smaller than x Alternatively, a point of time to which a minimum offset value is applied may be expressed as offset(k), and may be defined as k=m−n or k may be defined as below.

$$k = \text{floor}((X) \cdot 2^{(\mu 1 - \mu 0)}) \quad \text{[Equation 12]}$$

X=max(Y,Z)
Y: Minimum offset value UE assumes in slot n
Z: Pre-defined value (subject to change according to DL subcarrier spacing)
µ1: Subcarrier spacing of data channel (PDSCH or PUSCH)
µ0: Subcarrier spacing of control channel (PDCCH)
floor(x): Function of outputting maximum value among integers smaller than x k may be expressed as $K_{app}$ at a later time.

The aforementioned application delay time may be defined as separate parameters with respect to the minimum offset value (K0min) for K0 and the minimum offset value (K2 min) for K2 or may be defined as one parameter with respect to the minimum offset value (Kmin) for K0 and K2. For example, a value of Y in Equation 11 or Equation 12 may correspond to K0min or K2 min, and thus, an application delay time Kapp,0 may be defined with respect to K0 and an application delay time Kapp,2 may be defined with respect to K2. Alternatively, a value of Y in Equation 11 or Equation 12 may correspond to one minimum offset value Kmin for K0 and K2, and thus, one application delay time Kapp may be defined with respect to K0 and K2. In the disclosure, descriptions are provided assuming one Kapp, but contents of the disclosure may be equally applied to a case where Kapp is defined for each of K0 and K2.

Also, the fact that a received minimum offset value is applied may be understood that interpretation with respect to Time domain resource allocation table varies based on the received minimum offset value, and details of a method of applying the received minimum offset value will be described in <Fifth-1 embodiment>.

Also, for convenience of descriptions, Time domain resource allocation table of a PDSCH below will be used as an example.

TABLE 19

| Entry index | PDSCH mapping type | K0 | Sarting symbol | Legnth |
|---|---|---|---|---|
| 1 | Type A | 0 | 2 | 8 |
| 2 | Type A | 0 | 2 | 10 |
| 3 | Type A | 1 | 2 | 9 |
| 4 | Type A | 1 | 2 | 7 |
| 5 | Type A | 2 | 2 | 5 |
| 6 | Type B | 2 | 9 | 4 |
| 7 | Type B | 3 | 4 | 4 |
| 8 | Type B | 4 | 5 | 7 |
| 9 | Type B | 5 | 5 | 2 |
| 10 | Type B | 7 | 9 | 2 |
| 11 | Type B | 8 | 12 | 1 |
| 12 | Type A | 9 | 1 | 10 |
| 13 | Type A | 10 | 1 | 6 |
| 14 | Type A | 21 | 2 | 4 |
| 15 | Type B | 30 | 4 | 7 |
| 16 | Type B | 32 | 8 | 4 |

Fifth-1 Embodiment

Hereinafter, provided is a method by which the UE interprets Time domain resource allocation table when the UE is indicated a minimum offset value from the BS. A method corresponding to one or a combination of methods below may be applied.

[Method 1]

According to an embodiment of the disclosure, the UE may expect, based on minimum offset received from the BS, that scheduling is to be performed only with entries in which K0/K2 values are equal to or greater than minimum offset from among values of pre-configured Time domain resource allocation table. For example, when Time domain resource allocation table of [Table 19] is configured for the UE, and a minimum offset value is indicated as 3, the UE may expect that scheduling is not to be performed with entries in which a K0 value is smaller than 3, i.e., entry indices of 1, 2, 3, 4, 5, 6, and may expect that scheduling is to be performed only with remaining entries that are entry indices of 7, 8, . . . , 16, except the entries.

[Method 2]

According to an embodiment of the disclosure, the UE may change, based on minimum offset received from the BS, K0/K2 values into the received minimum offset, the K0/K2 values being smaller than the minimum offset from among values of pre-configured Time domain resource allocation table. For example, when Time domain resource allocation table of [Table 19] is configured for the UE and a minimum offset value is indicated as 3, the UE may assume a K0 value as 3 with respect to entries with a K0 value smaller than 3, i.e., entry indices of 1, 2, 3, 4, 5, 6. Remaining entries that are entry indices of 7, 8, . . . , 16, except the entries, may be used without a change in the K0 value.

[Method 3]

According to an embodiment of the disclosure, the UE may change K0/K2 values by adding, based on minimum offset received from the BS, the received minimum offset to the K0/K2 values that are smaller than the minimum offset from among values of pre-configured Time domain resource allocation table. That is, the UE may update pre-configured K0 or K2 value to K0+minimum offset or K2+minimum offset and may perform assumption. For example, when Time domain resource allocation table of [Table 19] is configured for the UE and a minimum offset value is indicated as 3, the UE may perform update by adding the minimum offset value of 3 to a configured K0 value with respect to entries with a K0 value smaller than 3, i.e., entry indices of 1, 2, 3, 4, 5, 6. For example, Table of [Table 19] may be changed as below.

TABLE 20

| Entry index | PDSCH mapping type | K0 | Sarting symbol | Legnth |
|---|---|---|---|---|
| 1 | Type A | 0 → 3 | 2 | 8 |
| 2 | Type A | 0 → 3 | 2 | 10 |
| 3 | Type A | 1 → 4 | 2 | 9 |
| 4 | Type A | 1 → 4 | 2 | 7 |
| 5 | Type A | 2 → 5 | 2 | 5 |
| 6 | Type B | 2 → 5 | 9 | 4 |

[Method 4]

According to an embodiment of the disclosure, the UE may change, based on minimum offset received from the BS, all K0/K2 values by adding the received minimum offset value to the K0/K2 values in pre-configured Time domain resource allocation table. That is, the UE may update pre-configured all K0 or K2 values to K0+minimum offset or K2+minimum offset and may perform assumption For example, when Time domain resource allocation table of [Table 19] is configured for the UE, and a minimum offset value is indicated as 3, the UE may perform update by adding the indicated minimum offset value of 3 to all K0 values. That is, it may be changed as below.

TABLE 21

| Entry index | PDSCH mapping type | K0 | Sarting symbol | Legnth |
|---|---|---|---|---|
| 1 | Type A | 0 → 3 | 2 | 8 |
| 2 | Type A | 0 → 3 | 2 | 10 |
| 3 | Type A | 1 → 4 | 2 | 9 |
| 4 | Type A | 1 → 4 | 2 | 7 |
| 5 | Type A | 2 → 5 | 2 | 5 |
| 6 | Type B | 2 → 5 | 9 | 4 |
| 7 | Type B | 3 → 6 | 4 | 4 |
| 8 | Type B | 4 → 7 | 5 | 7 |
| 9 | Type B | 5 → 8 | 5 | 2 |
| 10 | Type B | 7 → 10 | 9 | 2 |
| 11 | Type B | 8 → 11 | 12 | 1 |
| 12 | Type A | 9 → 12 | 1 | 10 |
| 13 | Type A | 10 → 13 | 1 | 6 |
| 14 | Type A | 21 → 24 | 2 | 4 |
| 15 | Type B | 30 → 33 | 4 | 7 |
| 16 | Type B | 32 → 35 | 8 | 4 |

According to the aforementioned methods, the UE, based on a received minimum offset value, may expect that scheduling is to be performed only with some entries of pre-configured Time domain resource allocation table or may expect that scheduling is to be performed based on Time domain resource allocation table updated in consideration of the minimum offset value.

[Method 5]

According to an embodiment of the disclosure, the UE may expect, based on minimum offset received from the BS, that scheduling is to be performed only with entries in which K0/K2 values are equal to or greater than minimum offset from among values of pre-configured Time domain resource allocation table. For example, when Time domain resource allocation table of [Table 19] is configured for the UE, and a minimum offset value is indicated as 3, the UE may expect that scheduling is not to be performed with entries in which a K0 value is smaller than 3, i.e., entry indices of 1, 2, 3, 4, 5, 6, and may expect that scheduling is to be performed only with remaining entries that are entry indices of 7, 8, . . . , 16, except the entries. For convenience of descriptions, terms below are defined.

Valid entry: Entries in which K0/K2 values are equal to or greater than received minimum offset from among values of pre-configured Time domain resource allocation table, and the entries may be used in scheduling Invalid entry: Entries in which K0/K2 values are equal to or greater than received minimum offset from among values of pre-configured Time domain resource allocation table, and the entries cannot be used in scheduling In performing the aforementioned method, in a case where a minimum offset value the UE received from the BS is greater than all K0/K2 values in configured Time domain resource allocation table (or a case where a minimum offset value the UE received from the BS is greater than K0/K2 values in configured Time domain resource allocation table), any entry in Time domain resource allocation table configured for the UE may not correspond to valid entry. Accordingly, there is a need to define an additional operation of the UE.

Also, according to an embodiment of the disclosure, when a minimum offset value indicated by the BS for the UE is greater than all K0 (or K2) values in configured Time domain resource allocation table, the UE may assume all K0 (or K2) values in the configured Time domain resource allocation table, as a received minimum offset value.

Also, according to an embodiment of the disclosure, when a minimum offset value indicated by the BS for the UE is greater than all K0 (or K2) values in configured Time domain resource allocation table, the UE may determine the indication as an error. That is, the UE may not expect that a minimum offset value from the BS is indicated as a value greater than all K0 (or K2) values in configured Time domain resource allocation table.

Fifth-1-1 Embodiment

According to an embodiment of the disclosure, the UE may be configured with Time domain resource allocation table for each of configured BWPs. For example, in a case where two BWPs, i.e., BWP #1 and BWP #2, are configured for the UE, Time domain resource allocation table #1 and Time domain resource allocation table #2 may be respectively configured as configuration information in each BWP for the UE. The UE may use Time domain resource allocation table corresponding to a BWP index indicated as a BWP indicator in DCI. For example, in a case where a BWP indicator in DCI indicates BWP #N, when the UE interprets Time domain resource allocation table in the DCI, the UE may interpret it, assuming Time domain resource allocation table #N configured as configuration information of BWP #N.

The UE may receive a minimum offset value from the BS via DCI transmitted in a currently-activated BWP, and may determine valid or invalid entry with respect to Time domain resource allocation table configure for each BWP, based on the received minimum offset value.

According to an embodiment of the disclosure, the UE may equally apply a minimum offset value received from the BS to Time domain resource allocation tables of respective BWPs. In more detail, the UE may receive a minimum offset value from the BS via a PDCCH transmitted in a currently-activated BWP, and may interpret them by applying the received minimum offset value to all Time domain resource allocation table #N of all configured BWP #N. (For example, with respect to Time domain resource allocation table #N of BWP #N, valid entry may be determined based on the received minimum offset value.)

In this regard, according to time domain resource allocation table configuration information of each BWP and an indicated minimum offset value, valid entry may not exist in Time domain resource allocation table of a particular BWP. Accordingly, there is a need to define an additional operation of the UE.

[Method 1]

According to an embodiment of the disclosure, after the UE applies a received minimum offset value to Time domain resource allocation tables of all configured BWPs, the UE may not expect that valid entry does not exist. That is, the UE may not expect that a minimum offset value from the BS is indicated as a value being greater than all K0 (or K2) values in all configured Time domain resource allocation tables. When a minimum offset value the UE received from the BS is greater than all K0 (or K2) values in Time domain resource allocation table of at least one configured BWP, the UE may determine indication thereof as an error. Alternatively, a minimum offset value may be configured as a largest value or a preset value from among all K0 (or K2) values in Time domain resource allocation table of at least one configured BWP.

[Method 2]

According to an embodiment of the disclosure, after the UE applies a received minimum offset value to Time domain resource allocation table of a currently-activated BWP, the UE may not expect that valid entry does not exist. That is, the UE may not expect that a minimum offset value from the BS is indicated as a value being greater than all K0 (or K2) values in Time domain resource allocation table of the currently-activated BWP. When a minimum offset value the UE received from the BS is greater than all K0 (or K2) values in Time domain resource allocation table of the currently-activated BWP, the UE may determine indication thereof as an error.

After the received minimum offset value is applied to Time domain resource allocation table of a particular BWP that is not currently activated, valid entry may not exist. After the UE applies the minimum offset value received from the BS, if valid entry does not exist in Time domain resource allocation table of a corresponding BWP, the UE may not expect to receive DCI indicating BWP switching to the corresponding BWP. That is, when the minimum offset value indicated from the BS is greater than all K0 (or K2) values in Time domain resource allocation table of a particular BWP that is not currently activated, the UE may not expect to receive DCI indicating BWP switching to the particular BWP. If the UE received DCI indicating switching to the particular BWP, the UE may determine the DCI as an error.

[Method 3]

According to an embodiment of the disclosure, after the UE applies a received minimum offset value to Time domain resource allocation table of a currently-activated BWP, the UE may not expect that valid entry does not exist. That is, the UE may not expect that a minimum offset value from the BS is indicated as a value being greater than all K0 (or K2) values in Time domain resource allocation table of the currently-activated BWP. When a minimum offset value the UE received from the BS is greater than all K0 (or K2) values in Time domain resource allocation table of the currently-activated BWP, the UE may determine indication thereof as an error. The currently-activated BWP may be a preset point of time. For example, it may be a point of time when minimum offset is applied to Resource allocation table, a point of time when Resource allocation table is configured, or a point of time when scheduling information is received, but is not limited to the above examples.

After the UE applies the received minimum offset value to Time domain resource allocation table of a particular BWP that is not currently activated, the UE may determine that valid entry does not exist. After the UE applies the minimum offset value received from the BS, when the UE determines that valid entry does not exist in Time domain resource allocation table of a corresponding BWP, the UE may assume (or determine) all K0 (or K2) values in Time domain resource allocation table of the corresponding BWP, as the received minimum offset value. That is, when the minimum offset value indicated from the BS is greater than all K0 (or K2) values in Time domain resource allocation table of a particular BWP that is not currently activated, the UE may assume all K0 (or K2) values in Time domain resource allocation table of the particular BWP, as the received minimum offset value.

Fifth-1-2 Embodiment

When one or more BWPs are configured for the UE, the BS may indicate a change in a BWP for the UE by using a BWP indicator field in DCI. For example, in a case where a currently-activated BWP of the UE in FIG. 3 is BWP #1 301, the BS may indicate BWP #2 302 by using a BWP indicator in DCI for the UE, and the UE may perform BWP switching to BWP #2 302 indicated by the BWP indicator in the received DCI.

As described above, DCI-based BWP switching may be indicated by DCI for scheduling a PDSCH or a PUSCH, and thus, when the UE receives a BWP switching request, reception or transmission of the PDSCH or the PUSCH scheduled by the DCI should be performed in a switched BWP without difficulty. To do so, in the standard, requirements of a delay time (TBWP) which are required in BWP switching are ruled, and for example, may be defined as below.

| μ | NR Slot length (ms) | BWP switch delay $T_{BWP}$ (slots) | |
|---|---|---|---|
| | | Type 1[Note 1] | Type 2[Note 1] |
| 0 | 1 | [1] | [3] |
| 1 | 0.5 | [2] | [5] |
| 2 | 0.25 | [3] | [9] |
| 3 | 0.125 | [6] | [17] |

Note 1:
Depends on UE capability.
Note 2:
If the BWP switch involves changing of SCS, the BWP switch delay is determined by the larger one between the SCS before BWP switch and the SCS after BWP switch.

The requirements of a BWP switching delay time may support Type 1 or Type 2 according to capability of the UE. The UE may report a supportable BWP delay time type to the BS.

According to the afore-described requirements of the BWP switching delay time, when the UE has received, in a slot n, DCI including a BWP switching indicator, the UE may complete switching to a new BWP indicated by the BWP switching indicator at a point of time being not later than a slot n+TBWP, and may perform transmission and reception of a data channel scheduled by the DCI in the switched new BWP. When the BS attempts to schedule a data channel to a new BWP, the BS may determine time domain resource allocation to the data channel, in consideration of a BWP switching delay time (TBWP) of the UE. That is, in a method by which the BS determine time domain resource allocation to the data channel when the BS schedules the data channel to the new BWP, the BS may schedule the data channel after the BWP switching delay time. Accordingly, the UE may not expect that DCI indicating BWP switching indicates a value of slot offset (K0 or K2) being smaller than the BWP switching delay time (TBWP).

If the UE has received DCI (e.g., DCI format 1_1 or 0_1) that indicates BWP switching, the UE may not perform any transmission nor reception during time duration starting from a third symbol of a slot in which a PDCCH including the DCI is received up to a start point of a slot indicated as a value of slot offset (K0 or K2) indicated as a time domain resource allocation indicator field in the DCI. For example, when the UE has received DCI indicating BWP switching in a slot n, and a slot offset value indicated by the DCI is K, the UE may not perform any transmission nor reception in time duration starting from a third symbol of the slot n up to a symbol before a slot n+K (i.e., a last symbol of a slot n+K−1).

When the UE has received a minimum offset value from the BS, the UE may reduce power consumption by decreasing a processing operation speed with respect to a PDCCH, in consideration of the received minimum offset value. Accordingly, a decoding time for the PDCCH by the UE may be delayed, and a point of time when it is determined whether transmitted DCI indicates BWP switching may be relatively delayed, compared to a case of self-slot scheduling. Therefore, when the UE receives information about a minimum offset value from the BS, in order to further effectively support power consumption reduction of the UE, there is a need to further extend duration in which the UE does not expect transmission and reception for which BWP switching is considered. For example, one method or a combination of methods from among methods below may be applied.

[Method 1]

According to an embodiment of the disclosure, in a case where a minimum offset value the UE assumes in a slot n is Kmin, the UE has received DCI indicating BWP switching in the slot n, and a slot offset value indicated by the DCI is K, the UE may not perform any transmission nor reception in time duration starting from a third symbol of the slot n up to a start point of a slot n+Kmin+K (or a last symbol of a slot n+Kmin+K−1).

[Method 2]

According to an embodiment of the disclosure, in a case where a minimum offset value the UE assumes in a slot n is Kmin, the UE has received DCI indicating BWP switching in the slot n, and a slot offset value indicated by the DCI is K, the UE may not perform any transmission nor reception in time duration starting from a third symbol of the slot n up to a start point of a slot n+min(Kmin,K) (or a last symbol of a slot n+min(Kmin,K)−1). Here, min(A,B) may correspond to a function of outputting a smaller value among A and B.

[Method 3]

Before describing the method 3, parameters below are defined. The parameters defined below may be used throughout the disclosure.

TBWP: Delay time required in BWP switching

Kmin: Minimum offset value the UE assumes in a slot n, according to configuration or an indicated minimum offset value from the BS.

K: Slot offset value with respect to a PDSCH or a PUSCH the UE has received in a slot n via DCI (e.g., DCI format 1_1 or DCI format 0_1) that indicates BWP switching.

Kapp: Delay time with respect to a point of time when content of a minimum offset value the UE has received via DCI is applied (which corresponds to "application delay time" defined above). It may be defined in a slot unit. It may be defined as a different value according to a subcarrier spacing of a PDCCH and capability of the UE.

N0: The number of symbols corresponding to a PDCCH processing time of the UE. It may be defined as a different value according to a subcarrier spacing of a PDCCH and capability of the UE.

N0': The number of symbols corresponding to a PDCCH processing time longer than N0 of the UE. It may correspond to a processing time being used when the UE receives or assumes a minimum offset value. It may be defined as a different value according to a subcarrier spacing of a PDCCH and capability of the UE.

N1: The number of symbols corresponding to a PDSCH processing time of the UE. It may be defined as a different value according to a subcarrier spacing of a PDCCH and capability of the UE.

N2: The number of symbols corresponding to a PUSCH processing time of the UE. It may be defined as a different value according to a subcarrier spacing of a PDCCH and capability of the UE.

The number of symbols (N0, N0', N1, or N2) corresponding to a processing time of the UE with respect to a control channel or a data channel may be differently defined according to capability of the UE and a subcarrier spacing ( ).

For example, the number of symbols with respect to a PDSCH processing time may be defined as below.

TABLE 5.3-1

PDSCH processing time for PDSCH processing capability 1

PDSCH decoding time $N_1$ [symbols]

| $\mu$ | dmrs-AdditionalPosition = pos0 in DMRS-DownlinkConfig in both of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB or if the higher layer parameter is not configured |
|---|---|---|
| 0 | 8 | $N_{1,0}$ |
| 1 | 10 | 13 |
| 2 | 17 | 20 |
| 3 | 20 | 24 |

TABLE 5.3-2

PDSCH processing time for PDSCH processing capability 2

| $\mu$ | PDSCH decoding time $N_1$ [symbols] dmrs-AdditionalPosition = pos0 in DMRS-DownlinkConfig in both of dmrs-DownlinkForPDSCH-MappingTypeA, dmrs-DownlinkForPDSCH-MappingTypeB |
|---|---|
| 0 | 3 |
| 1 | 4.5 |
| 2 | 9 for frequency range 1 |

Also, based on a value of N1 described above, the PDSCH processing time may be calculated as below.

$$T_{proc,1} = (N_1 + d_{1,1})(2048 + 144) \cdot \kappa \cdot 2^{-\mu} \cdot T_c \quad \text{[Equation 13]}$$

Each parameter of Equation 13 may be defined as below.

- $N_1$ is based on $\mu$ of table 5.3-1 and table 5.3-2 for UE processing capability 1 and 2 respectively, where $\mu$ corresponds to the one of ($\mu_{PDCCH}$, $\mu_{PDSCH}$, $\mu_{UL}$) resulting with the largest $T_{proc,1}$, where the $\mu_{PDCCH}$ corresponds to the subcarrier spacing of the PDCCH scheduling the PDSCH, the $\mu_{PDSCH}$ corresponds to the subcarrier spacing of the scheduled PDSCH, and $\mu_{UL}$ corresponds to the subcarrier spacing of the uplink channel with which the HARQ-ACK is to be transmitted, and $\kappa$ is defined in subclause 4.41 of [4, TS 38.211].
- If the PDSCH DM-RS position $l_1$ for the additional DM-RS in Table 7.4.1.1.2-3 in subclause 7.4.1.1.2 of [4, TS 38.211] is $l_1$ = 12 then $N_{1,0}$=14 in Table 5.3-1, otherwise $N_{1,0}$=13.
- If the UE is configured with multiple active component carriers, the first uplink symbol which carries the HARQ-ACK information further includes the effect of timing difference between the component carriers as given in [11, TS 38.133].
- For the PDSCH mapping type A as given in subclause 7.4.1.1 of [4, TS 38.211]: if the last symbol of PDSCH is on the i-th symbol of the slot where i < 7, then $d_{1,1}$ = 7 − i, otherwise $d_{1,1}$ = 0
- For UE processing capability 1: If the PDSCH is mapping type B as given in subclause 7.4.1.1 of [4, TS 38.211], and
  - if the number of PDSCH symbols allocated is 7, then $d_{1,1}$ = 0,
  - if the number of PDSCH symbols allocated is 4, then $d_{1,1}$ = 3
  - if the number of PDSCH symbols allocated is 2, then $d_{1,1}$ = 3+d, where d is the number of overlapping symbols of the scheduling PDCCH and the scheduled PDSCH.
- For UE processing capability 2: If the PDSCH is mapping type B as given in subclause 7.4.1.1 of [4, TS 38.211],
  - if the number of PDSCH symbols allocated is 7, then $d_{1,1}$ = 0,
  - if the number of PDSCH symbols allocated is 4, then $d_{1,1}$ is the number of overlapping symbols of the scheduling PDCCH and the scheduled PDSCH,
  - if the number of PDSCH symbols allocated is 2,
    - if the scheduling PDCCH was in a 3-symbol CORESET and the CORESET and the PDSCH had the same starting symbol, then $d_{1,1}$ = 3,
    - otherwise $d_{1,1}$ is the number of overlapping symbols of the scheduling PDCCH and the scheduled PDSCH.

Also, according to an embodiment, the number of symbols with respect to a PUSCH processing time may be defined as below.

TABLE 6.4-1

PUSCH preparation time for PUSCH timing capability 1

| $\mu$ | PUSCH preparation time $N_2$ [symbols] |
|---|---|
| 0 | 10 |
| 1 | 12 |
| 2 | 23 |
| 3 | 36 |

TABLE 6.4-2

PUSCH preparation time for PUSCH timing capability 2

| $\mu$ | PUSCH preparation time $N_2$ [symbols] |
|---|---|
| 0 | 5 |
| 1 | 5.5 |
| 2 | 11 for frequency range 1 |

Also, based on a value of N2 described above, the PUSCH processing time may be calculated as below.

$$T_{proc,2}=\max\{(N_2+d_{2,1})(2048+144)\cdot\kappa 2^{-\mu}T_c,d_{2,2}\} \quad \text{[Equation 14]}$$

Each parameter of Equation 14 may be defined as below.

- $N_2$ is based on $\mu$ of Table 6.4-1 and Table 6.4-2 for UE processing capability 1 and 2 respectively, where $\mu$ corresponds to the one of ($\mu_{DL}$, $\mu_{UL}$) resulting with the largest $T_{proc,2}$, where the $\mu_{DL}$ corresponds to the subcarrier spacing of the downlink with which the PDCCH carrying the DCI scheduling the PUSCH was transmitted and $\mu_{UL}$ corresponds to the subcarrier spacing of the uplink channel with which the PUSCH is to be transmitted, and $\kappa$ is defined in subclause 4.1 of [4, TS 38.211].
- If the first symbol of the PUSCH allocation consists of DM-RS only, then $d_{2,1}$= 0, otherwise $d_{2,1}$ = 1.
- If the UE is configured with multiple active component carriers, the first uplink symbol in the PUSCH allocation further includes the effect of timing difference between component carriers as given in [11, TS 38.133].
- If the scheduling DCI triggered a switch of BWP, $d_{2,2}$ equals to the switching time as defined in [11, TS 38.133], otherwise $d_{2,2}$=0.

According to an embodiment of the disclosure, the UE may determine, in consideration of a minimum offset value or an application delay time of the minimum offset value, time duration in which transmission or reception according to BWP switching is not performed. If the UE has received DCI (e.g., DCI format 1_1 or 0_1) indicating BWP switching, the UE may not perform any transmission nor reception during time duration starting from a third symbol of a slot in which a PDCCH including the DCI is received up to a start point of a slot for which a minimum offset value assumed by the UE or an application delay time of the minimum offset value and a BWP switching delay time TBWP are considered. Obviously, the disclosure is not limited to the above example, and the UE may be configured to transmit or receive some control signals, when necessary.

In more detail, in a case where a minimum offset value the UE assumes in a slot n is Kmin, the UE receives DCI (e.g., DCI format 1_1 or 0_1) indicating BWP switching in the slot n, and a slot offset value indicated by the DCI is K, the UE may not perform any transmission nor reception in time duration starting from a third symbol of the slot n in which a PDCCH including the DCI is received up to a start point of a slot n+K' (or a last symbol of a slot n+K'−1). Here, n may be defined as one value or a combination of values from among values below.

K'=TBWP+Kmin
K'=max(TBWP+Kmin,K)
K'=TBWP+Kapp
K'=max(TBWP+Kapp,K)

Also, according to an embodiment of the disclosure, the UE may determine, in consideration of a processing time with respect to a control channel or a data channel, time duration in which transmission or reception according to BWP switching is not performed. If the UE has received DCI (e.g., DCI format 1_1 or 0_1) indicating BWP switching, the UE may not perform any transmission nor reception during time duration starting from a third symbol of a slot in which a PDCCH including the DCI is received up to a start point of a slot for which a processing time with respect to a control channel or a data channel and a BWP switching delay time TBWP are considered.

In more detail, in a case where a minimum offset value the UE assumes in a slot n is Kmin, the UE receives DCI (e.g., DCI format 1_1 or 0_1) indicating BWP switching in the slot n, and a slot offset value indicated by the DCI is K, the UE may not perform any transmission nor reception in time duration starting from a third symbol of the slot n in which a PDCCH including the DCI is received up to a start point of a slot n+K' (or a last symbol of a slot n+K'−1). Here, K' may be defined as one value or a combination of values from among values below.

K'=TBWP+Kdelay
K'=max(TBWP+Kdelay,K)
K'=Kdelay+K

Here, Kdelay may be expressed as a function with respect to Ndelay (i.e., Kdelay=f(Ndelay)), and Ndelay may correspond to at least one of N0, N0', or N2. y=f(x) may correspond to a function of changing a parameter x of a symbol unit into a parameter y of a symbol unit. For example, it may be defined as Kdelay=f(Ndelay)=ceil(Ndelay/Nsym). Here, Ndelay may be a parameter in a symbol unit or may correspond to a parameter (Tproc) re-converted as a time unit. For example, parameter Tproc,2 re-converted as a time unit of N2 may be given as Equation 14.

By using the aforementioned method, the UE may operate to have a sufficiently long time taken to process a PDCCH, and thus, may reduce power consumption.

Fifth-1-3 Embodiment

Symbols in a slot may be configured as a combination of DL symbols, UL symbols or flexible (F) symbols. For example, one slot may consist of M DL symbols, N F symbols, and L UL symbols, and may satisfy a total of Nsym=M+N+L (where, Nsym may be defined as the number of symbols in 1 slot). As described above, a format of symbols in one slot and a pattern of formats are referred to as "slot format". That is, a pattern consisting of a particular DL symbol, F symbol, and UL symbol in one slot is defined as "slot format".

The UE may receive information of a slot format (i.e., information of a combination of DL symbol, F symbol, and UL symbol which consist of a particular slot) via higher layer signaling (e.g., SIB or RRC signaling) or DCI. For example, the UE may receive slot format information about a particular slot via higher layer parameters TDD-UL-DL-ConfigurationCommon, TDD-UL-DL-ConfigurationDedicated. For example, the UE may obtain a slot format indicator via DCI (e.g., DCI format 2_0), and may obtain information about a slot format of a particular slot from the slot format indicator.

The UE may not expect that the DCI indicates a UL symbol or an F symbol, with respect to symbols configured as a DL symbol via higher layer signaling. The UE may not expect that the DCI indicates a DL symbol or an F symbol, with respect to symbols configured as a UL symbol via higher layer signaling. The UE may obtain information in which the DCI indicates a DL symbol or a UL symbol or an F symbol, with respect to symbols configured as an F symbol via higher layer signaling.

If the UE is configured, via higher layer signaling, to perform DL reception (e.g., reception of a channel state information reference signal (a CSI-RS) or a PDSCH) on certain symbols, and is indicated, by a slot format indicator received via DCI, that at least one symbol among corresponding symbols is a UL symbol or an F symbol, or is indicated, by DCI, UL transmission (a PUSCH, a PUCCH, SRS, a PRACH, and the like), the UE may cancel a reception operation for a CSI-RS or a PDSCH in a corresponding slot.

If the UE is configured, via higher layer signaling, to perform UL transmission (e.g., a sounding reference signal (SRS), a physical uplink control channel (PUCCH), a PUSCH, or a PRACH) on certain symbols, and is indicated, by a slot format indicator received via DCI, that at least one symbol among corresponding symbols is a DL symbol or an F symbol, or is indicated, by DCI, DL reception (reception of a CSI-RS or a PDSCH),
  the UE does not expect that UL transmission is canceled on symbols in time duration from a last symbol of a CORESET in which the DCI is detected up to a PUSCH processing time (Tproc,2),
  the UE may cancel UL transmission on symbols since the PUSCH processing time (Tproc,2).

As described above, when the UE is indicated, via DCI or a slot format indicator received via the DCI, DL reception with respect to symbols configured as UL transmission, the UE may cancel UL transmission of symbols after a PUSCH processing time. Here, the UE may still perform the UL transmission on symbols before the PUSCH processing time, and this is performed in consideration of a decoding time with respect to a PDCCH. That is, because the UE can determine, after the PDCCH is decoded, whether symbols configured as UL transmission are indicated as F symbols or DL symbols via DCI, the UE may need a particular margin time to cancel pre-configured UL transmission (in the above, this is assumed as the PUSCH processing time).

When the UE has received a minimum offset value from the BS, the UE may obtain a power consumption reduction effect by extending a processing time with respect to a PDCCH. Accordingly, a processing time with respect to DCI including a slot format indicator may also be extended, and a time taken for the UE to determine whether pre-configured UL transmission is canceled may be increased. Therefore, when the UE receives a minimum offset value from the BS, an operation different from a legacy one may be required.

According to some embodiments of the disclosure, when the UE is provided a minimum offset value (a value based on DCI or higher layer signaling or a pre-defined default value) from the BS, is configured, via higher layer signaling, to perform UL transmission (e.g., a SRS, a PUCCH, a PUSCH, or a PRACH), and is indicated, by a slot format indicator received via DCI, that at least one symbol among corresponding symbols is a DL symbol or an F symbol, or is indicated, via DCI, DL reception (CSI-RS or PDSCH reception),
  the UE may not expect that UL transmission is canceled on symbols in time duration from a last symbol of a CORESET in which the DCI is detected up to a particular time (T),
  the UE may cancel UL transmission on symbols after the particular time (T).

In the above, the particular time (T) may correspond to at least one of Kmin, Kapp, N0, N0', or N2. Obviously, values of Kmin, Kapp, N0, N0', or N2 may be changelessly used or may be applied after having been re-converted into a different unit, or may be used after having been converted into a different parameter.

For example, Kmin, Kapp may correspond to parameters having a slot unit, and thus, may be re-converted into parameters having a time unit. For example, they may be expressed as T=f(Kmin) or T=f(Kapp), where f(·) may correspond to a function of receiving an input of a parameter having a slot unit and then outputting a parameter value having a time unit. For example, it may be defined as $f(x)=x \cdot Tsf \cdot 2^{-\mu}$, where it may be defined that Tsf=1 ms, and μ is a parameter corresponding to a subcarrier spacing with respect to a PDCCH.

As another example, N0, N0', and N2 may correspond to parameters having a symbol unit, and thus, may be re-converted into parameters having a time unit. For example, they may be expressed as T=g(N0) or T=g(N0') or T=g(N2), where g(·) may correspond to a function of receiving an input of a parameter having a symbol unit and then outputting a parameter value having a time unit. For example, N2 may be defined by a function such as Equation 14, and N0 or N0' may be defined by a similar function.

According to some embodiments of the disclosure, when the UE is provided a minimum offset value (a value based on DCI or higher layer signaling or a pre-defined default value) from the BS, the UE may not, as an exception, perform extension on a PDCCH processing time with respect to PDCCH monitoring triggered by a DCI format (e.g., DCI format 2_0) corresponding to a slot format indicator.

Fifth-1-4 Embodiment

The BS may semi-statically configure the UE with time and frequency transmission resources and various transmission and reception parameters for a PDSCH and a PUSCH so as to support grant free-based transmission and reception with respect to the DL data channel (the PDSCH) or the UL data channel (the PUSCH).

In more detail, the BS may configure the UE with information below, via higher layer signaling (e.g., RRC signaling), so as to support DL semi-persistent scheduling (SPS).

```
SPS-Config ::=              SEQUENCE {
periodicity         ENUMERATED {ms10, ms20, ms32, ms40, ms64, ms80, ms128, ms160,
ms320, ms640,
spare6, spare5, spare4, spare3, spare2, spare1},
nrofHARQ-Processes      INTEGER (1..8),
n1PUCCH-AN          PUCCH-ResourceId        OPTIONAL, -- Need M
mcs-Table           ENUMERATED {qam64LowSE}    OPTIONAL, -- Need
S
...
}
```

DL SPS may be configured in a Primary Cell or a Secondary Cell, and in one cell group, DL SPS may be configured in one cell.

In 5G, two types, grant free-based UL transmission type-1 (UL grant Type 1) and grant free (configured grant)-based UL transmission type-2 (UL grant Type 2), may be supported as a grant free (configured grant)-based transmission method with respect to UL.

provide the rest of the information (some of the time and frequency resource information and some of the period information which allow transmission of a PUSCH). Obviously, the disclosure is not limited to the above example.

The BS may configure the UE with a plurality of pieces of information below via higher layer signaling (e.g., RRC signaling) so as to support UL grant Type 2 with respect to UL.

```
ConfiguredGrantConfig ::=               SEQUENCE {
frequencyHopping                ENUMERATED {mode1, mode2}
    OPTIONAL, -- Need S,
cg-DMRS-Configuration           DMRS-UplinkConfig,
mcs-Table                       ENUMERATED {qam256, spare1}
    OPTIONAL, -- Need S
mcs-TableTransformPrecoder      ENUMERATED {qam256, spare1}
    OPTIONAL, -- Need S
uci-OnPUSCH                     SetupRelease { CG-UCI-OnPUSCH },
resourceAllocation              ENUMERATED { resourceAllocationType0,
resourceAllocationType1, dynamicSwitch },
rbg-Size                        ENUMERATED {config2}
    OPTIONAL, -- Need S
powerControlLoopToUse           ENUMERATED {n0, n1},
p0-PUSCH-Alpha                  P0-PUSCH-AlphaSetId,
transformPrecoder               ENUMERATED {enabled}
    OPTIONAL, -- Need S
nrofHARQ-Processes              INTEGER(1..16),
repK                            ENUMERATED {n1, n2, n4, n8},
repK-RV                         ENUMERATED {s1-0231, s2-0303, s3-0000}
    OPTIONAL, -- Cond RepK
periodicity                     ENUMERATED {
sym2, sym7, sym1x14, sym2x14, sym4x14, sym5x14, sym8x14, sym10x14, sym16x14,
sym20x14,
sym32x14, sym40x14, sym64x14, sym80x14, sym128x14, sym160x14, sym256x14,
sym320x14, sym512x14,
sym640x14, sym1024x14, sym1280x14, sym2560x14, sym5120x14,
sym6, sym1x12, sym2x12, sym4x12, sym5x12, sym8x12, sym10x12, sym16x12, sym20x12,
sym32x12,
sym40x12, sym64x12, sym80x12, sym128x12, sym160x12, sym256x12, sym320x12,
sym512x12, sym640x12,
sym1280x12, sym2560x12
},
configuredGrantTimer            INTEGER (1..64)
    OPTIONAL, -- Need R
```

According to an embodiment, according to the grant free-based UL transmission type-1, the BS may provide the UE with time and frequency resource information and period information which allow transmission of a grant free-based PUSCH, and when required, the UE may transmit the grant free-based PUSCH, based on the information received from the BS, and according to the grant free-based UL transmission type-2, the BS may provide the UE with some of time and frequency resource information and period information which allow transmission of a grant free-based PUSCH, and then the BS may activate transmission of a grant free-based PUSCH via DCI for the UE and may The BS may transmit, to the UE, DCI consisting of a particular DCI field value for scheduling activation or scheduling release with respect to DL SPS and UL grant Type 2.

In more detail, the BS may configure with Configured Scheduling-RNTI (CS-RNTI), and the UE may monitor a DCI format of which CRC is scrambled by the CS-RNTI. In a case where the CRC of the DCI format the UE received is scrambled by the CS-RNTI, a new data indicator (NDI) is set to '0', and a DCI field satisfies Table below, the UE may consider the DCI as an instruction for activating transmission and reception with respect to DL SPS or UL grant Type 2.

|  | DCI format 0_0/0_1 | DCI format 1_0 | DCI format 1_1 |
| --- | --- | --- | --- |
| HARQ process number | set to all '0's | set to all '0's | set to all '0's |
| Redundancy version | set to '00' | set to '00' | For the enabled transport block: set to '00' |

The BS may configure the UE with CS-RNTI, and the UE may monitor a DCI format of which CRC is scrambled by the CS-RNTI. In a case where the CRC of the DCI format the UE received is scrambled by the CS-RNTI, an NDI is set to '0', and a DCI field satisfies Table below, the UE may consider the DCI as an instruction for releasing transmission and reception with respect to DL SPS or UL grant Type 2.

|  | DCI format 0_0 | DCI format 1_0 |
| --- | --- | --- |
| HARQ process number | set to all '0's | set to all '0's |
| Redundancy version | set to '00' | set to '00' |
| Modulation and coding scheme | set to all '1's | set to all '1's |
| Frequency domain resource assignment | set to all '1's | set to all '1's |

In a case where the UE has received, from the BS, DCI corresponding to DL SPS release, the UE may transmit, in response to the DL SPS release, HARQ-ACK information after N symbols starting from a last symbol of a PDCCH corresponding to the DL SPS release, to the BS. N may vary according to capability of the UE and a subcarrier spacing ($\mu$) of a PDCCH. For example, with respect to UE processing capability 1 (may correspond to capability whose processing time is relatively long), it may be defined as N=10 in $\mu$=0 (15 kHz), N=12 in $\mu$=1 (30 kHz), N=22 in =2 (60 kHz), and N=25 in $\mu$=3 (120 kHz), and with respect to UE processing capability 2 (may correspond to capability whose processing time is relatively short), it may be defined as N=5 in $\mu$=0 (15 kHz), N=5.5 in $\mu$=1 (30 kHz), and N=11 in $\mu$=2 (60 kHz).

As described above, when the UE has received DCI corresponding to the DL SPS release, the UE may transmit, in response thereto, HARQ-ACK after N symbols after reception of a PDCCH, and this is performed in consideration of a decoding time with respect to the PDCCH. That is, the UE may determine, after decoding of the PDCCH is completed, whether the DCI with respect to the DL SPS release is received via PDCCH, and thus, may transmit the HARQ-ACK in response to the DCI after a particular time (the N symbols in the above situation).

When the UE has received a minimum offset value from the BS, the UE may obtain a power consumption reduction effect by extending a processing time with respect to a PDCCH. Accordingly, a processing time with respect to the DCI including the DL SPS release may also be extended, and a time taken for the UE to transmit the HARQ-ACK in response to the DCI the UE received may be increased. Therefore, when the UE receives the minimum offset value from the BS, an operation different from a legacy one may be required.

According to an embodiment of the disclosure, in a case where the UE is provided a minimum offset value (a value based on DCI or higher layer signaling or a pre-defined default value) from the BS, when the UE received DCI corresponding to DL SPS release from the BS, the UE may transmit, in response thereto, HARQ-ACK information to the BS, after N symbols starting from a last symbol of a PDCCH corresponding to DL SPS release. N may correspond to at least one of Kmin, Kapp, N0, N0', or N2. Values of Kmin, Kapp, N0, N0', or N2 may be changelessly used or may be applied after having been re-converted into a different unit, or may be used after having been converted into a different parameter.

For example, Kmin, Kapp may correspond to parameters having a slot unit, and thus, may be re-converted into parameters having a symbol unit. For example, they may be expressed as T=f(Kmin) or T=f(Kapp), where f(·) may correspond to a function of receiving an input of a parameter having a slot unit and then outputting a parameter value having a symbol unit. For example, they may be defined as f(x)=x·Nsym, where Nsym may be defined as the number of of symbols per slot.

According to an embodiment of the disclosure, in a case where the UE is provided a minimum offset value (a value based on DCI or higher layer signaling or a pre-defined default value) from the BS, the UE may not, as an exception, perform extension on a PDCCH processing time with respect to PDCCH monitoring triggered by a DCI format (e.g., DCI format 1_0) corresponding to DL SPS release.

Fifth-2 Embodiment

When the UE is indicated a minimum offset value from the BS, in some cases, scheduling based on the minimum offset value may not be considered. In other words, even when the minimum offset value is indicated, the UE may expect that scheduling is made based on pre-configured Time domain table.

For example, in monitoring cases below, the minimum offset value may not be applied.

The case where DCI format 1_0 scrambled by SI-RNTI is monitored in type-0 common search space The case where DCI format 1_0 scrambled by SI-RNTI is monitored in type-0 common search space The case where DCI format 1_0 scrambled by RA-RNTI or TC-RNTI is monitored in type-0 common search space The case where DCI format 1_0 scrambled by P-RNTI is monitored in type-0 common search space (in a case of a PUSCH scheduled via a random access response (RAR), the UE may transmit a preamble (PRACH) in a random access procedure and then may receive an RAR in response to the transmitted preamble. Here, the UE may be scheduled a PDSCH corresponding to the RAR via the DCI format 1_0 scrambled by RA-RNTI. The RAR message may include UL grant information for a PUSCH for transmitting message 3. UL grant for scheduling the PUSCH transmitted via RAR may include time domain resource allocation information, and in this case, the UE may not apply the aforementioned minimum offset value.)

The case where DCI format 1_0 scrambled by C-RNTI or MCS-C-RNTI or CS-RNTI is monitored in searchSpaceZero, searchSpaceSIB1, searchSpaceOtherSystemInformation, pagingSearchSpace, or ra-SearchSpace (the BS may configure, via higher layer signaling PDCCH- ConfigCommon, the UE with search space #0 (searchspacezero), a search space for receiving SIB1 (searchSpaceSIB1), a search space for receiving other system information (searchSpaceOtherSystemInformation), a search space for receiving paging (pagingSearchSpace), or a search space for receiving RAR (ra-SearchSpace). In more detail, search space configuration information which may be notified via PDCCH-ConfigCommon is listed in Table 22 and Table 23 below. If the UE is configured, by the BS, with one or more of search spaces described above, and is configured, by the BS, at least one of C-RNTI, MCS-C-RNTI, or CS-RNTI, the UE may also monitor DCI format 1_0 or DCI format 0_0 which is scrambled by C-RNTI or MCS-C-RNTI or CS-RNTI when the UE monitors PDCCH candidates with respect to DCI format 0_0 or 1_0 scrambled by SI-RNTI, RA-RNTI, or P-RNTI in the configured search spaces. In this case, the UE may not apply the minimum offset value described above.)

TABLE 22

```
PDCCH-ConfigCommon ::= SEQUENCE {
    controlResourceSetZero                                          ControlResourceSetZero
OPTIONAL, -- Cond InitialBWP-Only
    commonControlResourceSet                                        ControlResourceSet
OPTIONAL, -- Need R
    searchSpaceZero                                                 SearchSpaceZero
OPTIONAL, -- Cond InitialBWP-Only
    commonSearchSpaceList                                           SEQUENCE (SIZE (1..4)) OF SearchSpace
OPTIONAL, -- Need R
    searchSpaceSIB1                                                 SearchSpaceId
OPTIONAL, -- Need S
    searchSpaceOtherSystemInformation                               SearchSpaceId
OPTIONAL, -- Need S
    pagingSearchSpace                                               SearchSpaceId
OPTIONAL, -- Need S
    ra-SearchSpace                                                  SearchSpaceId
OPTIONAL, -- Need S
    ...,
    [[
    firstPDCCH-MonitoringOccasionOfPO CHOICE {
        sCS15KHZoneT                                                SEQUENCE (SIZE (1..maxPO-
perPF) ) OF INTEGER (0..139),
        sCS30KHZoneT-SCS15KHZhalfT                                  SEQUENCE (SIZE
(1..maxPO-perPF) ) OF INTEGER (0..279),
        sCS60KHZoneT-SCS30KHZhalfT-SCS15KHZquarterT                 SEQUENCE (SIZE
(1..maxPO-perPF) ) OF INTEGER (0..559),
        sCS120KHZoneT-SCS60KHZhalfT-SCS30KHZquarterT-SCS15KHZoneEighthT    SEQUENCE (SIZE
(1..maxPO-perPF) ) OF INTEGER (0..1119),
        sCS120KHZhalfT-SCS60KHZquarterT-SCS30KHZoneEighthT-SCS15KHZoneSixteenthT    SEQUENCE (SIZE
(1..maxPO-perPE) ) OF INTEGER (0..2239),
        sCS120KHZquarterT-SCS60KHZoneEighthT-SCS30KHZoneSixteenthT  SEQUENCE (SIZE
(1..maxPO-perPF) ) OF INTEGER (0..4479),
        sCS120KHZoneEighthT-SCS60KHZoneSixteenthT                   SEQUENCE (SIZE
(1..maxPO-perPF) ) OF INTEGER (0..8959),
        sCS120KHZoneSixteenthT                                      SEQUENCE (SIZE
(1..maxPO-perPF) ) OF INTEGER (0..17919)
    }                                                               OPTIONAL
-- Cond OtherBWP
    ]]
}
```

TABLE 23

PDCCH-ConfigCommon field descriptions commonControlResourceSet
An additional common control resource set which may be configured and used for any common or UE-specific search space. If the network configures this field, it uses a ControlResourceSetId other than 0 for this ControlResourceSet. The network configures the commonControlResourceSet in SIB1 so that it is contained in the bandwidth of CORESET#0.
commonSearchSpaceList
A list of additional common search spaces. If the network configures this field, it uses the SearchSpaceIds other than 0.
controlResourceSetZero
Parameters of the common CORESET#0 which can be used in any common or UE-specific search spaces. The values are interpreted like the corresponding bits in MIB pdcch-ConfigSIB1. Even though this field is only configured in the initial BWP (BWP#0) controlResourceSetZero can be used in search spaces configured in other DL BWP(s) than the initial DL BWP if the conditions defined in TS 38.213 [13], clause 10 are satisfied.
firstPDCCH-MonitoringOccasionOfPO
Indicates the first PDCCH monitoring occasion of each PO of the PF on this BWP, see TS 38.304 [20].
pagingSearchSpace
ID of the Search space for paging (see TS 38.213 [13], clause 10.1). If the field is absent, the UE does not receive paging in this BWP (see TS 38.213 [13], clause 10).
ra-SearchSpace TABLE 23-continued PDCCH-ConfigCommon field descriptions ID of the Search space for random access procedure (see TS 38.213 [13], clause 10.1). If the field is absent, the UE does not receive RAR in this BWP. This field is mandatory present in the DL BWP(s) if the conditions described in TS 38.321 [3], subclause 5.15 are met.
searchSpaceOtherSystemInformation
ID of the Search space for other system information, i.e., SIB2 and beyond (see TS 38.213 [13], clause 10.1) If the field is absent, the UE does not receive other system information in this BWP.
searchSpaceSIB1
ID of the search space for SIB1 message. In the initial DL BWP of the UE's PCell, the network sets this field to 0. If the field is absent, the UE does not receive SIB1 in this BWP. (see TS 38.213 [13], clause 10)
searchSpaceZero
Parameters of the common SearchSpace#0. The values are interpreted like the corresponding bits in MIB pdcch-ConfigSIB1. Even though this field is only configured in the initial BWP (BWP#0) searchSpaceZero can be used in search spaces configured in other DL BWP(s) than the initial DL BWP if the conditions described in TS 38.213 [13], clause 10 are satisfied.

Sixth Embodiment

According to an embodiment of the disclosure, the BS may configure the UE with a CORESET, and may configure a transmission configuration indicator (TCI) state with respect to the CORESET. Based on the TCI state configured for the CORESET, the UE may determine which RS (e.g. SS/PBCH block or CSI-RS) is QCL relation with DMRS being transmitted in the CORESET. For example, a plurality of pieces of information below may be provided as TCI state configuration

TABLE 24

TCI-State information element

```
TCI-State ::=                    SEQUENCE {
    tci-StateId                      TCI-StateId,
    qcl-Type1                        QCL-Info,
    qcl-Type2                                                            QCL-Info
OPTIONAL, -- Need R
    ...
}
QCL-Info ::=                     SEQUENCE {
    cell                                                                 ServCellIndex
OPTIONAL, - Need R
    bwp-Id                                                               BWP-Id
OPTIONAL, -- Cond CSI-RS-Indicated
    referenceSignal                  CHOICE {
        csi-rs                           NZP-CSI-RS-ResourceId,
        ssb                              SSB-Index
    },
    qcl-Type                     ENUMERATED {typeA, typeB, typeC, typeD),
    ...
}
```

The BS may configure the UE with one or more TCI states with respect to a particular CORESET, and may activate one of the configured TCI states by a MAC CE activation command. For example, {TCI state #0, TCI state #1, TCI state #2} may be configured as TCI states for CORESET #1, and the BS may transmit, to the UE, an activation command to assume TCI state #0 as a TCI state for CORESET #1 via a MAC CE. Based on the activation command received via the MAC CE, the UE may correctly receive DMRS of a corresponding CORESET based on QCL information in the activated TCI state.

With respect to a CORESET (CORESET #1) for which an index is configured to 0, if the UE fails to receive a MAC CE activation command with respect to a TCI state of CORESET #1, the UE may assume that a DMRS transmitted in CORESET #1 is QCLed with a SS/PBCH block identified in an initial access procedure or a non-contention based random access procedure not being triggered by a PDCCH command.

With respect to a CORESET (CORESET #X) for which an index is configured to a value other than 0, if the UE fails to be configured with a TCI state with respect to CORESET #X or is configured with one or more TCI states but fails to receive an MAC CE activation command for activating one of them, the UE may assume that a DMRS transmitted in CORESET #X is QCLed with a SS/PBCH block identified in an initial access procedure.

In order to increase reception performance with respect to a PDCCH, the BS may repeatedly transmit the PDCCH to the UE. Here, in addition, the BS may apply different beams to transmissions of the PDCCH and may transmit the PDCCH. In this regard, using different beams may be regarded as applying different TCI states to the respective transmissions of the PDCCH or receiving, by the UE, the transmissions of the PDCCH, assuming different QCL (in particular, may correspond to a QCL type D). The UE may receive the PDCCH, which is repeatedly transmitted by the BS, assuming different QCL, such that reception performance of the UE with respect to the PDCCH may be increased.

The repetitive transmission and the transmissions with different beams with respect to a PDCCH, which are described above, may be applied to transmission of a WUS or a GTS. This is because the WUS and the GTS require high reliability. In particular, the WUS may be monitored in DRX inactive time, and may be monitored at very long intervals according to DRX configuration. In this case, a channel estimation value for determining precoding or a beam used in WUS transmission may not be accurate, such that reception performance may not be good. In order to solve this problem, the repetitive transmission and the transmissions with different beams with respect to a PDCCH, which are described above, may be considered.

The sixth embodiment of the disclosure provides various embodiments of a method of repeatedly transmitting a PDCCH and a method of transmitting the PDCCH by using different beams. Embodiments below may be applied to transmission of a WUS or a GTS.

Sixth-1 Embodiment

The sixth-1 embodiment of the disclosure provides a method of repeatedly transmitting a PDCCH.

According to an embodiment of the disclosure, the UE may receive, from the BS, configuration information about the number of times a PDCCH being repeatedly transmitted. For example, the BS may notify, via higher layer signaling (e.g., RRC signaling), the UE with configuration information indicating that a PDCCH will be repeated N times. In this regard, the BS may additionally configure information about a first PDCCH monitoring occasion from among PDCCHs to be repeated N times. The UE may assume that a PDCCH will be repeated N times, starting from the configured first PDCCH monitoring occasion, and may perform monitoring and reception of a PDCCH.

According to an embodiment of the disclosure, the UE may implicitly determine the number of repetitive transmissions with respect to a PDCCH. For example, the BS may configure the UE with duration from among parameters for a search space, and the UE may assume that a PDCCH being transmitted in a PDCCH monitoring occasion in a period configured as the duration will be repeatedly transmitted. For example, when duration is configured as N slots, PDCCHs may be monitored in each of slots in the duration, and in this regard, PDCCHs being transmitted in each occasion may be assumed to be repeatedly transmitted.

According to an embodiment of the disclosure, the UE may assume that repetitive transmission of a PDCCH is applied to transmission with a particular DCI format. For example, with respect to a DCI format corresponding to a WUS or a GTS, the UE may assume N repetitive transmissions. Here, the N repetitive transmissions may be predefined, may be configured by the BS, or may be implicitly determined from other system parameters (e.g., the number of SSBs being actually transmitted, the number of TCI states configured for a CORESET in which a corresponding PDCCH is transmitted, and the like).

According to an embodiment of the disclosure, the UE may be configured, by the BS, as to whether a PDCCH is to be repeatedly transmitted. That is, according to configuration by the BS, a PDCCH may be repeatedly transmitted or may not be repeatedly transmitted.

Sixth-2 Embodiment

In the sixth-2 embodiment of the disclosure, transmission and reception may be performed by applying different beams to respective beams that are repeatedly transmitted (i.e. different TCI states are respectively applied to PDCCH transmissions or the UE receives the PDCCH transmissions, assuming different QCLs (in particular, may correspond to QCL type D).

According to an embodiment of the disclosure, the UE may receive, from the BS, a MAC CE instruction for activating one from among one or more TCI states configured for a CORESET. For example, the UE may be configured with M TCI states, {TCI #0, TCI #1, . . . , TCI #(M−1)}, and may receive a MAC CE instruction for activating particular TCI #m among them. With respect to PDCCH monitoring occasions configured to be repeatedly transmitted N times, the UE may perform monitoring on a corresponding PDCCH, assuming different TCI states, in ascending (or descending) order of indices of TCI states, starting from TCI #m, sequentially starting from a first PDCCH monitoring occasion of repetitive transmissions. For example, in a case where it is assumed that PDCCH occasions being repeatedly transmitted N times are {#0, #1, #2, . . . , #(N−1)}, monitoring may be performed on each of the PDCCH occasions, respectively assuming QCLs corresponding to TCI #m for #0, TCI #(m+1) for #1, TCI #(m+2) for #2, TCI #(m+3) for #3, . . . , TCI #(m+N−1) for #(N−1).

According to an embodiment of the disclosure, the UE may receive, from the BS, a MAC CE instruction for activating one or more TCI states from among one or more TCI states configured for a CORESET. For example, the UE may be configured with M TCI states, {TCI #0, TCI #1, . . . , TCI #(M−1)} for a CORESET, and may receive a MAC CE instruction for activating particular N TCI states {TCI #m, TCI #(m+1), . . . , TCI #(m+N−1)} among them. The activated N TCI states may be one-to-one mapped to PDCCH occasions that are repeatedly transmitted N times. That is, for example, in a case where it is assumed that PDCCH occasions being repeatedly transmitted N times are {#0, #1, #2, . . . , #(N−1)}, monitoring may be performed on each of the PDCCH occasions, respectively assuming QCLs corresponding to TCI #m for #0, TCI #(m+1) for #1, TCI #(m+2) for #2, TCI #(m+3) for #3, . . . , TCI #(m+N−1) for #(N−1).

According to an embodiment of the disclosure, the UE may not be configured, by the BS, with a TCI state for a CORESET, or may not receive a MAC CE instruction for activating a TCI state even when one or more TCT states are configured, and in this case, the UE may assume that a SS/PBCH block identified in a random access procedure is QCLed with a DMRS of the CORESET. If the identified SS/PBCH block is SS/PBCH #m, with respect to PDCCH monitoring occasions configured to be repeatedly transmitted N times, the UE may perform monitoring on a corresponding PDCCH, assuming different QCLs, in ascending (or descending) order of indices of SS/PBCH, starting from SS/PBCH #m, sequentially starting from a first PDCCH monitoring occasion of repetitive transmissions. Here, a SS/PBCH index may correspond to an index of a SS/PBCH being actually transmitted. For example, when a total of S SS/PBCHs are actually transmitted, SS/PBCH indices may be determined as {SS/PBCH #0, SS/PBCH #1, . . . , SS/PBCH #(S−1)}. Information about a SS/PBCH being actually transmitted may be received from the BS via higher layer signaling (e.g., SIB or RRC). For example, in a case where it is assumed that PDCCH occasions being repeatedly transmitted N times are {#0, #1, #2, . . . , #(N−1)}, monitoring may be performed on each of the PDCCH occasions, respectively assuming QCLs corresponding to SS/PBCH #m for #0, SS/PBCH #(m+1) for #1, SS/PBCH #(m+2) for #2, SS/PBCH #(m+3) for #3, . . . , SS/PBCH #(m+N−1) for #(N−1).

Alternatively, regardless of identified SS/PBCH indices, a same scheme may be applied, starting from a first SS/PBCH index. For example, in a case where it is assumed that PDCCH occasions being repeatedly transmitted N times are {#0, #1, #2, . . . , #(N−1)}, monitoring may be performed on each of the PDCCH occasions, respectively assuming QCLs corresponding to SS/PBCH #0 for #0, SS/PBCH #1 for #1, SS/PBCH #2 for #2, SS/PBCH #3 for #3, . . . , SS/PBCH #(N−1) for #(N−1).

In performing the aforementioned embodiment, the modulo operation may be performed such that a TCI state index or an SS/PBCH index does not exceed a configured maximum index value. For example, monitoring may be performed in PDCCH monitoring occasion #n, assuming TCI #(mod(m+n−1,N)) or SS/PBCH(mod(m+n−1,S)). Here, mod(A,B) may be an operator of outputting the remainder obtained by dividing A by B, and N may be defined as the number of configured TCT states, and S may be defined as the number of SS/PBCHs being actually transmitted.

Figure 34:
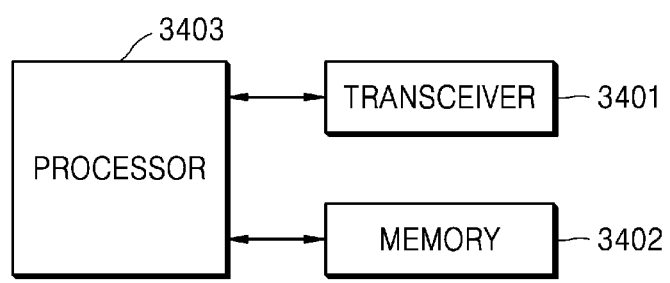
FIG. 34 illustrates a structure of a UE according to an embodiment of the disclosure.
Figure 35:
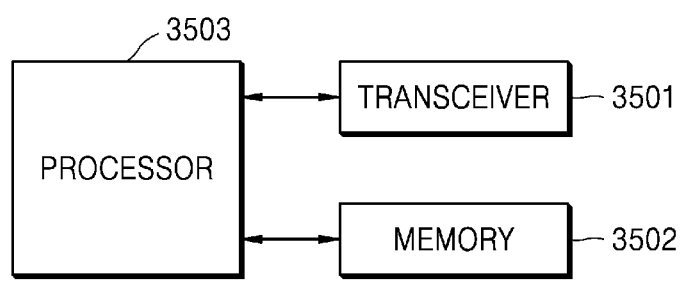
FIG. 35 illustrates a structure of a BS according to an embodiment of the disclosure.

Transceivers, memories, and processors of the UE and the BS to perform the afore-described embodiments of the disclosure are respectively shown in FIGS. 34 and 35. In the afore-described embodiments, a method of notifying POSS configuration information, a method of transmitting and receiving a POSS and a method of controlling PDCCH monitoring thereof, and transmitting and receiving methods of the BS and the UE to apply data transmission and reception operations thereof are provided. In order to perform them, the transceivers, the memories, and the processors of the UE and the BS have to operate according to each of the embodiments.

FIG. 34 illustrates a structure of a UE according to an embodiment of the disclosure.

Referring to FIG. 34, the UE may include a transceiver 3401, a memory 3402, and a processor 3403. However, elements of the UE are not limited to an example described above. For example, the UE may include more elements than the afore-described elements or may include fewer elements than the afore-described elements. Furthermore, the transceiver 3401, the memory 3402, and the processor 3403 may be implemented as one chip.

According to an embodiment of the disclosure, the transceiver 3401 may transmit or receive a signal to or from a BS. The signal may include control information, and data. To do so, the transceiver 3401 may include a radio frequency (RF) transmitter configured to up-convert and amplify a frequency of a signal to be transmitted, and a RF receiver configured to low-noise amplify a received signal and down-convert a frequency thereof. Also, the transceiver 3401 may receive a signal by using a radio channel and output the signal to the processor 3403, and may transmit a signal output from the processor 3403, by using a radio channel.

According to an embodiment of the disclosure, the memory 3402 may store programs and data required for the UE to operate. Also, the memory 3402 may store control information or data included in a signal transmitted or received by the UE. The memory 3402 may include any or a combination of storage media such as read-only memory (ROM), random access memory (RAM), a hard disk, a compact disc (CD)-ROM, and a digital versatile disc (DVD). Also, the memory 3402 may correspond to a plurality of memories. According to an embodiment of the disclosure, the memory 3402 may store a program for controlling PDCCH monitoring by the UE, and receiving a configuration of a POSS and the POSS.

According to an embodiment of the disclosure, the processor 3403 may control a series of processes to allow the UE to operate according to the aforementioned embodiment. For example, the processor 3403 may control monitoring of a DL control channel according to the embodiments of the disclosure.

In detail, the processor 3403 may control each configuration of the UE to receive POSS configuration information from the BS, to monitor a POSS from the BS based on the POSS configuration information from the BS, to detect the POSS based on the monitoring, and to control a DL control channel monitoring configuration of the UE.

Also, the processor 3403 may include a plurality of processors, and may be configured to execute the program stored in the memory 3402 to perform a method of controlling monitoring of the DL control channel, a configuration of a POSS, and a method of receiving a POSS according to the embodiments of the disclosure.

FIG. 35 illustrates a structure of a BS according to an embodiment of the disclosure.

Referring to FIG. 35, the BS may include a transceiver 3501, a memory 3502, and a processor 3503. However, elements of the BS are not limited to an example described above. For example, the BS may include more elements than the afore-described elements or may include fewer elements than the afore-described elements. Furthermore, the transceiver 3501, the memory 3502, and the processor 3503 may be implemented as one chip.

According to an embodiment of the disclosure, the transceiver 3501 may transmit or receive a signal to or from a UE. The signal may include control information, and data. To do so, the transceiver 3501 may include a RF transmitter configured to up-convert and amplify a frequency of a signal to be transmitted, and a RF receiver configured to low-noise amplify a received signal and down-convert a frequency thereof. Also, the transceiver 3501 may receive a signal by using a radio channel and output the signal to the processor 3503, and may transmit a signal output from the processor 3503, by using a radio channel.

According to an embodiment of the disclosure, the memory 3502 may store programs and data required for the BS to operate. Also, the memory 3502 may store control information or data included in a signal transmitted or received by the BS. The memory 3502 may include any or a combination of storage media such as ROM, RAM, a hard disk, a CD-ROM, and a DVD. Also, the memory 3502 may correspond to a plurality of memories. According to an embodiment of the disclosure, the memory 3502 may store a program for performing a method by which the BS controls DL control channel monitoring of the UE, a configuration of the POSS, and a method of generating and transmitting a POSS.

According to an embodiment of the disclosure, the processor 3503 may control a series of processes to allow the BS to operate according to the aforementioned embodiment. For example, the processor 3503 may control each configuration of the BS to perform a method of controlling DL control channel monitoring of the UE, and to generate and transmit a configuration of a POSS and the POSS.

Also, the processor 3503 may include a plurality of processors, and may be configured to execute the program stored in the memory 3502 to perform a method of controlling DL control channel monitoring of the UE, a configuration of a POSS, and a method of generating and transmitting a POSS, according to the embodiments of the disclosure.

The methods according to the embodiments of the disclosure as described herein or in the following claims may be implemented as hardware, software, or a combination of hardware and software.

When implemented as software, a computer-readable storage medium or a computer program product which stores one or more programs (e.g., software modules) may be provided. The one or more programs stored in the computer-readable storage medium or the computer program product are configured for execution by one or more processors in an electronic device. The one or more programs include instructions directing the electronic device to execute the methods according to the embodiments of the disclosure as described herein or in the following claims.

The programs (e.g., software modules or software) may be stored in non-volatile memory including RAM or flash memory, ROM, electrically erasable programmable read only memory (EEPROM), a magnetic disc storage device, a CD-ROM, a DVD, another optical storage device, or a magnetic cassette. Alternatively, the programs may be stored in memory including a combination of some or all of the above-mentioned storage media. Also, a plurality of such memories may be included.

In addition, the programs may be stored in an attachable storage device accessible through any or a combination of communication networks such as the Internet, an intranet, a local area network (LAN), a wide LAN (WLAN), and a storage area network (SAN). The storage device may be connected, through an external port, to an apparatus according to the embodiments of the disclosure. Another storage device on the communication network may also be connected to the apparatus performing the embodiments of the disclosure.

In the afore-described embodiments of the disclosure, elements included in the disclosure are expressed in a singular or plural form according to the embodiments of the disclosure. However, the singular or plural form is appropriately selected for convenience of description and the disclosure is not limited thereto. As such, an element expressed in a plural form may also be configured as a single element, and an element expressed in a singular form may also be configured as plural elements.

It should be understood that the embodiments of the disclosure in the specification and drawings should be considered in a descriptive sense only and not for purposes of limitation. That is, it will be understood by one of ordinary skill in the art that various changes in form and details may be made based on the technical concept of the disclosure. Also, the embodiments may be combined to be implemented, when required. For example, the BS and the UE may be operated in a manner that portions of an embodiment of the disclosure are combined with portions of another embodiment of the disclosure. The embodiments of the disclosure may also be applied to other communication systems, and various modifications based on the technical concept of the embodiments of the disclosure may be made. For example, the embodiments may be applied to a LTE system, a 5G or NR system, or the like.

The invention claimed is:

1. A method, performed by a user equipment (UE) in a wireless communication system, the method comprising:
    receiving, from a base station (BS), radio resource control (RRC) information including power saving signal (POSS) configuration information;
    monitoring a physical downlink control channel (PDCCH) for detection of downlink control information (DCI) used for power saving, based on the POSS configuration information, wherein the DCI comprises a wake-up indication bit;
    determining whether the DCI is detected based on the monitoring; and
    in case that the DCI is detected and the wake-up indication bit of the detected DCI indicates a first value, determining to perform wake-up operation,
    in case that the DCI is detected and the wake-up indication bit of the detected DCI indicates a second value, determining not to perform the wake-up operation;
    in case that the DCI is not detected and default operation information is configured in the POSS configuration information of the RRC information, performing the PDCCH monitoring, wherein the default operation information indicates the UE to perform the wake-up operation when the DCI is not detected; and
    in case that the DCI is not detected and the default operation information is not configured, skipping the wake-up operation.

2. The method of claim 1, wherein cyclic redundancy check (CRC) of the DCI is scrambled by power saving radio network temporary identifier (ps-RNTI).

3. The method of claim 1, wherein the POSS configuration information includes at least one of ps-RNTI information, offset information or DCI size information.

4. The method of claim 3, wherein the DCI size information indicates a number of at least one bit of the DCI,
    wherein, in case that the number of the at least one bit is more than 1, the DCI includes additional information associated with the wake-up operation.

5. A method, performed by a base station (BS) in a wireless communication system, the method comprising:
    transmitting, to a user equipment (UE), radio resource control (RRC) information including power saving signal (POSS) configuration information; and
    transmitting, to the UE, downlink control information, DCI, corresponding to the POSS used for power saving on a physical downlink control channel (PDCCH), wherein the DCI comprises a wake-up indication bit,
    wherein, in case that the DCI corresponding to the POSS is detected, whether to perform wake-up operation is indicated by the wake-up indication bit of the detected DCI, wherein the wake-up indication bit indicating a first value indicates the UE to perform the wake-up operation and the wake-up indication bit indicating a second value indicated the UE not to perform the wake-up operation,
    in case that the DCI is not detected and default operation information is configured in the POSS configuration information of the RRC information, the PDCCH monitoring is performed at the UE, wherein the default operation information indicates the UE to perform the wake-up operation when the DCI is not detected, and
    in case that the DCI is not detected and the default operation information is not configured, the wake-up operation is skipped at the UE.

6. The method of claim 5, wherein cyclic redundancy check (CRC) of the DCI is scrambled by power saving radio network temporary identifier (ps-RNTI).

7. The method of claim 5, wherein the POSS configuration information includes at least one of ps-RNTI information, offset information, or DCI size information.

8. The method of claim 7, wherein the DCI size information indicates a number of at least one bit of the DCI, in case that the number of the at least one bit is 1, the DCI indicates whether the UE is to perform the wake-up operation, and in case that the number of the at least one bit is more than 1, the DCI includes additional information associated with the wake-up operation.

9. A user equipment (UE) in a wireless communication system, the UE comprising:

a transceiver; and at least one processor coupled with the transceiver and configured to:

receive, from a base station (BS), radio resource control (RRC) information including power saving signal (POSS) configuration information, monitor a physical downlink control channel (PDCCH) for detection of downlink control information (DCI) used for power saving, based on the POSS configuration information, wherein the DCI comprises a wake-up indication bit, determine whether the DCI is detected based on the monitoring, and in case that the DCI is detected and the wake-up indication bit of the detected DCI indicates a first value, determine to perform wake-up operation, in case that the DCI is detected and the wake-up indication bit of the detected DCI indicates a second value, determine not to perform the wake-up operation;

in case that the DCI is not detected and default operation information is configured in the POSS configuration information of the RRC information, performing the PDCCH monitoring, wherein the default operation information indicates the UE to perform the wake-up operation when the DCI is not detected; and in case that the DCI is not detected and the default operation information is not configured, skipping the wake-up operation.

10. The UE of claim 9, wherein cyclic redundancy check (CRC) of the DCI is scrambled by power saving radio network temporary identifier (ps-RNTI).

11. The UE of claim 9, the POSS configuration information includes at least one of ps-RNTI information, offset information or DCI size information.

12. The UE of claim 11, wherein the DCI size information indicates a number of at least one bit of the DCI, in case that the number of the at least one bit is 1, the DCI indicates whether the UE is to perform the wake-up operation, and in case that the number of the at least one bit is more than 1, the DCI includes additional information associated with the wake-up operation.

13. A base station (BS) in a wireless communication system, the BS comprising:

a transceiver; and at least one processor coupled with the transceiver and configured to:

transmit, to a user equipment (UE), radio resource control (RRC) information including power saving signal (POSS) configuration information, transmit, to the UE, downlink control information, DCI, corresponding to the POSS used for power saving on a physical downlink control channel (PDCCH), wherein the DCI comprises a wake-up indication bit, wherein, in case that the DCI corresponding to the POSS is detected, whether to perform wake-up operation is indicated by the wake-up indication bit of the detected DCI, wherein the wake-up indication bit indicating a first value indicates the UE to perform the wake-up operation and the wake-up indication bit indicating a second value indicated the UE not to perform the wake-up operation, in case that the DCI is not detected and default operation information is configured in the POSS configuration information of the RRC information, the PDCCH monitoring is performed at the UE, wherein the default operation information indicates the UE to perform the wake-up operation when the DCI is not detected, and in case that the DCI is not detected and the default operation information is not configured, the wake-up operation is skipped at the UE.

\* \* \* \* \*